United States Patent
Yukitake et al.

(10) Patent No.: US 11,082,619 B2
(45) Date of Patent: Aug. 3, 2021

(54) IMAGING DEVICE AND CONTROL METHOD FOR IMAGING DEVICE

(71) Applicant: Olympus Corporation, Hachioji (JP)

(72) Inventors: Akira Yukitake, Hachioji (JP); Yuki Mishio, Kokubunji (JP); Takuya Kobayashi, Tokyo (JP); Takeshi Suzuki, Akiruno (JP); Keiji Kunishige, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 17/088,557

(22) Filed: Nov. 3, 2020

(65) Prior Publication Data

US 2021/0075967 A1  Mar. 11, 2021

Related U.S. Application Data

(63) Continuation of application No. PCT/JP2019/035788, filed on Sep. 11, 2019.

(51) Int. Cl.
*H04N 5/232* (2006.01)

(52) U.S. Cl.
CPC ..... *H04N 5/23287* (2013.01); *H04N 5/23267* (2013.01); *H04N 5/232933* (2018.08)

(58) Field of Classification Search
None
See application file for complete search history.

(56) References Cited

U.S. PATENT DOCUMENTS

| | | | |
|---|---|---|---|
| 8,243,152 B2 * | 8/2012 | Uenaka | G03B 5/00 348/208.7 |
| 2009/0225176 A1 * | 9/2009 | Honjo | G02B 27/646 348/208.99 |
| 2009/0251551 A1 * | 10/2009 | Uenaka | H04N 5/23248 348/208.4 |
| 2018/0063443 A1 * | 3/2018 | Ikeda | H04N 5/2254 |

(Continued)

FOREIGN PATENT DOCUMENTS

| | | |
|---|---|---|
| JP | 04-331586 A | 11/1992 |
| JP | 2002-064738 A | 2/2002 |

(Continued)

OTHER PUBLICATIONS

International Search Report to corresponding International Application No. PCT/JP2019/035788 (8 pgs.).

*Primary Examiner* — James M Hannett
(74) *Attorney, Agent, or Firm* — John C. Pokotylo; Pokotylo Patent Serices

(57) ABSTRACT

An imaging device, comprising a movement range restriction section, that, at the time of shooting standby, when rotating the image sensor based on detection result from an angular speed detection sensor or calculation result from a horizontal angle calculation section, restricts a region in which the image sensor is capable of moving to a first region that includes a central region of the optical axis of a photographing optical system, so as to maximize an angular range in which the image sensor can rotate, wherein, based on an instruction of a shooting instruction interface, the movement range restriction section sets a range in which the image sensor is capable of moving to a second region that includes the first region, and that is wider than at the time of shooting standby.

20 Claims, 29 Drawing Sheets

(56) References Cited

U.S. PATENT DOCUMENTS

2018/0184004 A1* 6/2018 Murakami ......... H04N 5/23212
2018/0316865 A1* 11/2018 Wakamatsu ......... H04N 5/2329

FOREIGN PATENT DOCUMENTS

| JP | 3360376 B | 12/2002 |
| JP | 2006-071743 A | 3/2006 |
| JP | 6105880 B | 3/2017 |

\* cited by examiner

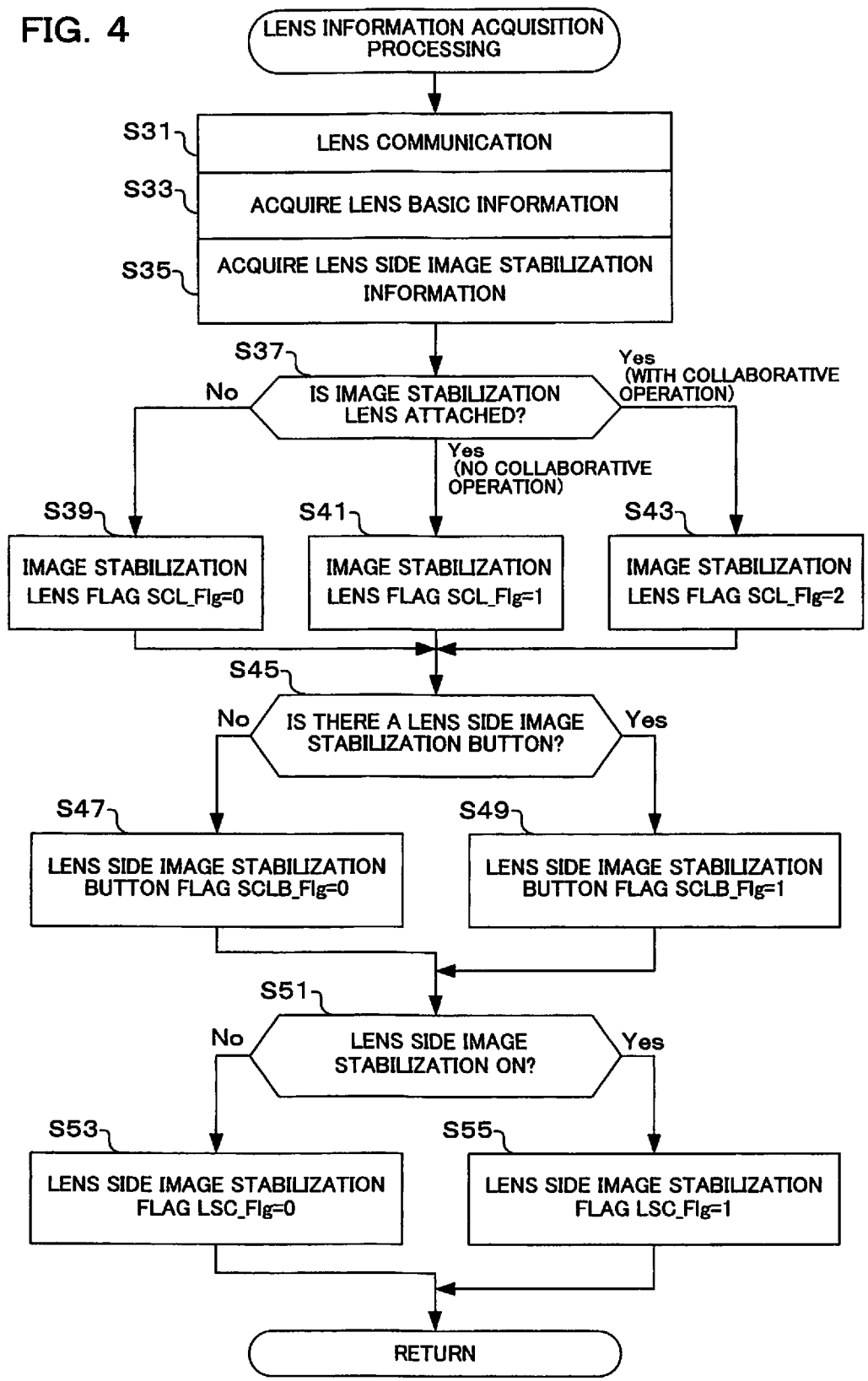

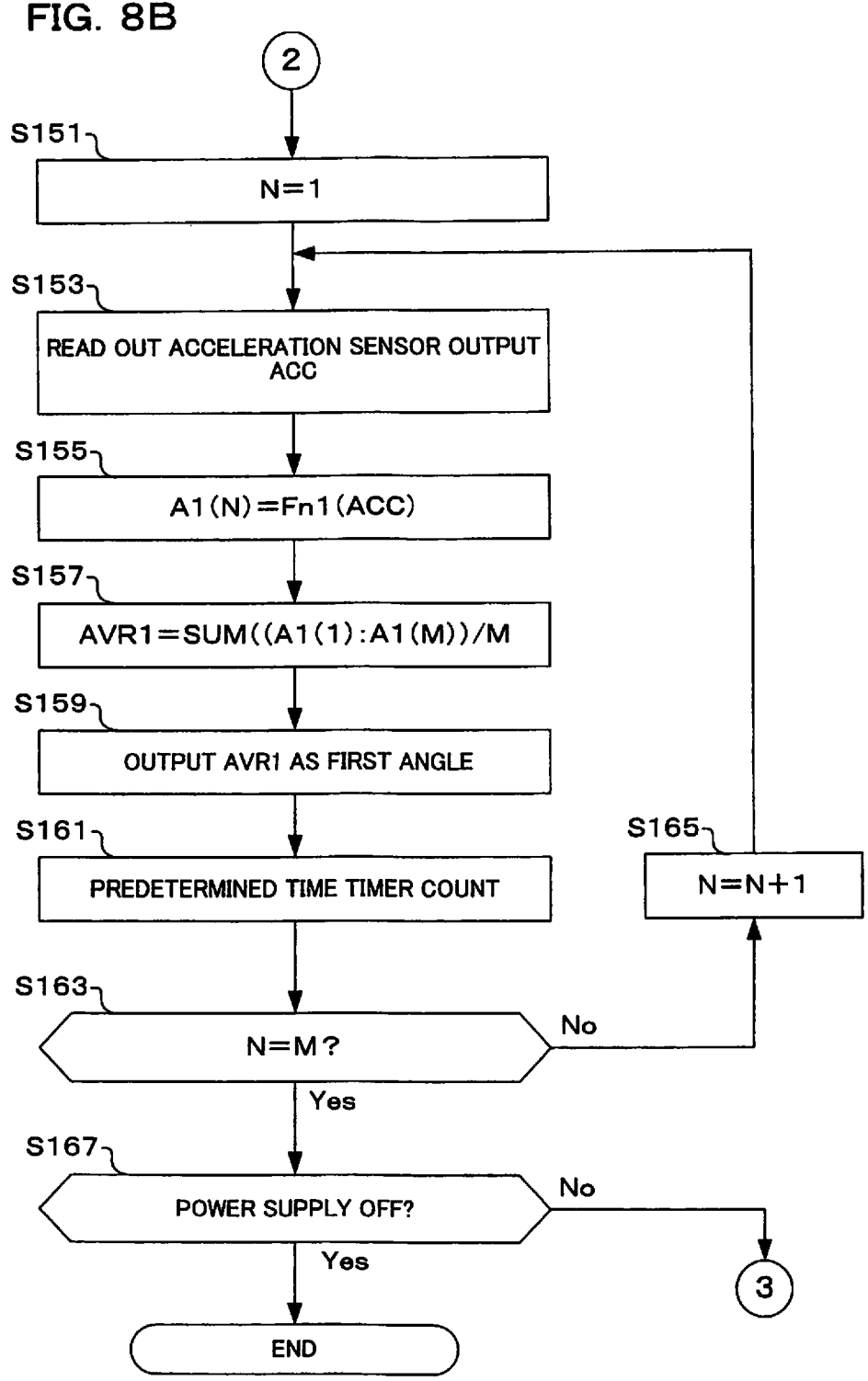

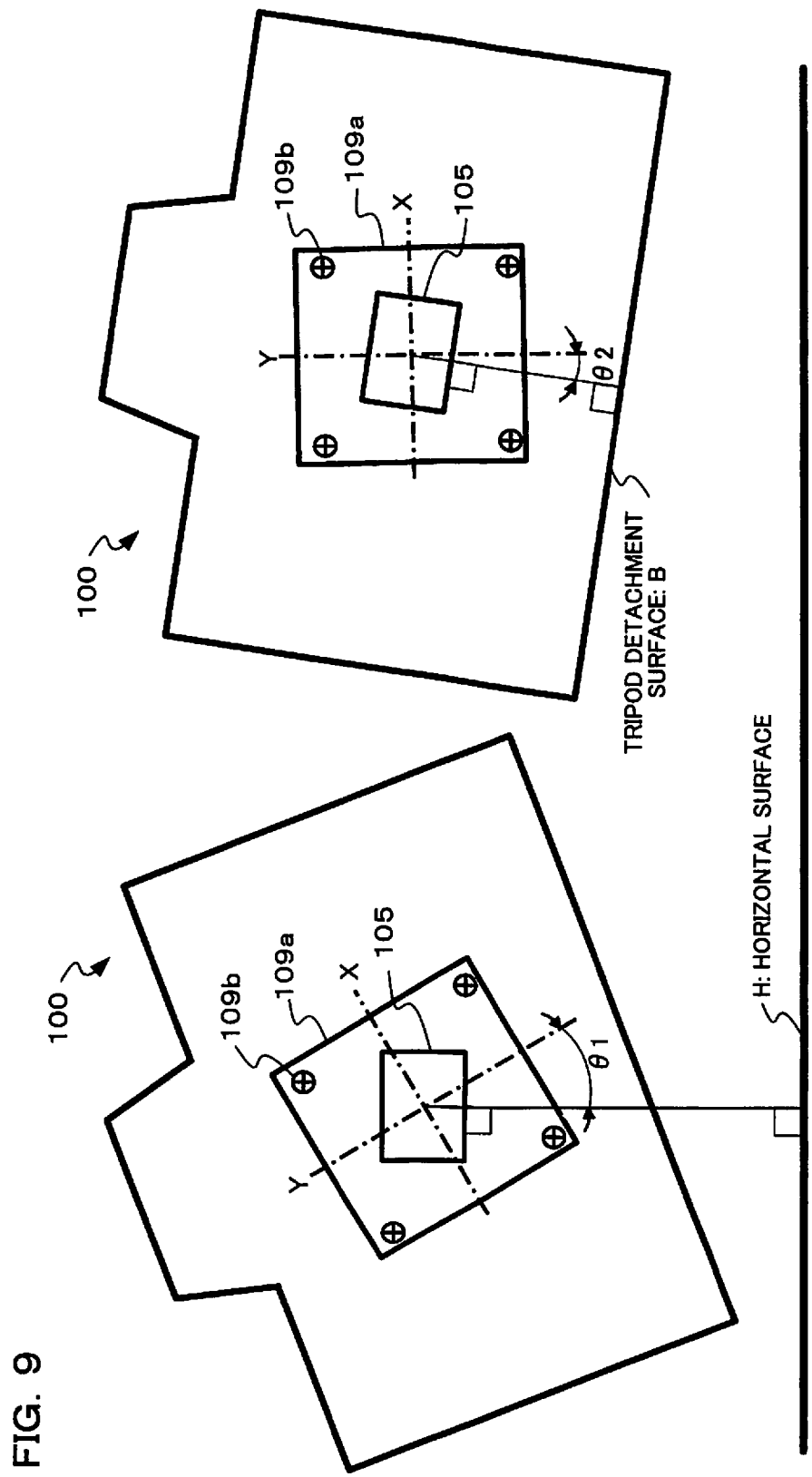

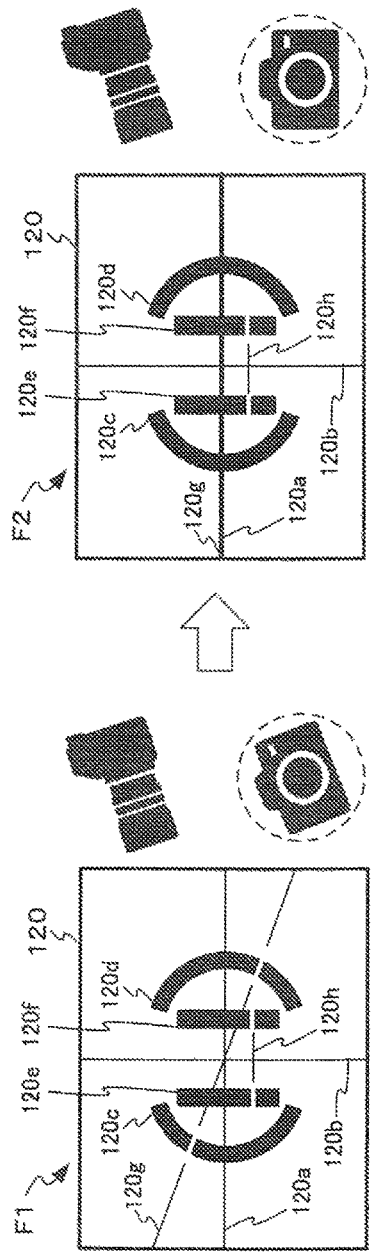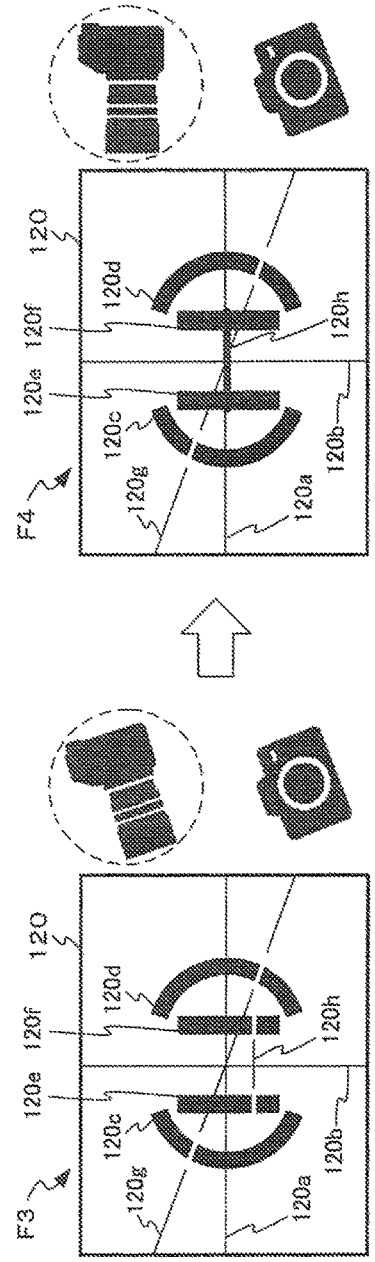
FIG. 16A
FIG. 16B

IMAGING DEVICE AND CONTROL METHOD FOR IMAGING DEVICE

CROSS-REFERENCE TO RELATED APPLICATIONS

This application is a Continuation Application of PCT Application No. PCT/JP2019/035788, filed on Sep. 11, 2019, the entire contents of which are incorporated herein by reference.

BACKGROUND OF THE INVENTION

1. Field of the Invention

The present invention relates to an imaging device, and a control method for an imaging device, that can correct a taken image horizontally with respect to an image frame, together with performing image stabilization to remove the effects of camera shake.

2. Description of the Related Art

There are three types of image blur caused by camera shake, which are angular blur (Pitch and Yaw), shift blur (X, Y), and rotational blur (Roll). Among these types of image blur, it has been proposed to correct angular blur and shift blur by moving a correction lens at the photographing lens side and/or an image sensor at the body side on a plane that is orthogonal to the optical axis, and further correcting rotational blur by rotating the image sensor about the optical axis, as required. (Refer to Japanese patent laid open No. 2006-71743 (hereafter called patent publication 1).) On the other hand, automatic horizontal correction technology has been previously proposed to detect inclination of an imaging device, and makes it possible to shoot a horizontal image by rotating an image sensor about the optical axis (refer to Japanese patent laid-open No. Hei. 4-331586 (hereafter called patent publication 2) and Japanese patent No. 3360376 (hereafter referred to as patent publication 3)). Technology has also been proposed to make correction angle range for automatic horizontal correction large in a case where image stabilization amount is small, and conversely to restrict correction angle range for automatic horizontal correction to a small range in a case where camera shake correction amount is large (refer to Japanese patent No. 6105880 (hereafter called patent publication 4)).

If image stabilization and automatic horizontal correction are performed simultaneously, rotational blur correction and automatic horizontal correction are performed together by rotating the image sensor. However, since there is a physical restriction on a rotation possible angular range, if rotational blur correction is made sufficiently effective an angular range for automatic horizontal correction becomes insufficient, while conversely if automatic horizontal correction is made sufficiently effective the efficiency of rotational blur correction becomes insufficient. This similarly applies to angular blur correction and shift blur correction, and as correction angular range for automatic horizontal correction becomes larger a movable range for angular blur correction and shift below correction becomes narrow and it is no longer possible to ensure sufficient image blur correction, and conversely, if sufficient image blur correction is ensured a correction angle range for automatic horizontal correction becomes narrow.

In order to deal with this problem, technology for making correction angle range for automatic horizontal correction large in the case of a small image stabilization amount, and conversely restricting correction angle range for automatic horizontal correction to a small range in the case of a large camera shake correction amount, has been proposed, as was described previously (refer to patent publication 4). However, considering the fact that the more likely a photographer is to cause camera shake, the more likely the photographer is to shoot tilted photographs, it should be noted that the effects of leveling are impaired in accordance with extent of camera shake. Also, if results of leveling each time shooting is performed vary depending on the extent of image stabilization on each occasion, such an imaging device cannot be said to be a good user-friendly device for a photographer using the device.

SUMMARY OF THE INVENTION

The present invention provides a novel imaging device and control device for an imaging device that solve the problem of image stabilization and horizontal correction being inconsistent with each other, and that can perform both types of correction sufficiently. There is also provided a novel imaging device and control device for an imaging device that have good usability such that it is possible to easily shoot a horizontal image with high precision.

According to a first aspect of the present invention, an imaging device, that forms a subject image on an image sensor using an imaging optical system, and acquires an image, comprises an angular speed detection sensor that detects angular speed of the imaging device, a horizontal correction instruction interface for instructing horizontal correction of the image sensor or an output image of the image sensor with respect to an image frame, a processor having a horizontal angle calculation section that detects vertical direction or horizontal direction of the imaging device or the image sensor, and calculates and outputs a first angle around the optical axis of the image sensor in order to horizontally correct the image sensor or an output image of the image sensor with respect to an image frame, an image sensor drive actuator that rotates the image sensor around the optical axis based on detection result from the angular speed detection sensor or calculation result from the horizontal angle calculation section, and a shooting instruction interface for instructing preparation or commencement of shooting, the processor further comprising a movement range restriction section, the movement range restriction section, at the time of shooting standby, when rotating the image sensor based on detection result from the angular speed detection sensor or calculation result from the horizontal angle calculation section, restricting a region in which the image sensor is capable of moving to a first region that includes a central region of the optical axis, so as to maximize an angular range in which the image sensor can rotate, and wherein, based on an instruction of the shooting instruction interface, the movement range restriction section sets a range in which the image sensor is capable of moving to a second region that includes the first region, and is wider than at the time of shooting standby.

According to a second aspect of the present invention, a control method for an imaging device, that forms a subject image on an image sensor using an imaging optical system, and acquires an image, comprises determining whether or not horizontal correction of the image sensor or an output image of the image sensor with respect to an image frame has been instructed, detecting angular speed of the imaging device, detecting vertical direction or horizontal direction of the imaging device or the image sensor, and calculating a first angle about the optical axis of the image sensor in order to horizontally correct the image sensor or an output image of the image sensor with respect to an image frame, rotating the image sensor about the optical axis based on detection result of the angular speed or the first angle, at the time of shooting standby, when rotating the image sensor based on detection result of the angular speed or the first angle, restricting a region in which the image sensor is capable of moving to a first region that includes a central region of the optical axis, so as to maximize an angular range in which the image sensor can rotate, and in a case where preparation or commencement has been instructed, setting a region in which it is possible to move the image sensor to a second region that includes the first region, and that is wider than at the time of shooting standby.

BRIEF DESCRIPTION OF THE DRAWINGS

FIG. 4 is a flowchart showing lens information acquisition processing of the camera of one embodiment of the present invention.

FIG. 8A and FIG. 8B are flowcharts showing first angle computational processing performed concurrently with main operation, in the camera of one embodiment of the present invention.

FIG. 9 is a drawing showing a first angle and a second angle, in the camera of one embodiment of the present invention.

FIG. 16A is a drawing showing an example of spirit level display for a state where the camera is not horizontal (F1), and a state where the camera is horizontal (F2), in the camera of one embodiment of the present invention.

FIG. 16B is a drawing showing an example of spirit level display for a state where the camera is tilted (F3), and a state where the camera is not tilted (F4), in the camera of one embodiment of the present invention.

DETAILED DESCRIPTION OF THE PREFERRED EMBODIMENTS

In the following, an example where the present invention has been applied to an imaging device will be described as one embodiment of the present invention. This imaging device forms a subject image on an image sensor using an imaging optical system, and acquires an image. In the description of this embodiment, an example where the present invention has been applied to a camera, as an imaging device, will be described. This digital camera is a digital camera, and has an imaging section, with a subject image being converted to image data by this imaging section, and the subject image being subjected to live view display on a display section arranged on the rear surface of the camera body or within a viewfinder based on this converted image data. A photographer determines composition and photo opportunity by looking at the live view display. If the photographer performs a release operation, image data is stored in a storage medium. Image data that has been stored in the storage medium can be subjected to playback display on the display section if playback mode is selected.

Also, the camera of this embodiment has an image stabilization function and an automatic horizontal correction function, and in a case where the automatic horizontal correction function is put into operation, an image sensor or an output image of the image sensor is horizontally corrected with respect to an image frame. In a case of performing this automatic horizontal correction at the time of shooting standby, a region in which movement of the image sensor is possible is restricted to an area that contains an optical axis center region, while at the time of shooting where image stabilization is performed, a region in which movement is possible is made wider than at the time of shooting standby.

Figure 1:
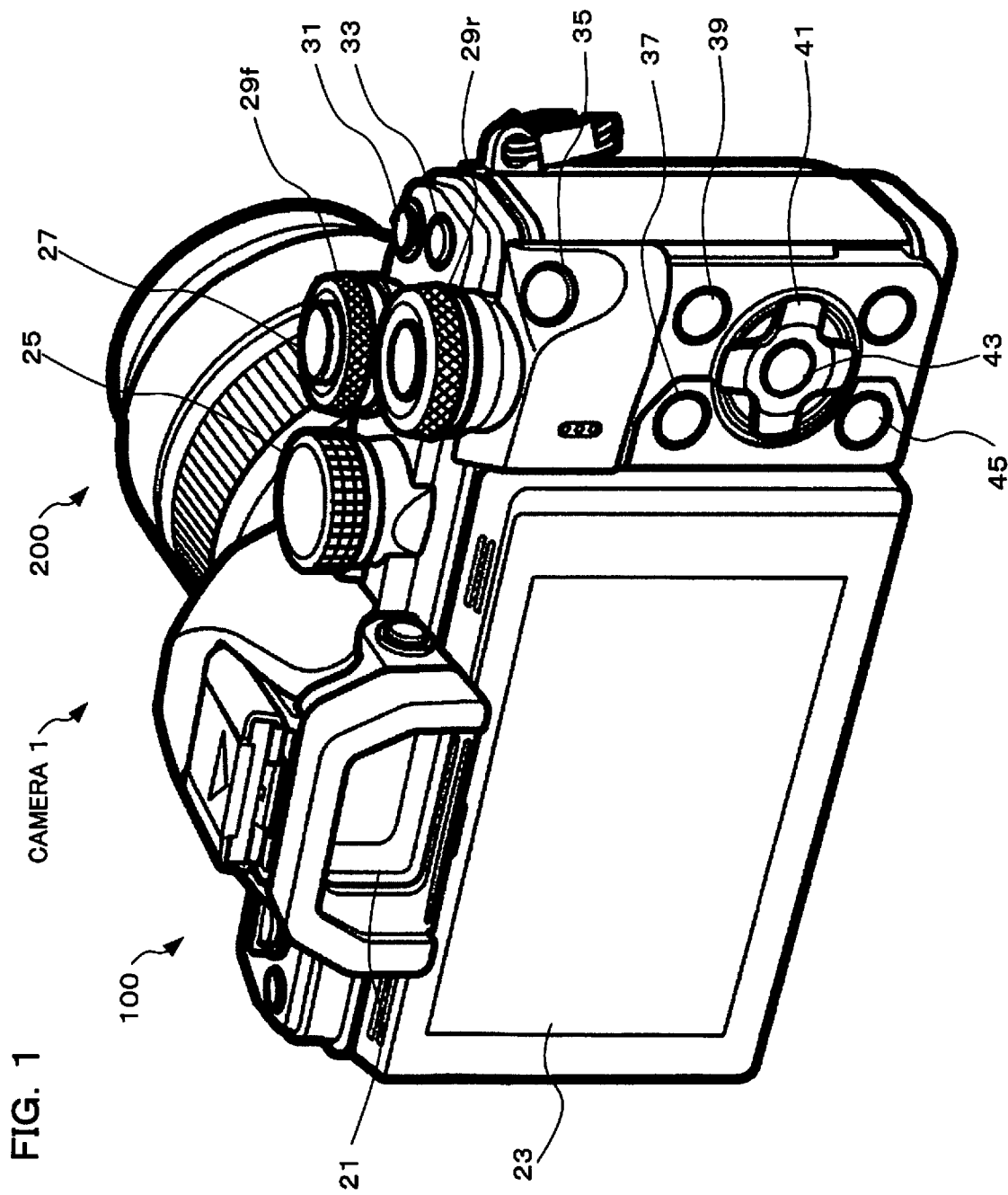
FIG. 1 is an external perspective view looking from a rear surface of a camera of one embodiment of the present invention.

FIG. 1 is an external perspective view looking from a rear surface of a camera 1 of this embodiment. This camera 1 comprises an interchangeable lens 200 and a camera body 100. The interchangeable lens 200 can be attached to the camera body 100, and if the interchangeable lens 200 is attached to the camera body 100 a subject image is formed on an image sensor 105 (refer to FIG. 2B) within the camera body 100. It should be noted that a photographing lens barrel and the camera body may also be formed integrally.

A zoom ring that is freely rotatable is provided on the outside of the interchangeable lens 200 in order to adjust focal length. A image stabilization on/off switch is also provided on the outside of the interchangeable lens 200. The user turns the image stabilization on/off switch on if they want to execute image stabilization at the interchangeable lens 200 side, and turns the image stabilization on/off switch off if they do not want to perform image stabilization.

An electronic viewfinder (EVF) 21 is arranged at an upper part of the rear surface of the camera body 100. The user can observe a small display that is arranged within the camera body 100 through an eyepiece window of the EVF 21, and live view images etc. are displayed on this display.

A rear surface monitor 23 is arranged on a rear surface of the camera body 100. This rear surface monitor 23 has a display such as a liquid crystal display (LCD) or organic EL. Live view images, already stored images, menu images etc. are stored on this rear surface monitor 23 and on the previously described EVF 21. Further, horizontal correction images at the time of automatic horizontal correction (refer to FIG. 16A to FIG. 16D) and image trimming and resizing processing images (refer to FIG. 11 and FIG. 12) etc. are also displayed on the rear surface monitor 23 and the EVF 21.

A shooting mode dial 25 is arranged on an upper surface of the camera body 100. This shooting mode dial 25 is freely rotatable, and it is possible for the user to set a shooting mode by lining up a shooting mode that is displayed on the upper surface of the shooting mode dial 25 with an index.

A shutter button 27 is arranged to the right of the shooting mode dial 25. If the user presses the shutter button 27 down halfway, a 1st release switch is turned on, and if the shutter button 27 is further pressed fully a 2nd release switch is turned on. If the 1st release switch is turned on, AE (auto exposure) and AF (autofocus) are executed (refer to S9 in FIG. 3, and to FIG. 20). Also, if the 2nd release switch is turned on, actual shooting is performed for image storage of a still picture (refer to S13 in FIG. 3, and to FIG. 21). The shutter button 27 functions as a shooting instruction interface (shooting instruction section) for instructing preparation or commencement of shooting.

An F dial 29f is arranged toward the front on an upper surface of the camera body 100, and an R dial 29r is arranged toward the back on the upper surface of the camera body 100. Both dials are rotatable, and the user can change settings by operating the F dial 29f and the R dial 29r with their finger (refer, for example, to S223 in FIG. 18, and S241 in FIG. 19).

An enlargement button 31 is also arranged on the right side of the upper surface of the camera body 100. If the user operates the enlargement button 31, an image that is displayed on the rear surface monitor 23 on the EVF 21 is enlarged. A movie button 33 is arranged close to the enlargement button 31. If the user operates the movie button 33, then shooting of a movie is commenced, and if the movie button 33 is operated again shooting of the movie is finished.

An automatic horizontal correction button 35 is arranged at the upper right of the rear surface of the camera body 100. If the user operates the automatic horizontal correction button 35, automatic horizontal correction is set (refer to S211 aimed S213 in FIG. 17, and to FIG. 18 etc.). Further, if the F dial 29f or the R dial 29r are operated in a state where automatic horizontal correction has been set, the automatic horizontal correction mode is changed (refer to S223 in FIG. 18, and to FIG. 19 etc.). If automatic horizontal correction has been set, a taken image is adjusted so as to be horizontally corrected (refer, for example, to S63 in FIG. 5A, and to FIG. 11, FIG. 12 etc.). The automatic horizontal correction button 35 functions as an automatic horizontal correction interface (horizontal correction instruction section) that instructs horizontal correction of the image sensor, or an image of the image sensor, with respect to an image frame.

An AF button 37 is arranged in the middle on the right side of the rear surface of the camera body 100. If the user operates the AF button 37 it is possible to perform AF (automatic focus adjustment).

An image stabilization button 39 is arranged to the right of the AF button 37. If the user operates the image stabilization button 39 image stabilization is set (refer to S215, S217, etc. in FIG. 17). If image stabilization has been set, image stabilization is performed so as to eliminate the effects of camera shake (refer to FIG. 5B).

A cross shaped-button 41 is arranged below the AF button 37 and image stabilization button 39 described above. The cross-shaped button 41 is a button that is capable of being respectively operated upwards, downwards, to the left, and to the right. By operating the cross-shaped button 41 either upwards, downwards, to the left, or to the right, it is possible to move a cursor that is displayed on the rear surface monitor 23, for example, and it is possible to move items that are being displayed. An OK button 43 is arranged in the center of the cross-shaped button 41. When the user moves the cursor etc. by operating the cross-shaped button 41 it is possible to decide on settings for items etc. by operating the OK button 43. An INFO button 45 is arranged below the cross-shaped button 41. If the user operates the INFO button 45, shooting information etc. is displayed on the rear surface monitor 23.

Figure 2A:
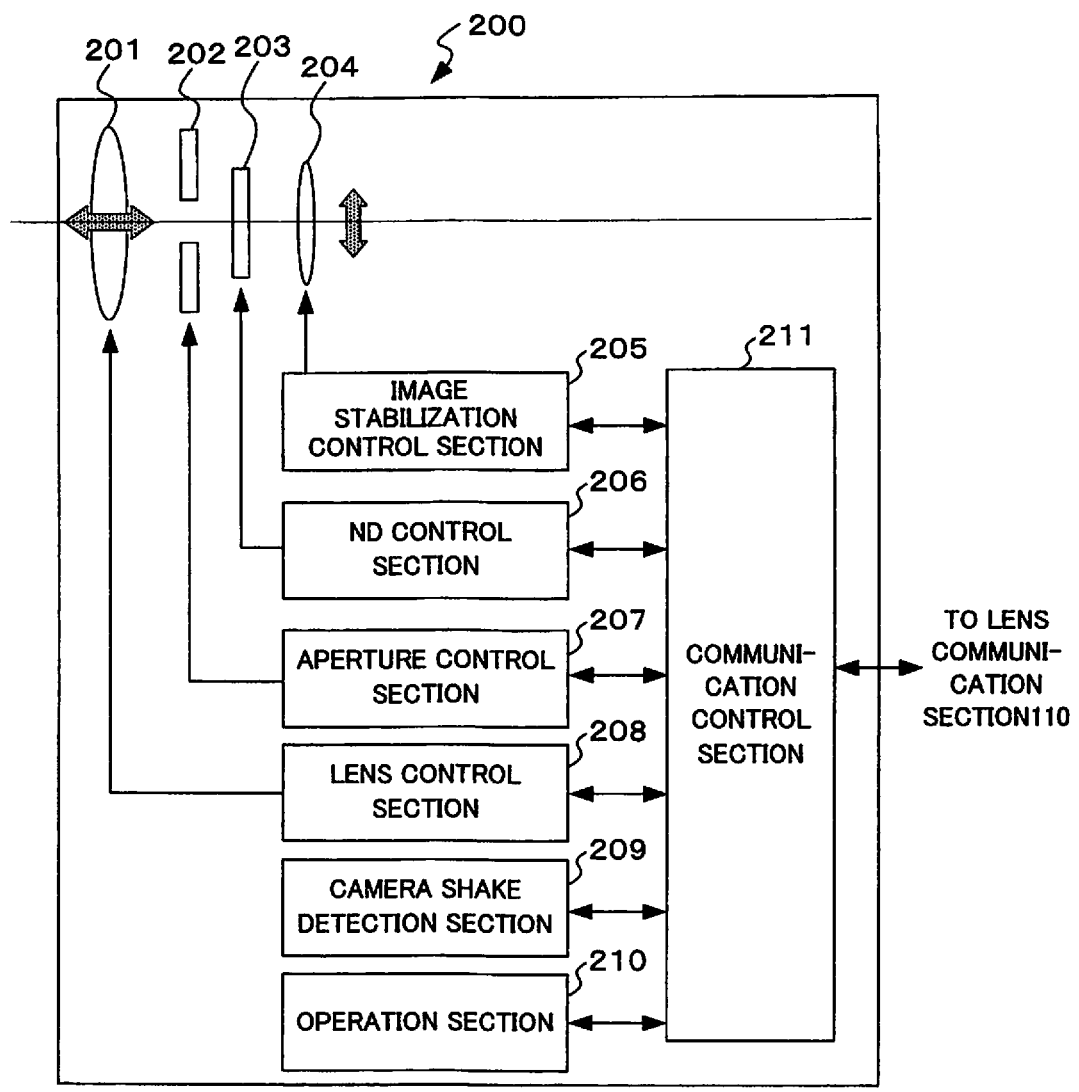
FIG. 2A and FIG. 2B are block diagrams mainly showing the electrical structure of a camera of one embodiment of the present invention.
Figure 2B:
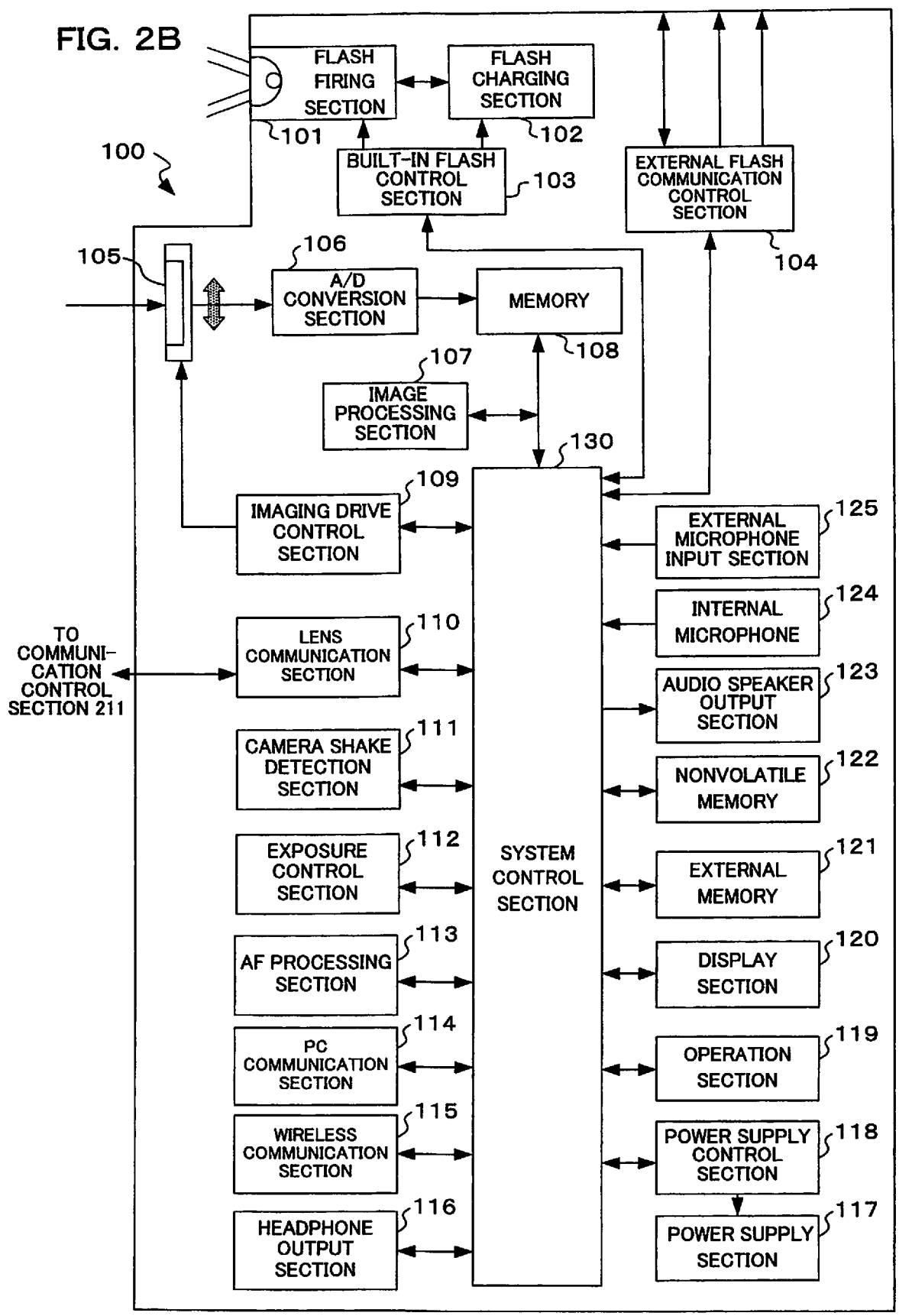

Next, the electrical structure of the camera of this embodiment will mainly be described using FIG. 2A and FIG. 2B. As was described previously, the camera 1 of this embodiment comprises the camera body 100 and the interchangeable lens 200, with the structure of the interchangeable lens 200 being shown in FIG. 2A, and the structure of the camera body 100 being shown in FIG. 2B.

A photographing lens 201 is arranged inside the interchangeable lens 200. Only a single optical lens is shown in FIG. 2A, but obviously the photographing lens 201 may comprise a plurality of optical lenses. The photographing lens 201 has, for example, a focus lens for adjusting the focus, and a zoom lens for adjusting focal length. The focus lens etc. is moved in the optical axis direction of the photographing lens 201 by a lens controller 208. Specifically, the focus lens is moved in the optical axis direction by the lens controller 208 so as to achieve focus. The lens controller 208 comprises a lens drive mechanism and a lens drive circuit, and adjusts focused position of the focus lens based on control signals from a system control section 130 within the camera body 100 by means of a communication control section 211 and a lens communication section 110.

An aperture 202, ND filter 203, and an image stabilization optical system 204 are arranged on the optical axis of the photographing lens 201. The aperture 202 adjusts an amount of light that passes through the photographing lens 201 by changing the aperture using an aperture control section 207. The aperture control section 207 comprises an aperture drive mechanism and an aperture drive circuit, and adjusts aperture value (aperture) of the aperture 202 based on control signals from the system control section 130 within the camera body 100 by means of the communication control section 211 and the lens communication section 110.

The ND (Neutral Density) filter 203 changes light amount that is passed without changing the color of a photographed object. The ND filter 203 is inserted into or removed from the optical axis of the photographing lens 201 and ND control section 206. The ND control section 206 comprises an ND filter inserting and removing mechanism and an ND filter drive circuit, and performs insertion and removal of the ND filter 203 on the optical axis based on control signals from the system control section 130 within the camera body 100, by means of the communication control section 211 and the lens communication section 110. When subject brightness is too bright, the ND filter 203 is inserted on the optical axis, while when the subject brightness is dark the ND filter 203 is withdrawn from the optical axis. As a result of this control is possible to control incident light amount on the image sensor 105 without changing depth of field. It should be noted that in the case of movie shooting, it is desirable for the ND filter 203 to quickly and continuously change concentration silently during shooting, and so an electronic concentration control device may be adopted, such as electrochromic elements or liquid crystal.

The image stabilization optical system 204 is moved within a plane that is orthogonal to the optical axis of a photographing optical system 201 by an image stabilization control section 205, to remove the effects of camera shake. Specifically, a camera shake detection section 209 detects camera shake that is applied to the interchangeable lens 200, and transmits camera shake detection signals to the system control section 130 within the camera body 100 by means of the communication control section 211 and the lens communication section 110. The system control section 130 generates a camera shake control signal for reducing camera shake based on the camera shake detection signal, and this camera shake control signal is transmitted to the image stabilization control section 205 by means of the lens communication section 110 and the communication control section 211. The image stabilization control section 205 has a drive mechanism and drive circuits for driving a shake correction optical system, and controls position of the image stabilization optical system 204 based on the camera shake control signal that has been generated by the system control section 130. It should be noted that within the camera body 100 also, position of the image sensor 105 is controlled by a camera shake detection section 111 and imaging drive control section 109, so as to remove the effects of camera shake.

An operation section 210 detects operating state of the image stabilization on/off switch provided outside the previously described interchangeable lens 200, and the result of this detection is transmitted to the system control section 130 by means of the communication control section 211 and the lens communication section 110. The system control section 130 executes image stabilization in accordance with a shake correction mode that has been set using the previously described image stabilization on off switch, and image stabilization button 39. The operation section 210 detects operating states of operation members other than the image stabilization button 39, such as a zoom ring, and transmits results to the system control section 130.

The communication control section 211 comprises a communication circuit and a processor such as a CPU (Central Processing Unit), and performs communication with the system control section 130 by means of the lens communication section 110 within the camera body 100. The communication control section 211 transmits various information such as aperture value, focus position, focal length, camera shake detection value etc. for within the interchangeable lens 200 to the system control section 130 within the camera body 100. The communication control section 211 also receives control signals from the system control section 130, and transmits control signals to the image stabilization control section 205, ND control section 206, aperture control section 207, and lens controller 208 etc.

Inside the camera body 100, an image sensor 105 is arranged on the optical axis of the photographing lens 201. The image sensor 105 comprises a CCD image sensor or a CMOS image sensor etc., and an imaging drive circuit, and subjects a subject image that has been formed by the photographing lens 201 to photoelectric conversion and outputs an image signal to an A/D conversion section 106.

The image sensor 105 is moved within a plane that is orthogonal to the optical axis of the photographing lens 201 in the X direction and Y direction, by the imaging drive control section 109, and is rotated within a plan that is orthogonal about the optical axis. The imaging drive control section 109 has a drive mechanism (including an actuator) and a drive circuit, for spatially driving the image sensor 105. It is possible to remove camera shake (image stabilization), and to align a bottom line of an image frame of a taken image with a horizontal line (automatic horizontal correction) as a result of this movement in the X and Y directions, and rotation. In the case of performing automatic horizontal correction, the image sensor 105, or an output image of the image sensor 105, is rotated about the optical axis of the image sensor by a first angle so as to be corrected horizontally with respect to an image frame (refer, for example, to S73 in FIG. 5A). Also, in the case of performing image stabilization due to rotational blur, the image sensor is rotated about the optical axis so as to remove camera shake, based on detection results of a blur detection section 111 (refer, for example, to S75 in FIG. 5A, and to S99 and S119 in FIG. 5B). Also, after automatic horizontal correction has been performed, there are cases where an image frame of an output image is blurred with respect to the horizontal direction due to the effects of camera shake, and so in this case also an image sensor drive control section 109 rotates the image sensor about the optical axis of the photographing lens 201 and performs correction so that the image frame is kept in a state where it is aligned with the horizontal direction (refer, for example, to S73 and S75 in FIG. 5A).

The imaging drive control section 109 functions as an image sensor drive actuator (image sensor drive section) that rotates the image sensor about the optical axis, based on detection result from an angular speed detection section or calculation result from a horizontal angle calculation section. Also, the imaging drive control section 109 functions as an image sensor drive section (actuator) that rotates the image sensor about the optical axis, when a horizontal correction instruction has been issued from a horizontal correction instruction section (refer, for example, to S73 in FIG. 5A). There are at least two rotational ranges for the image sensor being rotated by the image sensor drive section, being a rotational range for executing horizontal correction, and a rotational range for executing camera shake prevention based on result of detection by an angular speed detection section (refer, for example, to S73 and S75 in FIG. 5A). Rotational ranges for the image sensor being rotated by the image sensor drive section have at least two levels of rotational response range, such as a rotational response range for executing horizontal correction and a rotational response range for executing camera shake prevention based on results of detection by and angular speed detection section (refer, for example, to S73 and S75 in FIG. 5A).

Figure 5A:
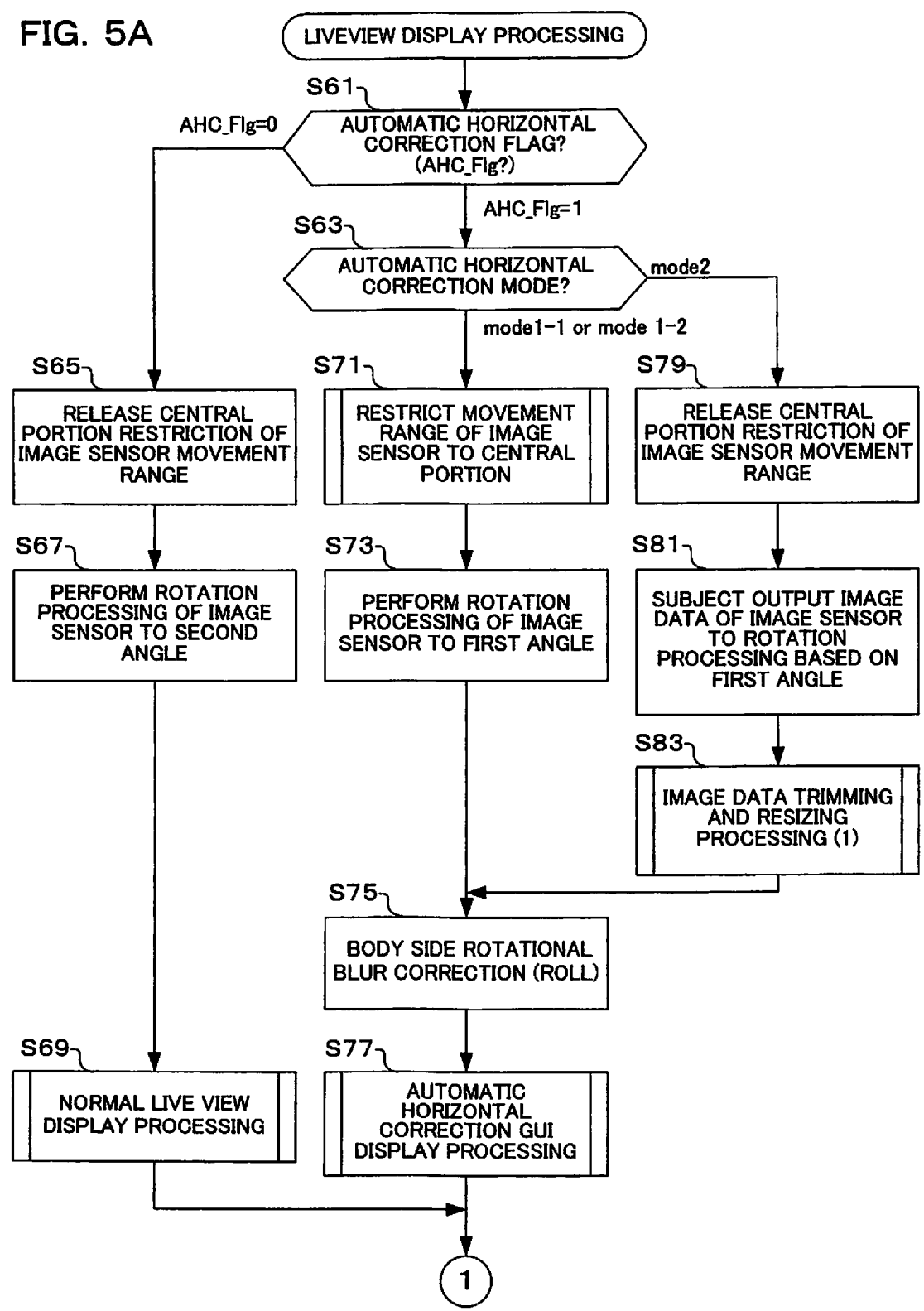
FIG. 5A and FIG. 5B are flowcharts showing live view display processing of the camera of one embodiment of the present invention.
Figure 5B:
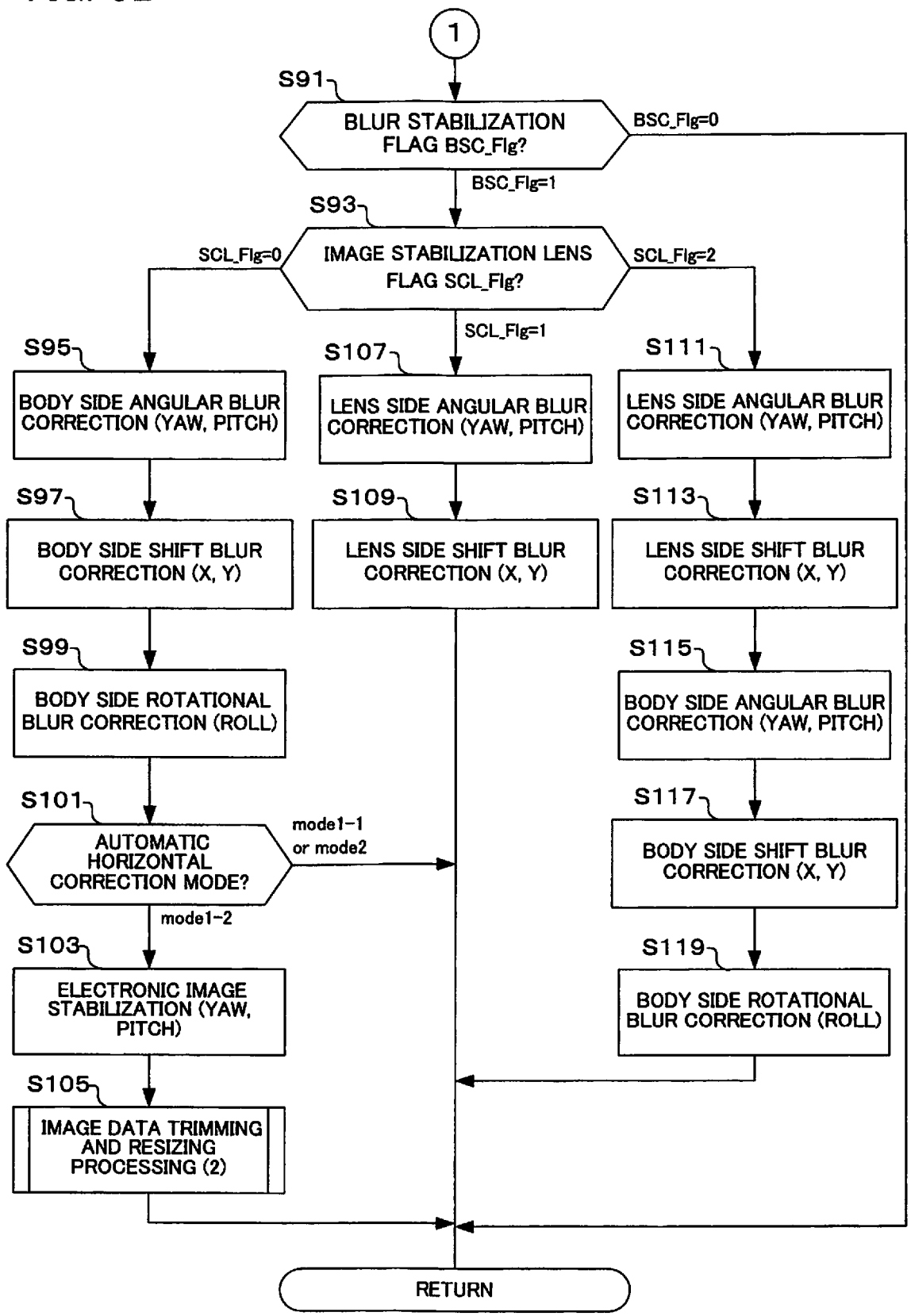

The image sensor drive section (actuator) 109 comprises an actuator for image sensor angular rotation (image sensor angular rotation section) that causes rotational drive of the image sensor in a direction around the optical axis so that there is no difference between calculation result of the horizontal angle calculation section and an angle of the image sensor at the current point in time (refer, for example, to S73 in FIG. 5A), and an actuator for rotational blur correction (rotational blur correction section) for correcting rotational blur by rotating the image sensor in a direction around the optical axis based on output of the angular speed detection section (refer, for example, to S75 in FIG. 5A, and S99 and S119 in FIG. 5B).

Figure 10A:
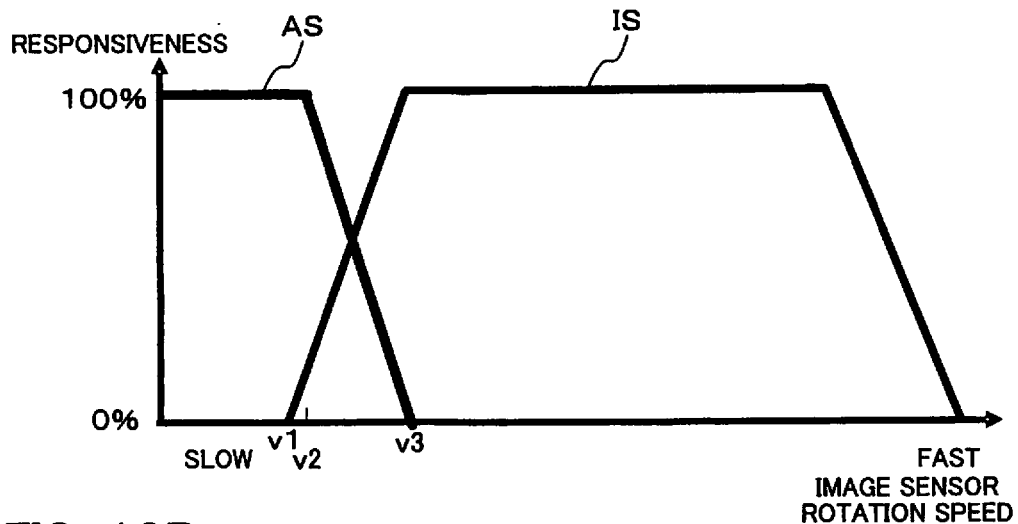
FIG. 10A is a graph show an example of response characteristics due to first angle setting and rotational blur correction, in a case where there is normal camera shake, in the camera of one embodiment of the present invention.
Figure 10B:
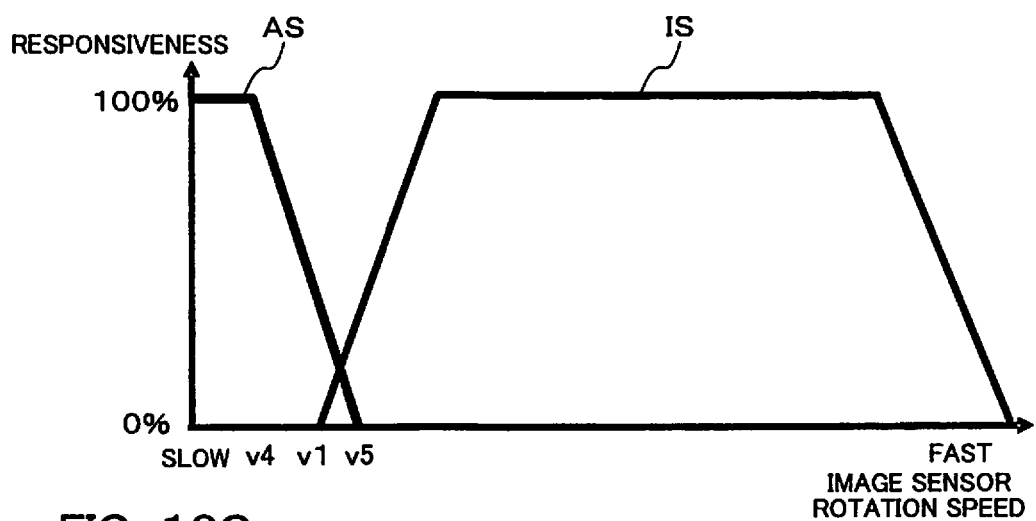
FIG. 10B is a graph show an example of response characteristics due to first angle setting and rotational blur correction, in a case where camera shake is intense, in the camera of one embodiment of the present invention.
Figure 10C:
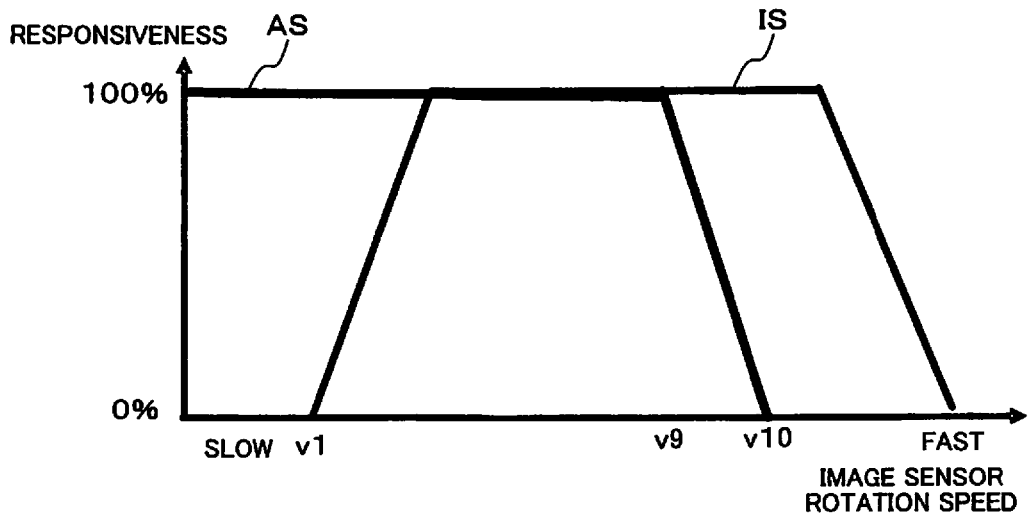
FIG. 10O is a graph show an example of response characteristics due to first angle setting and rotational blur correction, in a case where camera shake is small, in the camera of one embodiment of the present invention.

The actuator for image sensor angular rotation (image sensor angular rotation section) causes rotational drive of the image sensor at a rotational speed that is slower than the actuator for rotational blur correction (rotational blur correction section) (slowly) (refer, for example, to FIG. 10A to FIG. 10C). The actuator for image sensor angular rotation (image sensor angular rotation section) rotates the image sensor faster as camera shake amount become smaller (refer, two example, to FIG. 10A to FIG. 10C).

The A/D conversion section 106 has an A/D conversion circuit, and subjects an image signal that has been output by the image sensor 105 to AD conversion and outputs image data to a memory 108. The memory 108 is a memory such as an SDRAM (Synchronous Dynamic Random Access Memory), and stores image data etc.

The memory 108 is connected to an image processing section 107 and the system control section 130. The image processing section 107 has an image processing circuit, and performs various image processing on image data that has been stored in the memory 108. As image processing there are image processing such as exposure correction and noise processing, WB gain correction, edge enhancement, false color correction etc. Further, the image processing section 107 also performs processing (development processing) to convert image data that has been subjected to the above described image processing to a stored data format etc.

Image data that has been subjected to image processing is output to the memory 108, stored once again, or output to the system control section 130. Image data that has been output to the system control section 130 is output to a display section 120 etc., and output to external memory 121. The image processing section 107 also performs electronic image stabilization processing, trimming processing for image data, resizing processing etc. (refer, to S81 and S83 in FIG. 5A, S103 and S105 in FIG. 5B, and to FIG. 11 and FIG. 12).

The system control section 130 is a processor having a CPU or the like, and controls each section within the camera body 100, and controls a section within the interchangeable lens 200 by means of the lens communication section 110 and the communication control section 211. The CPU controls each of the sections described above in accordance with programs stored in nonvolatile memory 122. As well as being connected to the previously described imaging drive control section 109, lens communication section 110, image processing section 107, and memory 108, the system control section 130 is also connected to the camera shake detection section 111, exposure control section 112, AF processing section 113, PC communication section 114, wireless communication section 115, headphone output section 116, power supply control section 118, operation section 119, external memory 121, nonvolatile memory 122, audio speaker output section 123, internal microphone 124, external microphone input section 125, and built-in flash control section 103.

The system control section 130 performs overall control of the camera 1, as described previously. As part of the overall control, control of an image stabilization function and an automatic horizontal correction function are performed (refer, for example, to FIG. 5A and FIG. 5B). The system control section 130 functions as a horizontal angle calculation section (horizontal angle calculation circuit or processor) that detects vertical direction or horizontal direction of the imaging device or the image sensor, and calculates and outputs a first angle around the optical axis of the image sensor in order to horizontally correct the image sensor or an output image of the image sensor with respect to an image frame. The system control section 130 also functions as a movement range restriction section (processor), that, at the time of shooting standby, when rotating the image sensor, based on detection result from the angular speed detection section or calculation result from the horizontal angle calculation section, restricts a region in which the image sensor is capable of moving to a first region that includes a central region of the optical axis, so as to maximize an angular range in which the image sensor can rotate (refer, for example, to S71 in FIG. 5A). Also, the system control section (processor) 130 causes the movement range restriction section to set a region in which the image sensor is capable of moving to a second region that is wider than at the time of shooting standby, and includes the first region, based on instruction of a shooting instruction section (refer, for example, to S261 in FIG. 20, and S281 in FIG. 22A).

The system control section 130 functions as a horizontal angle calculation section (horizontal angle calculation circuit or processor) that switches between and outputs either of the first angle and the second angle based on instruction of a horizontal correction instruction section (refer, for example, to S67, S73, and S81 in FIG. 5A).

Figure 6:
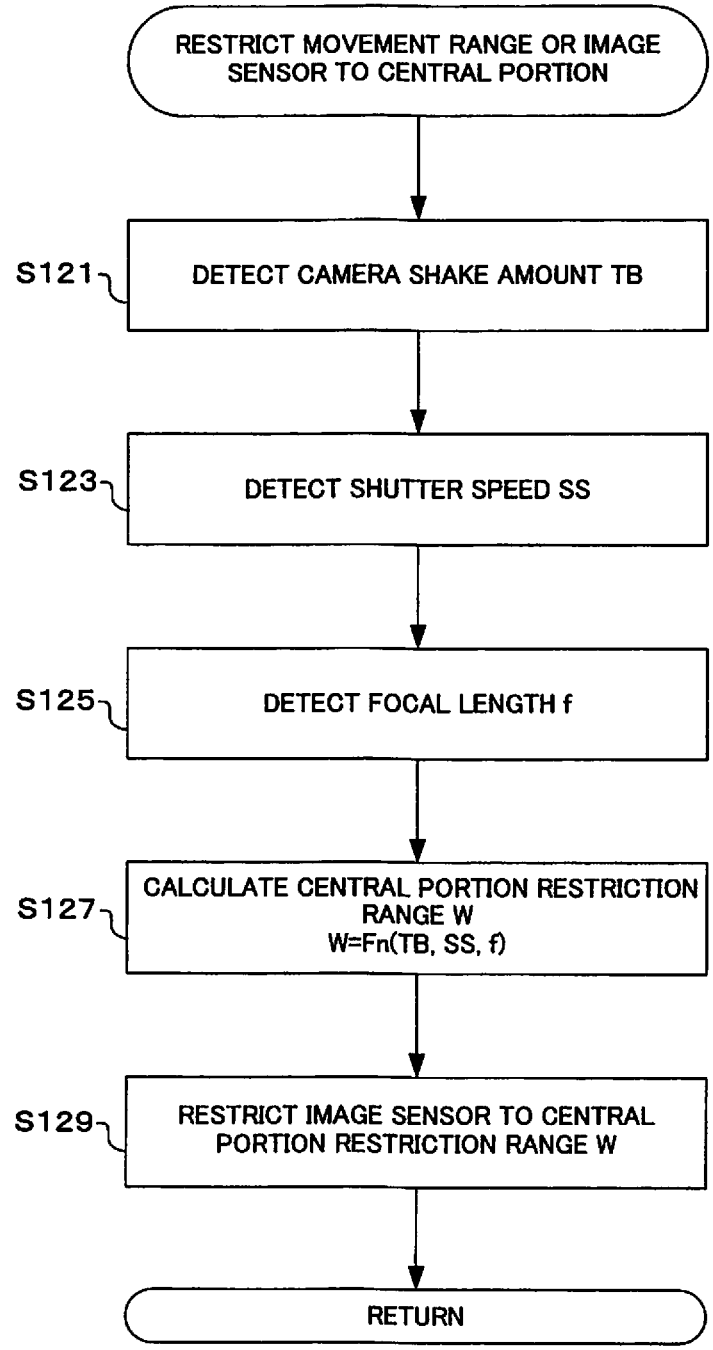
FIG. 6 is a flowchart showing operation to restrict movement range of an image sensor to a central portion, for the camera of one embodiment of the present invention.
Figure 7A:
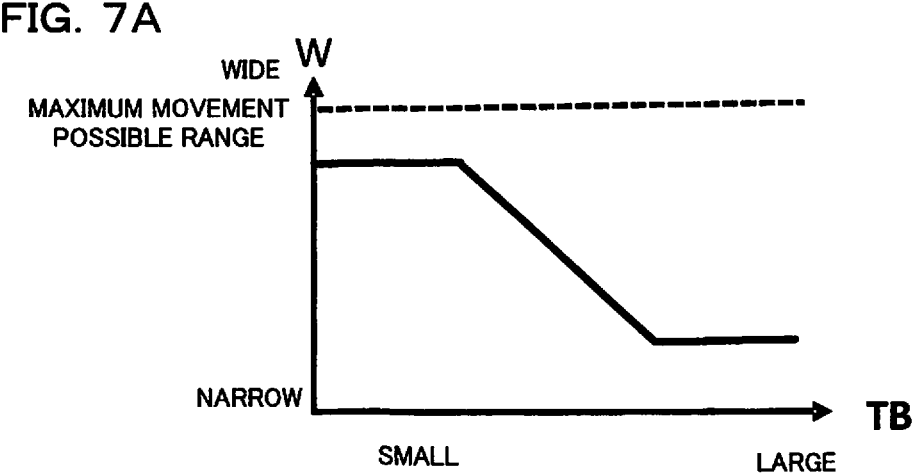
FIG. 7A is a graph showing a relationship between central portion restricted range W and camera shake amount TB, in the camera of one embodiment of the present invention.

The above described movement range restriction section (processor) relaxes restriction with shooting standby in progress as an amount of image stabilization becomes smaller (refer, to S121 and S127 in FIG. 6, and to FIG. 7A). The movement range restriction section (processor) relaxes restriction with shooting standby in progress as shutter speed becomes faster (refer, for example, to S123 and S127 in FIG. 6, and to FIG. 7B). The movement range restriction section (processor) relaxes restriction with shooting standby in progress as focal length becomes shorter (refer, for example, to S125 and S127 in FIG. 6, and to FIG. 7C). The movement range restriction section (processor) relaxes restriction with shooting standby in progress after there is no longer a difference between a calculation result from the horizontal angle calculation section and angle of the image sensor at the current point in time.

The lens communication section 110 has a communication circuit, and is connected to the communication control section 211 within the interchangeable lens 200. The lens communication section 110 transmits control signals from the system control section 130 to the communication control section 211, and receives signals from the communication control section 211 before outputting them to the system control section 130.

The camera shake detection section 111 has camera shake sensors (angular speed sensors and acceleration sensors etc.) that can detect angular speed (Yaw, Pitch, Roll) and acceleration (X, Y, Z) that have been applied to the camera, and a detection circuit that detects output of these camera shake detection sensors. The camera shake detection section 111 outputs camera shake detection signals to the system control section 130, and the system control section 130 outputs control signals for driving the image sensor 105 in a direction to counteract Yaw, Pitch, Roll, X, and Y camera shake movement to the imaging drive control section 109 based on the camera shake detection signals. The camera shake detection section 111 functions as an angular speed detection sensor (angular speed detection section or camera shake detection sensor) for detecting angular speed of the imaging device. The camera shake detection section 111 also has a function not only to detect shift amount due to horizontal movement of the camera and angular blur due to angular change of the camera, but also to detect gravitational acceleration, detect vertical direction or horizontal direction of the camera, and output detection results using a spirit level.

Also, the camera shake detection section 111 detects angular speed in a Roll direction of the camera, and when performing rotational blur correction (refer, for example, to S75 in FIG. 5A and S99 and S119 in FIG. 5B) performs signal output using filter processing having faster responsiveness than automatic horizontal correction (refer to FIG. 10A, FIG. 10B, and FIG. 10O), and performs correction based on the signal output. On the other hand, when performing automatic horizontal correction by detecting gravitational acceleration and then detecting vertical direction or horizontal direction of the camera (refer to S73 and S81 in FIG. 5A) the camera shake detection section 111 performs signal output with filter processing of slow responsiveness (refer to FIG. 10A, FIG. 10B, and FIG. 10C), that is different from the responsiveness for detecting rotational blur, in order not to react sensitively to noise components caused by camera shake. In this way, the camera shake detection section 111 has a function to switch responsiveness of detection or rotational control for the purpose of rotational blur correction and automatic horizontal correction. Responsiveness of signal output of the camera shake detection section 111 is controlled using control signals output by the system control section 130, but it is also possible to use a gravitational acceleration sensor that has slower responsiveness than a camera shake sensor instead of filter processing.

The exposure control section 112 calculates subject brightness based on image data that has been acquired by the image sensor 105, and calculates exposure control values such as aperture value, electronic shutter speed value, ISO sensitivity value etc. to achieve appropriate exposure based on this subject brightness. Then, based on the exposure control values that have been calculated, control of aperture, electronic shutter, and ISO sensitivity are performed by means of the system control section 130. Also, at the time of controlling to correct exposure, insertion or removal of the ND filter 203 into or from the optical path is also performed. Further, in a case where the camera has a mechanical shutter, control may also be performed using shutter speed to achieve appropriate exposure.

The AF processing section 113 extracts a so-called contrast signal based on image data that has been acquired by the image sensor 105, and controls the focus lens so that this contrast signal becomes a peak. It should be noted that in a case where a sensor for phase difference AF b is provided on an imaging plane of the image sensor 105, the AF processing section 113 may calculate defocus amount of the focus lens, and control the focus lens based on this defocus amount.

A PC (personal computer) communication section 114 has terminals such as a USB terminal, and a communication circuit, and performs communication with a PC that is external to the camera 1. For example, image data that has been stored in memory such as the external memory 121 or memory 108 may be output to the external PC by means of the PC communication section 114 and conversely image data may be input from the external PC.

The wireless communication section 115 has a wireless communication circuit for performing wireless communications such as Wi-Fi, and performs wireless communication etc. with external devices. For example, image data that has been stored in memory such as the external memory 121 or memory 108 may be output to the external PC by means of the wireless communication section 115, and conversely image data may be input from the external PC.

The headphone output section 116 has a headphone output circuit and an output terminal, and outputs an audio signal externally based on audio data that has been stored together with image data. An external microphone 125 has an input terminal for input of an audio signal and/or audio data from an external microphone, and a signal (data) processing circuit, and is input with an audio signal (audio data) from the external microphone.

The internal microphone 124 has a microphone for audio signal generation, and an audio signal processing circuit etc. The internal microphone 124 is provided for the purpose of also additionally storing audio at the time of movie storage. The audio speaker output section 123 has an audio data processing circuit and a speaker. This speaker plays back audio data that has been stored together with image data.

The nonvolatile memory 122 is memory such as an electrically rewritable flash ROM, and stores various adjustment values for the camera body 100, and programs to operate the CPU within the system control section 130. As various adjustment values, for example, a second angle (refer to FIG. 9) representing an installation error of the image sensor 105 is stored. The nonvolatile memory 122 (or memory within the system control section 130) functions as a reference angle memory (reference handle storage section) that stores a second angle indicating a reference angle about the optical axis of the image sensor (refer, for example, to S67 in FIG. 5A, and to FIG. 9).

The external memory 121 is an electrically rewritable nonvolatile memory that can be inserted into and taken out of the camera body 100. Image data that has been acquired by the image sensor 105 and subjected to image processing for storage is stored in the external memory 121.

The display section 120 has monitors of the previously described EVF 21 and rear surface monitor 23, and a display control circuit. The display section 120 displays live view images, playback images of stored images, and menu images etc. The display section 120 (rear surface monitor 23 or EVF 21) functions as a display (display section) for live view display. This display (display section) is capable of automatic horizontal correction valid display, indicating that there is a state where automatic horizontal correction has been performed (refer, for example, to S207 in FIG. 15B and F8 in FIG. 16D etc.), and automatic horizontal correction invalid display indicating that the live view being display is not in a state of having been subjected to automatic horizontal correction (refer, for example, to S205 in FIG. 15B and F7 and F8 in FIG. 16D). Also, this display (display section) is made capable of displaying an inclination amount display representing inclination amount of the imaging device (refer, for example, to Roll inclination display 120g in FIG. 16D) and a range display representing a range of inclination for which automatic horizontal correction is possible (refer, for example, to 120k in FIG. 16D).

The operation section 119 comprises various operation members such as the previously described shooting mode dial 25, shutter button 27, F dial 29f, R dial 29r, automatic horizontal correction button 35 and image stabilization button 37, and an operating state detection circuit, and detects operating states of these operation members and outputs detection results to the system control section 130. It should be noted that a touch panel may be provided on the rear surface monitor 23, with touch operations by the user on this search panel being detected and output to the system control section 130. Also, although not illustrated, the operation section 119 also has a power supply switch for turning a power supply on. The shutter button 27 and/or the AF button 37 within the operation section 119 function as a shooting instruction interface (shooting instruction section) for instructing preparation or commencement of shooting.

A power supply 117 has a power supply battery etc., and the power supply control section 118 controls supply of electrical power to the camera body 100 and the interchangeable lens 200 by adjusting voltage of the power supply 117.

A flash firing section 101 has a firing section such as a xenon tube, and irradiates flash light to a subject using power from a flash charging section 102. The flash charging section 102 boosts power supply voltage of the power supply 117 and charges the boosted voltage into a capacitor. The built-in flash control section 103 performs control of emission timing and light emission time in response to control signals from the system control section 130. An external flash communication control section 104 has a communication circuit (or communication terminal section), and outputs signals relating to emission timing and light emission time to an external flash unit that has been fitted to the camera body 100. It should be noted that the external flash unit may also be controlled by the camera body 100 using wireless communication.

Next, main operation of this embodiment will be described using the flowchart shown in FIG. 3. This flowchart (the same also applies to FIG. 4 to FIG. 6, FIG. 8A, FIG. 8B, FIG. 13 to FIG. 15B, and FIG. 17 to FIG. 24) is executed by the system control section 130 within the camera body 100 controlling each section within the camera body 100 and the interchangeable lens 200.

Figure 3:
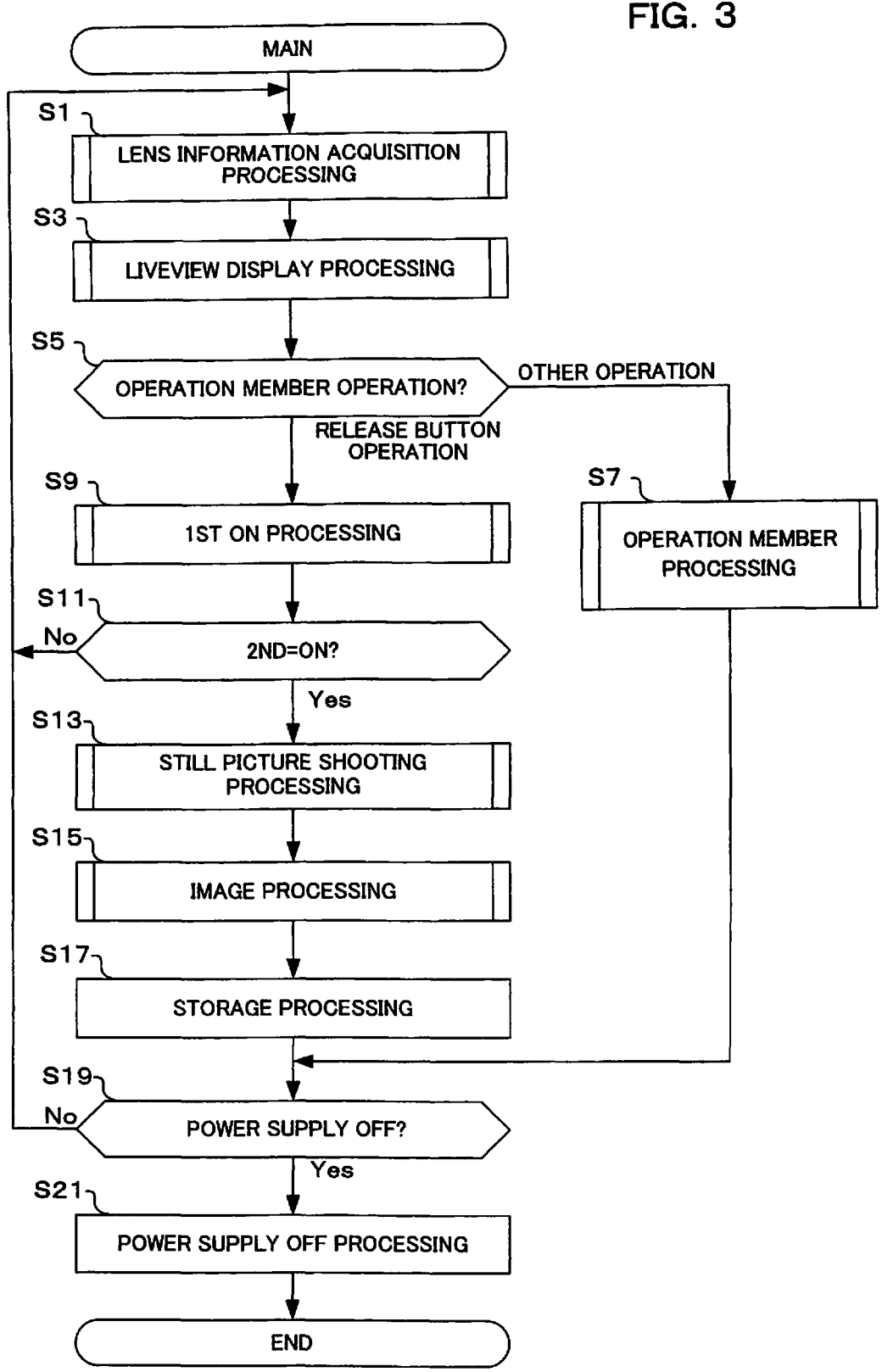
FIG. 3 is a flowchart showing main operation of the camera of one embodiment of the present invention.

If the power supply switch is turned on and the main flow shown in FIG. 3 is commenced, first, lens information acquisition processing is executed (S1). Here, the system control section 130 performs communication between the camera body 100 and the interchangeable lens 200 by means of lens mount pins that are provided in the interchangeable lens 200, and acquires lens information of the interchangeable lens 200. Also, among the lens information, as image stabilization associated information the system control section 130 acquires information such as whether or not a lens that is attached is an image stabilization lens, whether or not an image stabilization method is "lens and body collaborative image stabilization", whether or not there is an "image stabilization switch" at the lens side, whether a lens side "image stabilization switch" is on or off, and "number of image stabilization steps (image stabilization capability)" for every focal length at the lens side.

It should be noted that lens and body collaborative image stabilization is performing image stabilization collaboratively in both the camera body 100 and the interchangeable lens 200. Specifically, lens and body collaborative image stabilization is a method of moving both an image stabilization correction optical system 204 within the interchangeable lens 200, and the image sensor 105 within the camera body 100 in directions that eliminate camera shake. This means that if lens and body collaborative image stabilization is set, image stabilization capability in Yaw and Pitch directions becomes at least better than the image stabilization capability of only a lens, or only a camera. Detailed operation of the lens information acquisition processing will be described later using FIG. 4.

Once lens information has been acquired, next, live view display processing is performed (S3). Here, the system control section 130 acquires image data from the image sensor 105, this image data is subjected to image processing for live view display by the image processing section 107, and a live view image is displayed on the rear surface monitor 23 or the EVF 21 of the display section 120. This live view display is updated every time according to frame rate. Also, in a case where the automatic horizontal correction button 35 within the operation section 119 is operated and automatic horizontal correction is turned on (refer to step S7, and to S211 in FIG. 17), "live view display for automatic horizontal correction" is displayed (refer, for example, to FIG. 11 to FIG. 14, FIG. 16C, and FIG. 16D). Detailed operation of the live view display processing will be described later using FIG. 5A and FIG. 5B.

If live view display processing is performed, it is next determined whether or not there has been operation using the operation members (S5). Here, the system control section 130 determines whether or not any of various operation members within the operation section 119, for example, various operation members such as the shooting mode dial 25, shutter button 27, F dial 29f, R dial 29r, automatic horizontal correction button 35, and image stabilization button 37, have been operated.

If the result of determination in step S5 is that an operation member other than the shutter button has been operated, operation member processing is executed (S7). Here, processing corresponding to the operation member that has been operated is executed. For example, in a case where the shooting mode dial 25 has been operated, setting processing for a shooting mode that has been designated by the user is performed. Also, setting of an automatic horizontal correction flag AHC_Flg is performed in response to operation of the automatic horizontal correction button 35, and setting of an blur stabilization flag BSC_Flg is performed in response to operation of the image stabilization button 37. Detailed operation of this operation member processing will be described later using FIG. 17.

On the other hand, if the result of determination in step S5 is that the shutter button has been operated, 1st ON processing is executed (S9). If the shutter button is pressed down halfway, specifically, if the 1st release switch is turned on, the system control section 130 executes 1st ON processing. As 1st ON processing, for example, AF processing to perform focusing of the focus lens within the photographing lens 201, and calculation of exposure control values such as aperture value and shutter speed to attain appropriate exposure, are performed. Detailed operation of this 1st ON processing will be described later using FIG. 20.

Once 1st ON processing has been performed, it is next determined whether or not the 2nd release switch is on (S11). Once the user has determined composition, they press the shutter button 27 down fully in order to shoot a still picture. In this step, the system control section 130 determines whether or not the shutter button has been pressed down fully and the 2nd release switch has been turned on based on a detection signal from the operation section 119. If the result of this determination is that the 2nd release switch is off, step S1 is returned to.

On the other hand, if the result of determination in step S11 is that the 2nd release switch is on, still picture shooting processing is executed (S13). Here, the system control section 130 performs actual exposure in accordance with exposure control values for shooting at the appropriate exposure, that were calculated at the time of 1st ON processing. Once the exposure time has elapsed, the system control section 130 reads out image data from the image sensor 105. Detailed operation of the still picture shooting processing will be described later using FIG. 21.

Once still picture shooting processing is complete, next, image processing is performed (S15). Here, the image processing section 107 applies image processing for storage to image data that has been read out from the image sensor 105. In a case where the automatic horizontal correction button 35 has been operated and automatic horizontal correction has been set, image processing for automatic horizontal correction is further applied, depending on automatic horizontal correction mode. Detailed operation of the image processing will be described later using FIG. 23.

Once image processing has been performed, next, storage processing is executed (S17). Here, the system control section 130 stores image data that has been subjected to image processing by the image processing section 107 in the external memory 121.

Once storage has been performed, it is next determined whether or not the power supply is off (S19). Here, the system control section 130 determines whether or not the power supply switch within the operation section 119 has been turned off. If the result of this determination is that the power supply switch is on, step S1 is returned to.

On the other hand, if the result of determination in step S19 is that the power supply is off, power supply off processing is executed (S21). Here, the system control section 130 executed processing for power supply off, and the power supply is placed in an off state. Once the power supply off processing has been executed, the flow for main operation shown in FIG. 3 is terminated.

Next, detailed operation of the lens information acquisition processing of step S1 (refer to FIG. 3) will be described using the flowchart shown in FIG. 4.

If the flow for lens information acquisition processing is commenced, first, lens communication is performed (S31). Here, the system control section 130 commences communication between the camera body 100 and the interchangeable lens 200 by means of the lens communication section 110 and lens mount pins.

If lens communication has been commenced in step S31, lens basic information is next acquired (S33). Here, the system control section 130 acquires basic information of the lens using communication between the camera body 100 and the interchangeable lens 200. As basic information there are, for example, lens product name, lens serial No., lens FNo. (from minimum value to maximum value), minimum shooting distance, nominal focal length, lens color temperature, and lens feed pulse amount from the infinity end to the close-up end. etc.

Once lens basic information has been acquired, next, lens side image stabilization information is acquired (S35). Here, the system control section 130 further acquires information relating to image stabilization of the interchangeable lens 200 using lens communication. As this lens side image stabilization information, the interchangeable lens 200 acquires information relating to
whether there is an image stabilization function,
whether there is an image stabilization on/off switch, and
whether there is a BLC image stabilization function.

Here, the BLC image stabilization function is a function for performing an image stabilization operation where there is collaboration between lens side image stabilization and body side image stabilization, that has a larger correction effect than either on its own.

With the example that was shown in FIG. 1 and FIG. 2A, the interchangeable lens 200 is provided with an image stabilization correction optical system 204, camera shake detection section 209, and image stabilization on/off switch. However, as an interchangeable lens that is fitted to the camera body 100 there may be cases where the lens does not have an image stabilization function, and there may be cases where the lens does not have an image stabilization on/off switch even if it does have an image stabilization function. In step S35, therefore, information relating to whether there is an image stabilization function is acquired by the system control section 130.

Once the lens side image stabilization information has been acquired, it is next determined whether or not an image stabilization lens is attached (S37). Here, based on the lens side image stabilization information that was acquired in step S35, determination is performed as to whether the interchangeable lens that is attached is a "non-image stabilization lens" that is not provided with an image stabilization function, or if the interchangeable lens is an "image stabilization lens (without collaborative operation)", which is an image stabilization lens that is not provided with a collaborative operation function, or if the interchangeable lens is an "image stabilization lens (with collaborative function)", which is an image stabilization lens that is provided with a collaborative operation function.

If the result of determination in step S37 is that the interchangeable lens that is attached is not an image stabilization lens, specifically in the case of a non-image stabilization lens, "0" is set as an image stabilization lens flag SCL_Flg (S39). Also, in a case where the interchangeable lens that has been attached is an image stabilization lens without collaborative operation, "1" is set as the image stabilization lens flag SCL_Flg (S41). Also, in a case where the interchangeable lens that has been attached is an image stabilization lens with collaborative operation, "2" is set as the image stabilization lens flag SCL_Flg (S43).

If the image stabilization lens flag SCL_Flg has been set in steps S39 to S43, it is next determined whether or not there is a lens side image stabilization button (S45). It should be noted that the lens side image stabilization button means the previously described image stabilization on/off switch. In many cases where there is a lens side image stabilization button, there is a status switch such as a slide switch. In this step S45, it is determined whether or not the interchangeable lens 200 that has been attached is provided with an image stabilization button based on the lens side image stabilization information that was acquired in step S35.

If the result of determination in step S45 is that an image stabilization button is not provided, "0" is set as a lens side image stabilization button flag SCLB_Flg (S47). On the other hand, if an image stabilization button is provided, "1" is set as a lens side image stabilization button flag SCLB_Flg (S49).

If the lens side image stabilization button flag SCLB_Flg has been set in step S47 or S49, it is next determined whether or not lens side image stabilization is on (S51). Here, determination as to whether the image stabilization button of the interchangeable lens that is attached has been turned on or has been turned off is based on the lens side image stabilization information that was acquired in step S35.

If the result of determination in step S51 is that an image stabilization button is not on, specifically, if the image stabilization button is off, "0" is set as a lens side image stabilization flag LSC_Flg (S53). On the other hand, if the image stabilization button is on, then "1" is set as the lens side image stabilization flag LSC_Flg (S55). Once the lens side image stabilization flag LSC_Flg has been set in step S53 or S55, the originating flow is returned to.

Next, detailed operations of the live view display processing in step S3 (refer to FIG. 3) will be described using the flowcharts shown in FIG. 5A and FIG. 5B.

If the flow for live view display processing is commenced, first of all the automatic horizontal correction flag AHC_Flg is judged (S61). As was described previously, the automatic horizontal correction button 35 is arranged on the camera body 100. If the automatic horizontal correction button 35 is press down then automatic horizontal correction is turned on, and if the automatic horizontal correction button 35 is pressed down again automatic horizontal correction is turned off. The system control section 130 sets "1" in the automatic horizontal correction flag AHC_Flg if automatic horizontal correction is on, and sets "0" in the automatic horizontal correction flag AHC_Flg if automatic horizontal correction is off (refer to S211 and S213 in FIG. 17, and to S227 to S231 in FIG. 18). In this step, determination is based on the set value of this automatic horizontal correction flag AHC_Flg.

If the result of determination in step S61 is that the automatic horizontal correction flag AHC_Flg=0, specifically that the automatic horizontal correction button 35 is off, central portion restriction of the movement range of the image sensor is released (S65). As will be described later, when automatic horizontal correction is set, movement range of the image sensor is restricted to a central portion (refer to S71 etc.). However, since the result of determination in step S61 is that automatic horizontal correction will not be performed, in a case where movement range of the image sensor has been restricted to a central portion, this restriction is released.

Next, the image sensor is subjected to rotation processing to a second angle (S67). The image sensor 105 is positioned so that the bottom of the frame of a taken image that has been acquired by the image sensor 105 becomes parallel to the bottom of the camera body 100. However, when the image sensor 105 is actually fitted at the factory, slight error will arise. This attachment error is measured at the time of factory shipment, and stored in the nonvolatile memory 122 as a second angle (refer to FIG. 9). In this step, the system control section 130 reads out the second angle from the nonvolatile memory 122, and the imaging drive control section 109 rotationally drives the image sensor 105 so as to be aligned with the second angle. As a result of this rotational drive, the bottom of the frame of a shooting screen is substantially aligned with a bottom surface of the camera body 100 (tripod attachment surface B (refer to FIG. 9)).

Once rotational processing so that the image sensor reaches the second angle has been performed, next, normal live view display is performed (S69). Here, the system control section 130 reads out image data from the image sensor 105, and displays a live view image on the display section 120 (EVF 21 or rear surface monitor 23) based on this image data that has been subjected to image processing for live view by the image processing section 107.

Returning to step S61, if the result of determination in this step is that the automatic horizontal correction flag AHC_Flg=1, namely that the automatic horizontal correction button 35 is on, and that automatic horizontal correction processing will be performed, next the type of automatic horizontal correction mode is determined (S63). With this embodiment, three automatic leveling modes are provided, namely mode 1-1, mode 1-2, and mode 2, and either mode is set using a menu screen displayed on the display section 120.

Automatic horizontal correction modes mode 1-1 and mode 1-2 are modes in which horizontal correction is performed by the imaging drive control section 109 mechanically rotating the image sensor 105. However, in mode 1-2, in a case where the interchangeable lens that is attached does not have an image stabilization correction optical system 204, electronic image stabilization is performed during live view display. Also, in the automatic horizontal correction mode of mode 2, the image sensor 105 is not mechanically rotated, and automatic horizontal correction is performed by rotating image data using image processing.

Specifically, in mode 1-1 and mode 1-2 automatic horizontal correction is realized by mechanically rotating the image sensor 105. It is therefore desirable for the rotational center of the image sensor 105 to be close to the optical axis of the photographing lens 201. As a result of this, movement range is restricted when performing image stabilization by moving the image sensor, and there is a risk of not obtaining a sufficient image stabilization effect for live view. Therefore, at the time of image stabilization (and in a case where the interchangeable lens does not have an image stabilization optical system), mode 1-2 performs electronic image stabilization. In a case where mode 1-2 is set, if electronic image stabilization is performed a live view image is cut out from within image data (trimming processing), and so the shooting angle of view is narrowed. Similarly, in a case where mode 2 is set, a live view image is cut out from within image data (trimming processing), and so the shooting angle of view is narrowed (refer to FIG. 11 and FIG. 12). This means that although this embodiment is configured so that it is possible for the photographer to intentionally select mode 1-2 or mode 2, it may also be configured so that the modes are automatically switched in accordance with live view conditions at the time of shooting standby. In particular, automatically switching mode is preferable with a large telephoto system with which the effects of camera shake are more significant.

If the result of determination in step S63 is mode 1-1 or mode 1-2, then movement range of the image sensor is restricted to a central portion (S71). In the event that the mode has been sent to either of mode 1-1 or mode 1-2, then as was described previously automatic horizontal correction is implemented by rotating the image sensor 105. Rotation of the image sensor 105 is performed by rotating close to a central portion of the image sensor 105, and so this movement range is restricted to a central portion. This is because if the movement range is not restricted to the central portion, in the event that the image sensor 105 moves a lot as a result of blur correction, automatic horizontal correction will no longer be possible by rotating the image sensor 105.

It should be noted that as a way of restricting movement range of the image sensor 105 to a central portion, restriction may be to a point of a central portion, or to an extremely narrow range. Also, in the case of restriction of movement range to a central portion, movement range may be changed in accordance with shooting conditions (for example, camera shake amount, shutter speed, focal length etc.). This change will be described later using FIG. 7A to FIG. 7C. Detailed operation of step S71 will be described later using FIG. 6.

If the movement range of the image sensor has been restricted to a central portion, the image sensor is subjected to rotation processing to a first angle (S73). Here, the image sensor drive control section 109 subjects the image sensor 105 to rotation processing at the first angle. However, the first angle is not an angle itself based on a detected value from the camera shake detection section 111, and instead is an angle that is based on an average value of camera shake detection values over a predetermined time is used. Specifically, with automatic horizontal correction of mode 1-1 and Mode 1-2 the image sensor 105 is subjected to rotation processing so that the bottom of an image frame of a taken image is substantially aligned with a horizontal line, with this rotation processing being performed at a rotation speed that is slower than rotational blur correction, which will be described later. Calculation of the first angle will be described later using FIG. 8A and FIG. 8B, and response characteristics for change in first angle, second angle and rotational blur correction rotational speed will be described later using FIG. 10A to FIG. 10C. As a result of this processing, a first angle with high accuracy and stability is realized by removing the effects of noise due to camera shake, and by further removing fine rotational blur an image can be obtained in which the bottom of an image frame of a live view image is aligned with a horizontal line.

Returning to step S63, if the result of determination in this step is mode 2, then similarly to step S65, if movement range of the image sensor has been restricted to a central portion this restriction is released (S79). As was described previously, in a case where automatic horizontal correction mode has been set, if the automatic horizontal correction is performed by rotating the image sensor, movement range of the image sensor is restricted to a central portion (refer to S71 etc.). However, in the case of mode 2, automatic horizontal correction is not by rotation of the image sensor and is performed by rotation processing with specific trimming and resizing processing of image data, and so it is not necessary to restrict the image sensor to a central portion. Therefore, in a case where the movement range of the image sensor has been restricted to a central portion, this restriction is released.

Next, rotation processing of output image data of the image sensor is performed based on the first angle (S81). Here, similarly to step S73, the system control section 130 calculates the first angle based on an average value for a predetermined time, based on output of the camera shake detection section 111 (refer to FIG. 8A to FIG. 8B, and to FIG. 10A to FIG. 10O). If the first angle has been calculated, next the image processing section 107 performs rotation processing on image data from the image sensor 105 for live view display, based on the first angle. It should be noted that response characteristic of the first angle in step S81 will be described later using FIG. 10A to FIG. 10C.

If rotational processing has been performed in step S81, next, image data trimming and resizing processing is performed (S83). If rotation processing is performed in step S81, a physical object within the live view image becomes horizontal, but an image frame of the live view image is inclined with respect to a horizontal line. Cutting out of an image (trimming) is therefore performed so that the image frame of the live view image becomes parallel to the horizontal line, and further, resizing processing is performed so that the size of the image becomes the size of the live view image. Detailed processing of this trimming and resizing processing will be described later using FIG. 11.

If rotation processing to the first angle has been performed in step S73, or if trimming and resizing processing of image data has been performed in step S83, next, body side rotation blur correction is performed (S75). As a result of the processing in step S73 and steps S81 and S83, an image frame of a taken image becomes parallel to a horizontal line. However, the camera 1 is subject to camera shake by the user, and as a result the image frame of a taken image is slightly offset with respect to the horizontal line. Therefore, after having performed automatic horizontal correction, body side rotational blur correction is performed. In this step, rotational offset amount, within the camera shake amount that has been detected by the camera shake detection section 111, is corrected. Specifically, the imaging drive control section 109 rotationally drives the image sensor 105 so that rotational lower amount that has been detected by the camera shake detection section 111 is counteracted. In the event that "automatic horizontal correction" is on (namely that the automatic horizontal correction flag AHC_Flg=1), rotational blur correction is performed so as to maintain the first angle or the second angle, even if image stabilization is off.

In steps S67, S73, S75, S81, and S83, drive speed for setting the first angle or the second angle is slower than a body side rotational blur correction (Roll) speed. Acceleration caused by camera shake is added to the first angle or the second angle obtained from direction of gravitational acceleration. In order to remove this error due to acceleration, acceleration caused by camera shake is integratedly averaged over an appropriate time, so that there is no response to the camera shake frequency when using this integrated average value (refer to S153 to S163 in FIG. 8B). Conversely, camera shake frequency components are corrected by image stabilization.

If body side rotational blur has been corrected in step S75, next, automatic horizontal correction GUI display processing is performed (S77). In the case of performing automatic horizontal correction (automatic horizontal correction flag AHC_Flg=1 in S61), display that is different from normal is performed superimposed on live view display so that it will be understood that automatic horizontal correction is being performed. Detailed operation of this automatic leveling GUI display will be described later using FIG. 13 and FIG. 14.

If normal live view display processing has been performed in step S69, or if automatic horizontal correction GUI display processing has been performed in step S77, next the blur stabilization flag BSC_Flg is judged (S91). As was described previously the image stabilization button 39 is arranged on the camera body 100, and a setting value for the blur stabilization flag BSC_Flg is inverted each time the user operates the image stabilization button 39. Here, in the case of performing image stabilization the blur stabilization flag BSC_Flg=1, while in the case of not performing image stabilization the blur stabilization flag BSC_Flg=0. If the result of this determination is that image stabilization is off, namely that the blur stabilization flag BSC_Flg=0, the live view display processing shown in FIG. 5A and FIG. 5B is terminated, and the originating flow is returned to.

On the other hand, if the result of determination in step S91 is that image stabilization is on, namely that the blur stabilization flag BSC_Flg=1, next the image stabilization lens flag SCL_Flg is judged (S93). In steps S37 to S43 of FIG. 4, the image stabilization lens flag SCL_Flg relating to image stabilization function of the interchangeable lens that is fitted to the camera body 100 is set. Specifically, in the case of a non-image stabilization lens the SCL_Flg=0, in the case of an image stabilization lens (without collaborative operation) the SCL_Flg=1, and in the case of an image stabilization lens (with collaborative operation) the SCL_Flg=2.

If the result of determination in step S93 is that the image stabilization lens flag SCL_Flg=0, specifically that a non-image stabilization lens is attached, then in step S95 and after image stabilization is performed at the camera body 100 side. Specifically since blur correction cannot be performed in the interchangeable lens 200, the imaging drive control section 109 within the camera body 100 drives the image sensor 105 so as to remove camera shake.

First, body side angular blur correction is performed (S95). Here, the imaging drive control section 109 drives the image sensor 105 so that camera shake in an angular direction (Yaw, Pitch) that has been detected by the camera shake detection section 111 is counteracted. However, since the image sensor 105 only moves within a plane that is orthogonal to the optical axis of the photographing lens 201, angular direction blur amount is converted to shift blur amount within a plane orthogonal to the optical axis of the photographing lens 201, after which drive is based on this converted amount.

Next, body side shift blur correction is performed (S97). Here, the imaging drive control section 109 drives the image sensor 105 so that camera shake in a shift direction (X, Y) that has been detected by the camera shake detection section 111 is counteracted. Specifically, the image sensor 105 is moved within a plane that is orthogonal to the optical axis of the photographing lens 201.

Next, body side rotational blur correction is performed (S99). Here, the imaging drive control section 109 rotationally drives the image sensor 105 so that camera shake in a rotational direction (Roll) that has been detected by the camera shake detection section 111 is counteracted. Specifically, the image sensor 105 is rotated about the optical axis of the photographing lens 201. It should be noted that in the case where automatic horizontal correction is on, then since body side rotational blur correction is performed in step S75, the processing here may be omitted.

If image stabilization has been performed within the camera body 100 in steps S95 to S99, next the automatic horizontal correction mode is determined (S101). As was described in step S63, with this embodiment three automatic horizontal correction modes, namely mode 1-1, mode 1-2, and mode 2, are provided. Of these modes, with mode 1-1 and mode 1-2 automatic horizontal correction is performed by mechanically rotating the image sensor 105, which means that movement range of image stabilization is narrowed, and there is a risk that sufficient image stabilization will not be possible. Therefore, in mode 1-2, in a case where the interchangeable lens that is attached does not have an image stabilization correction optical system 204, electronic image stabilization is performed during live view display, so that sufficient image stabilization is performed. In this step, it is determined whether the mode that has been set is mode 1-2, or is another mode. If the result of this determination is that the automatic horizontal correction mode is mode 1-1 or mode 2, then the flow for live view display processing shown in FIG. 5A and FIG. 5B is terminated, and the originating flow is returned to.

On the other hand, if the result of determination in step S101 is that the mode is mode 1-2, electronic image stabilization is performed (S103). Electronic image stabilization involves generating image data that has had camera shake removed, based on a camera shake amount that has been detected by the camera shake detection section 111. Specifically, in a case where there is angular blur (Yaw, Pitch), image processing is applied so as to remove this angular blur.

Once electronic image stabilization has been performed, trimming and resizing processing of image data is performed (S105). Here, in order to achieve an image for the range of a fixed image frame, an image of that range is trimmed from within image data, and resizing processing is performed to expand this trimmed image to the size of the image frame. Detailed processing of this trimming and resizing processing will be described later using FIG. 12. If trimming and resizing processing of the image data has been performed, the flow for live view display processing shown in FIG. 5A and FIG. 5B is terminated and the originating flow is returned to.

Returning to step S93, if the result of determination in this step is that the image stabilization lens flag SCL_Flg=1, specifically that an image stabilization lens without collaborative operation is attached, then in steps S107 and S109 blur correction is performed inside the interchangeable lens 200. In this case, although the blur correction optical system 204 is provided inside the interchangeable lens, it is not possible to perform collaborative operation with the blur correction operation within the camera body 100. Angular blur correction and shift blur correction are therefore executed inside the interchangeable lens 200.

First, lens side angular blur correction is performed (S107). Here, the image stabilization control section 205 drives the blur correction optical system 204 so that a camera shake amount in an angular direction (Yaw, Pitch) that has been detected by the camera shake detection section 209 within the interchangeable lens 200 is counteracted. However, since the blur correction optical system 204 only moves within a plane that is orthogonal to the optical axis of the photographing lens 201, angular direction blur amount is converted to shift blur amount within a plane orthogonal to the optical axis of the photographing lens 201, after which drive is based on this converted amount.

Next, lens side shift blur correction is performed (S109). Here, the image stabilization control section 205 drives the blur correction optical system 204 so that camera shake in a shift direction (X, Y) that has been detected by the camera shake detection section 209 is counteracted. Specifically, the blur correction optical system 204 is moved within a plane that is orthogonal to the optical axis of the photographing lens 201. It should be noted that, similarly to step S99, body side rotational blur correction (Roll) may also be performed. If lens side shift blur correction is performed, then the flow for live view display processing shown in FIG. 5A and FIG. 5B is terminated, and the originating flow is returned to.

Returning to step S93, if the result of determination in this step is that the image stabilization lens flag SCL_Flg=2, specifically that an image stabilization lens with collaborative operation is attached to the camera body 100, then in steps S111 and S119 blur correction is performed using collaboration between the camera body 100 and the interchangeable lens 200. In this case, the blur correction optical system 204 that has been provided within the interchangeable lens 200 can perform collaborative operation with a blur correction operation within the camera body 100. The blur amount that has been detected is therefore distributed to the interchangeable lens 200 and the camera body 100, and blur correction is performed by the respective blur correction sections (imaging drive control section 109 and image stabilization control section 205) collaborating.

First, lens side angular blur correction is performed (S111). Here, the image stabilization control section 205 drives the blur correction optical system 204 so that a camera shake amount in an angular direction (Yaw, Pitch) that has been detected by the camera shake detection section 209 within the interchangeable lens 200, or the body side camera shake detection section 111, is counteracted. However, since the blur correction optical system 204 only moves within a plane that is orthogonal to the optical axis of the photographing lens 201, angular direction blur amount is converted to shift blur amount within a plane orthogonal to the optical axis of the photographing lens 201, and the blur correction optical system 204 is driven.

Next, lens side shift blur correction is performed (S113). Here, similarly to step S109, the image stabilization control section 205 drives the blur correction optical system 204 so that camera shake in a shift direction (X, Y) that has been detected by the camera shake detection section 209 or camera shake detection section 111 is counteracted. Specifically, the blur correction optical system 204 is moved within a plane that is orthogonal to the optical axis of the photographing lens 201.

Next, body side angular blur correction is performed (S115). Here, similarly to step S95, the imaging drive control section 109 drives the image sensor 105 so that camera shake in an angular direction (Yaw, Pitch) that has been detected by the camera shake detection section 209 or the camera shake detection section 111 is counteracted. However, since the image sensor 105 only moves within a plane that is orthogonal to the optical axis of the photographing lens 201, angular direction blur amount is converted to shift blur amount within a plane orthogonal to the optical axis of the photographing lens 201, and the image sensor 105 is driven.

Next, body side shift blur correction is performed (S117). Here, similarly to step S97, the imaging drive control section 109 drives the image sensor 105 so that camera shake in a shift direction (X, Y) that has been detected by the camera shake detection section 209 or camera shake detection section 111 is counteracted. Specifically, the image sensor 105 is moved within a plane that is orthogonal to the optical axis of the photographing lens 201.

Next, body side rotational blur correction is performed (S119). Here, similarly to step S99, the imaging drive control section 109 rotationally drives the image sensor 105 so that camera shake in a rotational direction (Roll) that has been detected by the camera shake detection section 111 is counteracted. Specifically, the image sensor 105 is rotated about the optical axis of the photographing lens 201. If body side rotational blur correction is performed, then the flow for live view display processing shown in FIG. 5A and FIG. 5B is terminated, and the originating flow is returned to.

In this way, in the flow for live view display processing, in the case of performing automatic horizontal correction (refer to S61), if the automatic horizontal correction that has been set is mode 1-1 or mode 1-2 movement range of the image sensor is restricted to a central portion, and the image sensor is subjected to rotational processing to a first angle (refer to S71 and S73). If the center of the image sensor is moved away from the optical axis of the photographing lens 201 because of image stabilization, performing automatic horizontal correction will become increasingly difficult. Therefore, in a case of performing automatic horizontal correction by rotating the image sensor, movement range of the image sensor is restricted to a central portion. As a result it is possible to sufficiently perform automatic horizontal correction even if the camera 1 is significantly inclined.

Also, after having performed automatic horizontal correction by rotating the image sensor to the first angle, body side rotational blur correction is performed (refer to S75). Even if automatic horizontal correction has performed and the image frame of the taken image becomes horizontal, if the camera is slightly rotationally offset as a result of user camera shake, a horizontal line will become unstable and indistinct. Rotational blur correction is therefore performed based on a camera shake amount (Roll amount) that has been detected by the camera shake detection section 111. As a result, the image frame is stably fixed in the horizontal line direction, and is easy to see. In this case, rotation amount of the image sensor is a sum of rotation amount for automatic horizontal correction and rotation amount for camera shake prevention, and accordingly, rotation range of the image sensor includes a rotation range for automatic leveling, and a rotation range for camera shake prevention. This rotation range may be restricted to a specified amount. In this way, with this embodiment, it is determined whether or not horizontal correction of the image sensor or an output image of the image sensor with respect to an image frame has been instructed (refer to S61), angular speed of the imaging device is detected (for example, S135 in FIG. 8A), and when horizontal correction has been instructed, the image sensor is rotated so as to include at least two rotation ranges, a rotation range for execution of correction to horizontal, and a rotation range for executing camera shake prevention based on angular speed detection results (for example, S73 and S75).

Also, in a case where the automatic horizontal correction mode is mode 2, an image of the image sensor is rotated using image processing (refer to S81 and S83). In this case, movement range of the image sensor being restricted to a central portion is released. As a result it is possible to sufficiently perform both image stabilization and automatic horizontal correction.

Also, in the event that the automatic horizontal correction mode is mode 1-2, a range in which is possible to move the image sensor 105 using the imaging drive control section 109 is limited (refer to S71). This means that image stabilization using the imaging drive control section 109 is not sufficient. In the case of mode 1-2, therefore, image stabilization for live view in the shooting standby state is performed using electronic image stabilization (refer to S101 and S103).

Also, in the case of a collaborative type interchangeable lens 200 (SCL_Flg=2 in S93), image stabilization is performed using both image stabilization in the camera body 100 (refer to the imaging drive control section 109), and image stabilization in the interchangeable lens 200 (image stabilization control section 205) (refer to S111 to S119). As a result image stabilization capability is improved.

It should be noted that if movement range of the image sensor is restricted to a central portion in step S71, restriction of the movement range within the flow for this live view display processing is not released (however, if 1st release is turned on, the movement range restriction is temporarily released for the purpose of AE operation and AF operation (refer to S261 in FIG. 20)). However, this is not limiting, and if automatic horizontal correction is performed and the image frame of a taken image becomes parallel to a horizontal line, restriction to the movement range of the image sensor may be released. Restriction may also be released while the 1st release is on.

Next, detailed operation of processing to restrict movement range of the image sensor to a central portion, in step S71 (refer to FIG. 5A), will be described using the flowchart shown in FIG. 6. As was described previously, in a case where automatic horizontal correction is performed by the imaging drive control section 109 rotating the image sensor 105, a center of rotation of the image sensor 105 is preferably close to the optical axis of the photographing lens 201. Therefore, in a case where the moment for automatic horizontal correction is 1-1 or 1-2 movement range of the image sensor is restricted to a central portion. In this embodiment, this movement range differs depending on the amount of camera shake etc.

If the flow shown in FIG. 6 is commenced, first, camera shake amount TB is detected (S121). Here, the camera shake detection section 111 detects camera shake amount TB. Shutter speed SS is then detected (S123). Here, the exposure control section 112 calculates subject brightness based on image data that has been output from the image sensor 105, and calculates electronic shutter speed SS of the image sensor 105 based on this subject brightness. It should be noted that in a case where the camera body 100 is provided with a mechanical shutter, shutter speed of the mechanical shutter is calculated. Next, focal length f is detected (S125). In step S33 (refer to FIG. 4), focal length information is acquired as lens basic information.

Figure 7B:
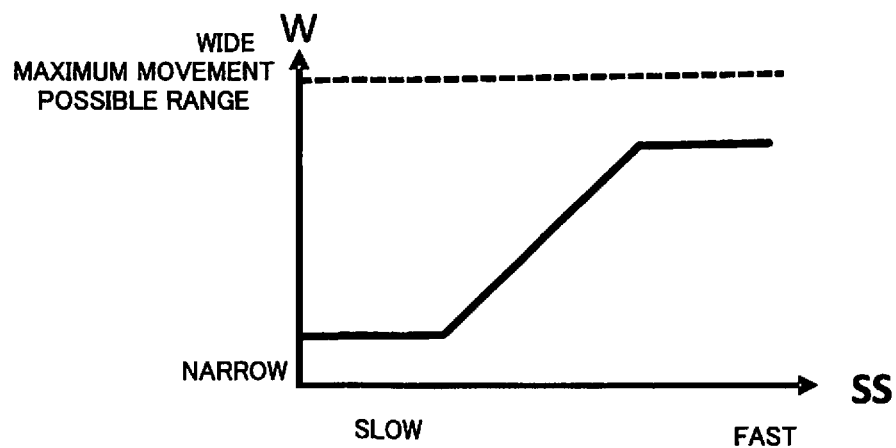
FIG. 7B is a graph showing a relationship between central portion restricted range W and shutter speed SS, in the camera of one embodiment of the present invention.
Figure 7C:
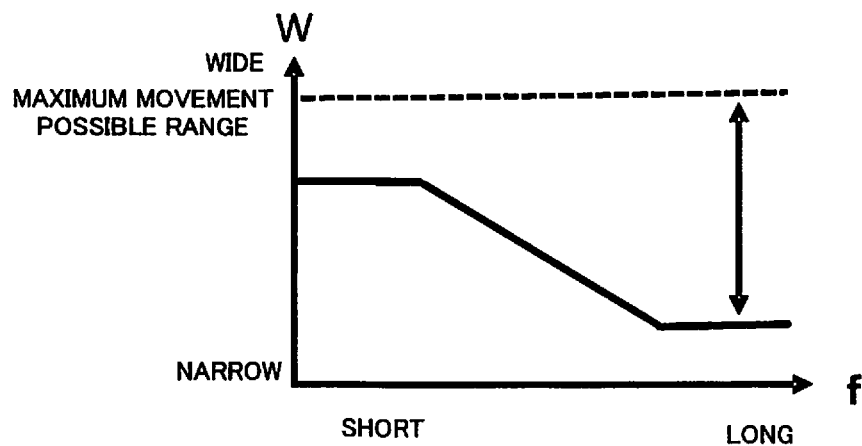
FIG. 7C is a graph showing a relationship between central portion restricted range W and focal length f, in the camera of one embodiment of the present invention.

Next, a central portion restriction range W is calculated (S127). Restriction range for movement of the image sensor 105 differs depending on camera shake amount TB, shutter speed SS, and focal length f. Here, the system control section 130 calculates this restriction range W based on the equation (1) below. It should be noted that this restriction range W will be described later using FIG. 7A to FIG. 7C. Here, Fn (TB, SS, f) means a function of camera shake amount TB, shutter speed SS, and focal length f, and may be a function Fn that gives characteristics such as shown in FIG. 7A to FIG. 7C.

$$W = Fn(TB, SS, F) \quad (1)$$

Once the restriction range W has been calculated, next, the image sensor is restricted to the central portion restriction range W (S129). Here, movement range of the image sensor 105 is restricted. If this restriction has been performed, then when the imaging drive control section 109 drives the image sensor 105 in previously described steps S73, S95, S97, S115 and S117, drive is performed with the central portion of the image sensor restricted to the restriction range W. Once the image sensor has been restricted to the restriction range W the flow of FIG. 6 is terminated, and the originating flow is returned to. It should be noted that with this embodiment, although the restriction range W changes in accordance with the three parameters of camera shake amount TB, shutter speed SS and focal length f, it is also possible to use only some of these three parameters, and further to add other parameters.

Next, the restriction range W entered in equation (1) described above will be described using FIG. 7A to FIG. 7C. FIG. 7A is a graph showing the relationship between camera shake amount TB and restriction range W. As will be understood from FIG. 7A, in a case where camera shake the small, the restriction range W is wide, but if camera shake amount TB becomes large the restriction range becomes narrow.

FIG. 7B is a graph showing a relationship between shutter speed SS and restriction range W. As will be understood from FIG. 7B in a case where shutter speed SS is fast, restriction range W is wide, but if shutter speed SS becomes slow the restriction range becomes narrow.

FIG. 7C is a graph showing a relationship between focal length f and restriction range W. As will be understood from FIG. 7C, in a case where focal length the short (wide-angle side) restriction range W is wide, but if focal length is long (telephoto side) the restriction range W becomes narrow. If a focal length that is longer than a specified focal length is reached, the effects of camera shake become significant, and it becomes preferable to perform image stabilization. In the case of a long focal length, therefore, a range in which it is possible to move during live view (restriction range W) is restricted to a small range so that an image stabilization region during actual exposure will become sufficiently large.

Next, before describing computational processing for the first angle shown in FIG. 8A and FIG. 8B, the first angle and the second angle will be described using FIG. 9. FIG. 9 is a drawing showing a first angle for rotating the image sensor about the optical axis in order to horizontally correct the image sensor or an output image of the image sensor with respect to an image frame, and a second angle for rotating the image sensor about the optical axis in order to horizontally correct the image sensor or an output image of the image sensor with respect to a camera base surface. The first angle is a calculated output value, and the second angle is a fixed value. The image sensor 105 arranged within the camera body 100 is arranged so that it can be freely moved on an image stabilization unit 109a. The image stabilization unit 109a is fixed to the camera body 100 using attachment pins 109b. Also, the image stabilization unit 109a has a drive mechanism for moving the image sensor 105 in the X direction and the Y direction. It is further possible for the image stabilization unit 109a to rotational drive the image sensor 105 2.

When the camera body 100 is in a stationary state an X direction of an attachment surface of the image stabilization unit 109a is ideally parallel to a horizontal surface H. However, when the camera body 100 is grasped by the user, it is subjected to vibration due to camera shake etc. As a result, a first angle θ1 arises between a direction that is perpendicular to the horizontal surface H (vertical direction) and the Y direction. The camera shake detection section 111 can detect this first angle θ1.

Also, it has been assumed that the image stabilization unit 109a will be attached to the camera body 100 so that a Y direction of the attachment surface of the image stabilization unit 109a becomes orthogonal to a base surface (also serving as a tripod attachment surface) B of the camera body 100. However, in actual fact, when attaching the image stabilization unit 109a to the camera body 100 at the factory, the attachment surface is offset, albeit only slightly, by a second angle θ2. This second angle θ2, which is an attachment error, is measured at the time of factory shipping, and stored in the nonvolatile memory 122

Next, operation for first angle computational processing will be described using the flowcharts shown in FIG. 8A and FIG. 8B. The flow for this first angle computational processing is executed by the system control section 130 in parallel with the main flow that was shown in FIG. 3. As shown in FIG. 10A to FIG. 10O that will be described later, a response characteristic of this first angle is gentle compared to the response characteristic for rotational blur correction for performing image stabilization. Specifically, in the flow for first angle calculation a response characteristic of the first angle is made to be gentle by calculating an average value of camera shake amounts that have been detected at predetermined time intervals by the blur detection section 111.

Figure 8A:
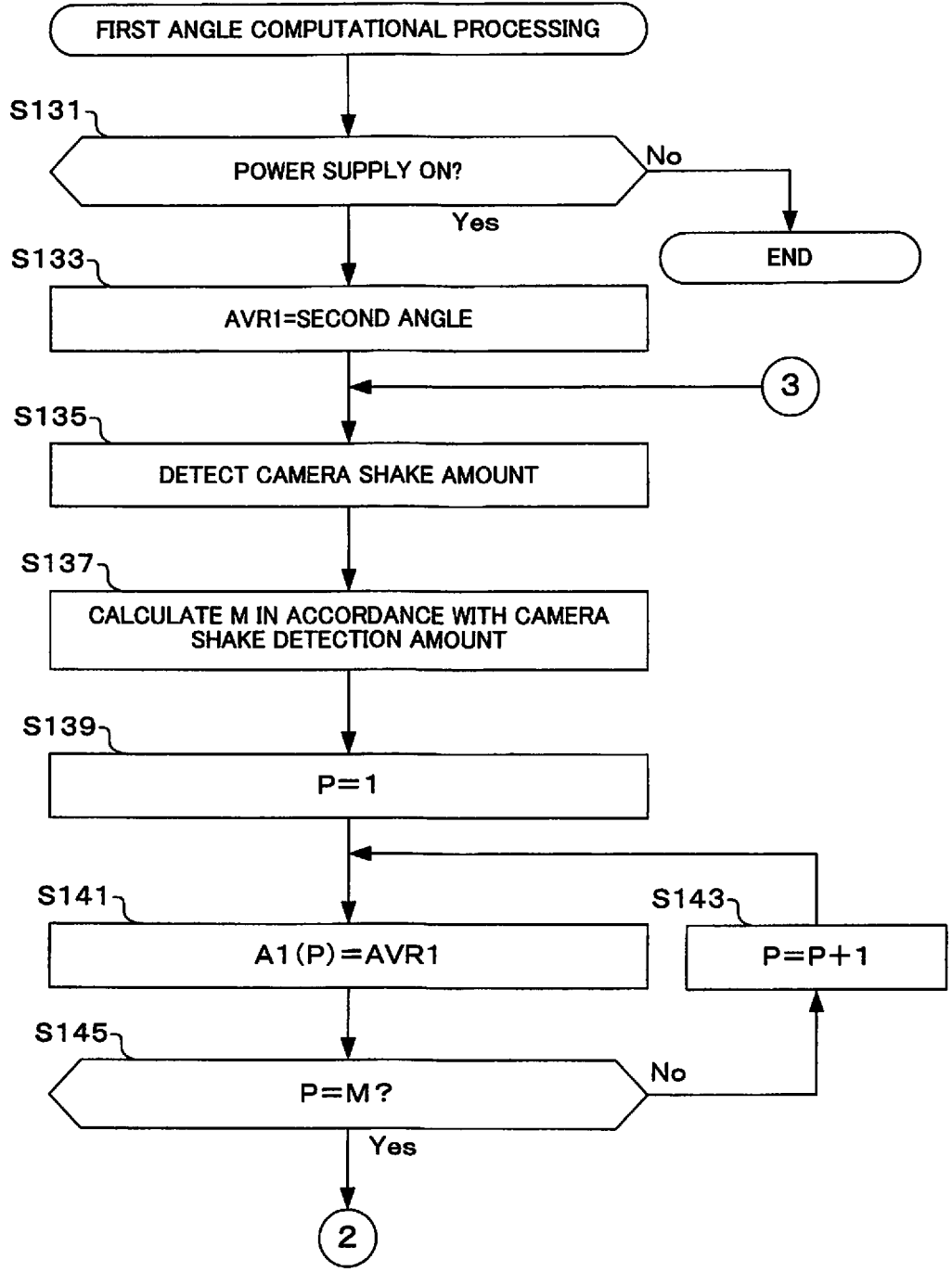

If the flow for first angle computational processing shown in FIG. 8A is commenced, it is first determined whether or not the power supply is on (S131). Here, the system control section 130 determines whether or not the power supply switch of the operation section 119 is on. If the result of this determination is that the power supply switch is off, the flow for first angle computational processing is terminated.

If the result of determination in step S131 is that the power supply is on, AVR1=second angle is set (S133). If the power supply is turned on, the power supply control section 118 supplies power to each section within the camera body 100 and the interchangeable lens 200. Accompanying this, power is also supplied to the camera shake detection section 111, and power is fed to sensors for camera shake detection, such as the acceleration sensor. Also, the system control section 130 reads out the second angle that has been stored in the nonvolatile memory 122, and temporarily stores the second angle in register AVR1 within the system control section 130. As described previously, the second angle corresponds to an offset from a reference position when the image sensor 105 was attached, and camera shake amount is acquired with this angle as a reference angle.

Next, camera shake amount is detected (S135). Here, the system control section 130 acquires a camera shake detection result from the camera shake detection section 111. Next, M is calculated in accordance with camera shake amount that was detected in step S135 (S137). Here, the system control section 130 obtains M in accordance with the camera shake amount data has been acquired. As a calculation equation, it is preferable to have an equation such that if camera shake amount is large then M is large, and if camera shake amount is small M is small.

Next, P=1 is set (S139). P represents an order (address) of register A1 (refer to step S141) which will be described later, and in this step "1" is set as an initial value for P. Next, A1(P)=AVR1 is set (S141). Here, the second angle that was set in step S133 is set in the Pth register A1. Next it is determined whether or not P=M (S145), and if the result of this determination is not P=M, P=P+1 is set (S143), and processing returns to step S141. If the result of determination in step S145 is that P=M, then the AVR1 of step S133, namely the second angle, is set in each register of register A1(1) to A1(M).

If the result of determination in step S145 is that P=M, N=1 is set (S151). N represents an order (address) of register A1(N) (refer to step S155) which will be described later, and in this step "1" is set as an initial value for N. Acceleration sensor output ACC is then read out (S153). Here, the system control section 130 reads output ACC from the acceleration sensor etc. within the camera shake detection section 111.

Once the acceleration sensor output ACC has been read, next A1(N)=Fn1(ACC) is calculated (S155). The system control section 130 performs calculation by assigning the acceleration sensor output ACC that was read in step S153 to function Fn1, and temporarily stores the result of this calculation in register A1(N). The function Fn1 should be a function that can convert acceleration sensor output ACC to the first angle.

Next, AVR1=SUM((A1(1):A1(M))/M is calculated (S157). Here, the system control section 130 calculates an average value of values that have been computed with acceleration sensor output ACC in function Fn1, by dividing a cumulative value of A1 from N=1 to N=M by M, and makes this value AVR1. When N=1, only A1(1) is acceleration sensor output ACC, and the second angles for steps S133 to S145 are only stored in registers A1(2) to A1(M). This means that when N=1, AVR1 is a value that is close to the second angle. After that, every time 1 is added to N in step S165, AVR1 that is calculated in step S157 gradually moves away from the second angle, and approaches an average value for calculation results of acceleration sensor output ACC. Then, AVR1 is output as the first angle (S159). Here, AVR1 that was calculated in step S157 is output as the first angle.

A predetermined time is made a timer count (S161). Here, lapse of the predetermined time is awaited. In this way, reading of acceleration sensor output ACC can be performed at predetermined time intervals. If the predetermined time has elapsed, it is determined whether or not N=M (S163). If the result of this determination is not that N=M, N=N+1 is set (S165), and step S153 is returned to. N is set to an initial value in step S151, and this N represents a sequential order (address) of register A1. Also, M is a value that was calculated in step S137, and represents a number of registers that have been created as A1. Accordingly, when N=M it means that first angles that have been sequentially obtained at predetermined time intervals from the acceleration sensor output ACC are stored in M registers A1.

If the result of determination in step S163 is that N=M, it is determined whether or not the power supply is on (S167). Here, similarly to step S161, the system control section 130 determines whether or not the power supply switch of the operation section 119 is on. If the result of this determination is that the power supply switch is on, step S135 is returned to. On the other hand, if the power supply switch is off, the flow for first angle computational processing is terminated.

In this way, in the flow for first angle computational processing, for a number of times (M) corresponding to camera shake amount an average value of computational results of output from the camera shake detection section 111 is calculated (refer to S157), and this value is output as the first angle. An average value of detection results detected M times, with the number M corresponding to camera shake amount, is made the first angle. This means that the first angle is not superimposed with an error caused by momentary camera shake, it is possible to make the first angle a stable value that has had the effects of camera shake removed.

Next, the response characteristic for rotation velocity of the image sensor 105 will be described using FIG. 10A to FIG. 10O. In steps S67, S73, S75, S81, S99 and S119 in the flow of FIG. 5A, rotation processing for automatic horizontal correction and rotational blur correction is performed. Specifically, the image sensor 105 is rotated so that an image frame of a taken image is aligned with the horizontal line, and further the image sensor 105 is rotated so as to eliminate rotational blur caused by camera shake. Any of those rotations are for performing rotation of the image sensor 105, but the purposes and causes of performing rotation are different, with one being rotation for the purpose of automatic horizontal correction for leveling a taken image, and the other being rotation for the purpose of rotational blur correction to correct minute rotational rocking caused by camera shake. As a result, making responsiveness for automatic horizontal correction and responsiveness for image stabilization different in accordance with magnitude of camera shake amount is better for improving correction precision and stability, and results in good usability. It should be noted that in FIG. 10A to FIG. 10O line AS represents the first angle setting or the second angle setting, and line AS represents rotational blur correction.

Rotational speed and response characteristic of the image sensor at the time of normal camera shake are shown in FIG. 10A. Until rotational speed of the image sensor for automatic horizontal correction is in the vicinity of v2, responsiveness for first angle setting or second angle setting AS is made 100%. If rotation speed of the image sensor becomes faster than v1 response for first angle setting or second angle setting AS is lowered, and responsiveness for rotation speed of the image sensor for rotational blur correction is increased. In other words, if rotation using the first angle setting or second angle setting AS is slow, it is performed at low speed. Faster rotational blur is corrected using rotational blur correction IS. Therefore, if rotation speed of the image sensor exceeds v3 response characteristic for rotation velocity of the image sensor for the purpose of rotational blur correction is made 100%.

As was described previously, if the example shown in FIG. 10A is made a reference, a time when camera shake is more intense than this as shown in FIG. 10B. With this example, until rotational velocity of the image sensor is v4 response characteristic of the first angle setting or second angle setting AS is made 100%, and response characteristic reduces from that point until rotation speed v5. Specifically, in a case where camera shake is intense, rotation speed of the image sensor 105 for the purpose of first or second angle setting AS for automatic horizontal correction becomes a lower response characteristic compared to the previously described reference. On the other hand in a case of performing rotational blur correction IS, responsiveness of rotation speed of the image sensor changes similarly to at the time of the reference.

Also, when camera shake is smaller than in the example shown in FIG. 10A, for example, a case where a camera is fixed to a tripod, is shown in FIG. 10C. In this case, until rotational velocity of the image sensor is v9 response characteristic of the first angle setting or second angle setting AS is made 100%, and response characteristic reduces from that point until rotation speed v10. Specifically, in a case where camera shake is small, rotation speed of the image sensor 105 for the purpose of first or second angle correction for automatic horizontal correction becomes a faster response characteristic. This means that rotation using first angle setting or second angle setting AS is performed at a higher speed than for the reference. On the other hand in a case of performing rotational blur correction, responsiveness of rotation speed of the image sensor changes similarly to at the time of the reference.

In this way, with this embodiment, rotation speed of the image sensor when performing automatic horizontal correction is slower than rotation speed for body side rotational blur correction (Roll). Specifically, acceleration that arises due to camera shake will be added to the first angle (automatic horizontal correction) obtained from direction of gravitational acceleration. As a result, in order to remove errors caused by camera shake from direction of gravitational acceleration, the first angle is obtained from a cumulative average over an appropriate time, and there is no response to frequency of camera shake (referred to S153 to S163 in FIG. 8B, and S73 and S83 in FIG. 5A). On the other hand, because rotational blur due to camera shake becomes high-frequency, this frequency component is processed as rotational blur correction (refer to S75). Specifically, the first angle for automatic horizontal correction is acquired based on detection result of a gravitational acceleration sensor of the camera shake detection section 111 (refer to ACC in S155), and blur amount for image stabilization is acquired based on detection result of an angular speed sensor of the camera shake detection section 111 or 209. An average value is used for the purpose of automatic horizontal correction, while this type of average processing is not performed for the purpose of image stabilization. It should be noted that rotation speeds v1, v3, v4, v5, v9, and v10 at the time of first angle setting represent rotational responsiveness, and setting of responsiveness can be achieved by changing the "M" in S137 of FIG. 8A.

Next, the trimming and resizing processing (1) of image data in step S83 of FIG. 5A will be described using FIG. 11. In step S81 rotation processing is performed on image data based on the first angle. Specifically, in the trimming and resizing processing of step S83, rotation processing is applied to an output image of the image sensor 105, this image that has been subjected to rotation processing is trimmed so that the image frame of the image becomes level, and the image that has been trimmed is resized.

Figure 11:
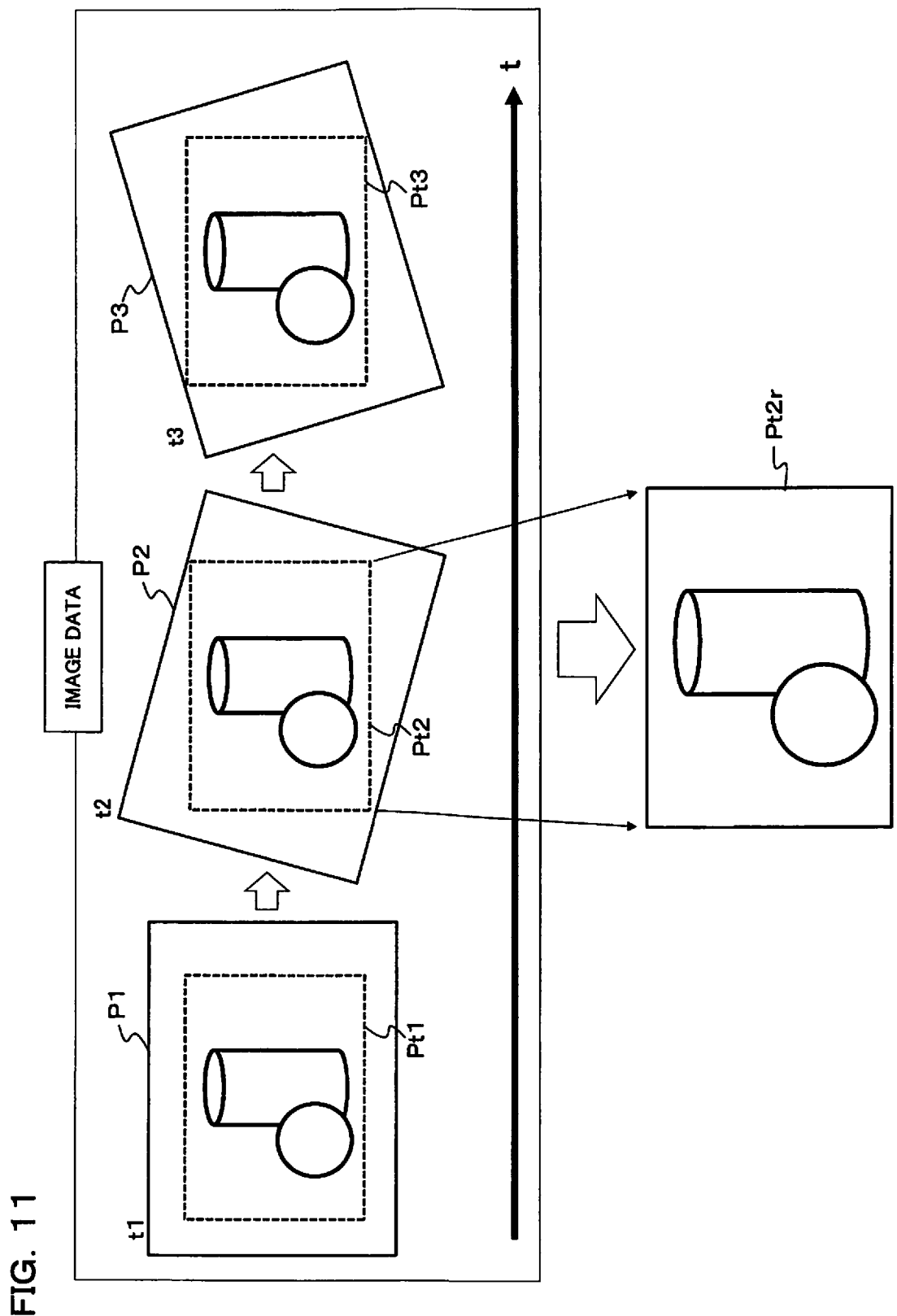
FIG. 11 is a drawing for describing image data trimming and resizing processing (1), in the camera of one embodiment of the present invention.

In FIG. 11, image P1 is an image that has been acquired by the image sensor 105 at time t1, and image Pt1 is a trimming image. Also, image P2 is an image that was acquired by the image sensor 105 at time t2, and the image processing section 107 cuts out an image that is inclined by the first angle to generate trimming image Pt2. Similarly, image P3 is an image that was acquired by the image sensor 105 at time t3, and the image processing section 107 cuts out an image that is inclined by the first angle to generate trimming image Pt3

In this way, in the example shown in FIG. 11 trimming images Pt1 to Pt3 have the effects of any camera shake removed by step S79, to give images that have been subjected to automatic horizontal correction processing by rotation of image data. At this time, since a region that is actually photographed and stored is a trimming image region, in order to display on the display section 120 (rear surface monitor 23, EVF 21) as a live view image the image processing section 107 then applies resizing processing to the trimming images Pt1 to Pt3 so that they become the same size as the image frame of the display section. Resized image Pt2r shown in FIG. 11 is an image resulting from having resized the trimming image Pt2. Resizing processing is also applied to trimming images Pt1 and Pt3 for display on the display section 120.

Next, the trimming and resizing processing (2) of image data in step S105 of FIG. 5B will be described using FIG. 12. Image stabilization is performed using electronic image stabilization in step S103, but at this time rotation processing of an image is not applied. That is, the image processing section 107 performs image cutout (trimming) on an output image of the image sensor so as to eliminate camera shake caused by shift blur (X, Y), but the image processing section 107 does not specially perform rotation processing of the image so that a physical object becomes level.

Figure 12:
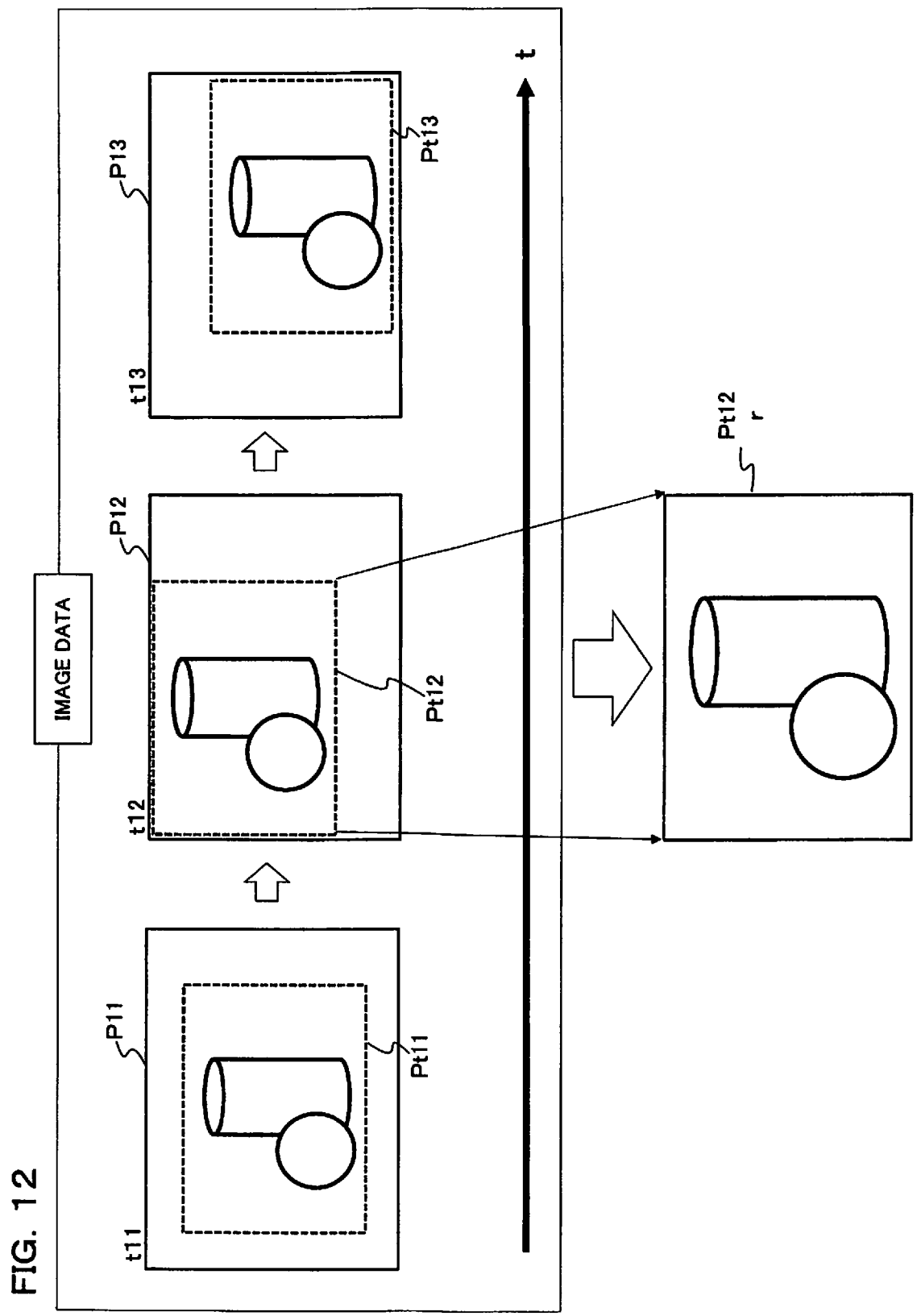
FIG. 12 is a drawing for describing image data trimming and resizing processing (2), in the camera of one embodiment of the present invention.

In this way, in the example shown in FIG. 12 trimming images Pt11 to Pt13 are images that have had the effects of any camera shake removed. However, since they are trimming images, then similarly to the case of FIG. 11, the image processing section 107 applies resizing processing to the trimming images Pt11 to Pt13 so as to become the same size as the image frame of the display section. Resized image Pt12r shown in FIG. 12 is an image resulting from having resized the trimming image Pt12. Resizing processing is also applied to trimming images Pt11 and Pt13 for display on the display section 120.

Next, operation of the automatic leveling GUI display processing in step S77 (refer to FIG. 5A) will be described using the flowchart shown in FIG. 13. As was described previously, in a case where the automatic horizontal correction button 35 has been operated and automatic horizontal correction mode has been set, a display for confirming horizontal is displayed superimposed on a live view image. This flow shows processing for displaying a display for confirming being horizontally leveled.

If the flow for automatic leveling GUI display processing is commenced, first, guideline displayed on is performed (S171). Here, the system control section 130 displays guidelines on the display section 120. As guidelines, for example, the horizontal line 120a and the vertical line 120b are displayed, as shown in FIG. 16A. The horizontal line 120a is a line that is parallel to the upper edge and lower edge of the monitor screen within the display section 120 and is midway between the upper edge below edge. Also, the vertical line 120b is a line that is parallel to the left edge and right edge of the monitor screen within the display section 120, and is midway between the left edge and right edge. There may also be display that is useful at the time of confirming that the screen is horizontal, such as displaying grid lines.

If guide display is turned on, it is next determined whether or not to turn on spirit level display (S173). The user can set a spirit level display mode on a menu screen etc. Here, the system control section 130 determines whether or not the spirit level display mode has been set. It should be noted that as well as a menu screen, any operation member within the operation section 119 may be used for spirit level display mode setting.

If the result of determination in step S173 is that spirit level display mode is set, spirit level display processing is executed (S175). Here, spirit level display is performed on the display section 120 (rear surface monitor 23 or EVF 21), and Roll inclination amount and Pitch inclination amount etc. that have been detected by the gravitational acceleration sensor within the camera shake detection section 111 are displayed. Spirit level display has Roll inclination amount measurement ranges 120c, 120d, Pitch inclination measurement ranges 120e, 120f, Roll display 120g, and Pitch display 120h, as shown in FIG. 16A. Also the Roll inclination amount measurement ranges 120c and 12d show ranges of Roll inclination amount capable of being detected by the camera shake detection section 111. Pitch inclination amount measurement ranges 120e and 120f shown range of Pitch inclination amounts capable of being detected by the camera shake detection section 111.

Roll inclination is inclination in a lateral direction, when looking at the camera 1 from the front, as shown to the lower right of the display section 120 in FIG. 16A. Specifically, Roll inclination amount represents turning amount about the optical axis, looking at the camera 1 from the front. Pitch inclination amount is inclination in a vertical direction when looking at the camera 1 from the side, as shown to the upper right of the display section 120 in FIG. 16A. Specifically, Pitch intonation amount is an inclination amount in the vertical direction when an axis in a longitudinal direction of the camera 1 is made an axis. Roll display 120g is Roll inclination amount that has been detected by the camera shake detection section 111. Pitch display 120h is Pitch inclination amount that has been detected by the camera shake detection section. Detailed operation of the spirit level display processing of step S175 will be described later using FIG. 15A and FIG. 15B.

If spirit level display processing has been performed in step S175, or if the result of determination in step S173 is that spirit level display mode has not been set, this flow is terminated and the originating flow is returned to.

Next, a modified example of operation of the automatic leveling GUI display processing in step S77 (refer to FIG. 5A) will be described using the flowchart shown in FIG. 14. With the automatic leveling GUI display processing that was shown in FIG. 13, determination as to whether or not to perform spirit level display was performed. Specifically, it was possible for the user to select whether or not to perform spirit level display. However, with the modified example shown in FIG. 14, in the event that automatic horizontal correction mode has been set, the spirit level display mode is automatically set.

Figure 13:
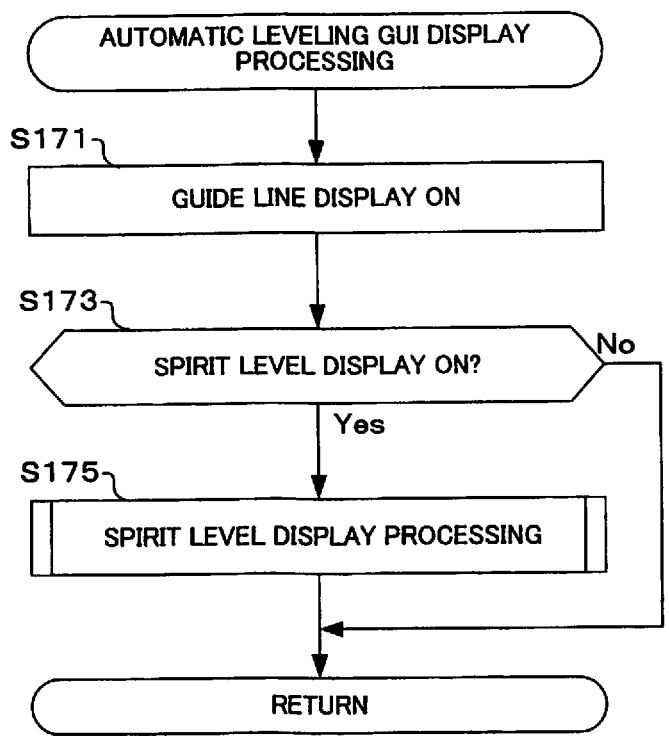
FIG. 13 is a flowchart showing automatic horizontal GUI (abbreviation of Graphic User Interface) display processing for the camera of one embodiment of the present invention.
Figure 14:
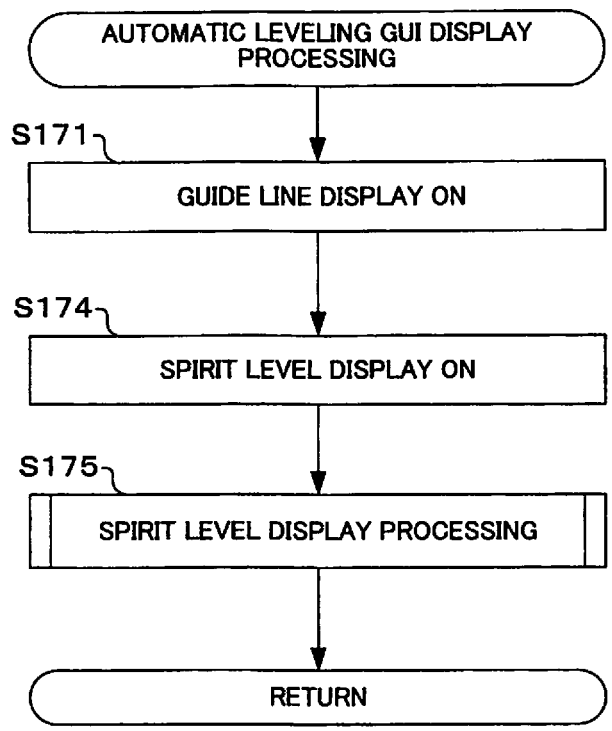
FIG. 14 is a flowchart showing a modified example of automatic horizontal GUI display processing of the camera of one embodiment of the present invention.

Compared to the flowchart shown in FIG. 13, the modified example shown in FIG. 14 has step S173 of FIG. 13 replaced with S174 in FIG. 14. Specifically, if guideline display is turned on in step S171, then spirit level display is turned on in step S174, and spirit level display processing is performed in step S175.

According to this modified example, when the automatic horizontal correction button 35 is operated and automatic horizontal correction mode has been set, spirit level display is automatically performed. In order to confirm whether or not automatic horizontal correction is possible, and whether or not automatic horizontal correction has functioned effectively and completed it is necessary to confirm the current degree of horizontal inclination of the camera. It is therefore possible to simplify total operations by linking an operation for calling up the spirit level with operation to perform automatic horizontal correction.

Figure 15A:
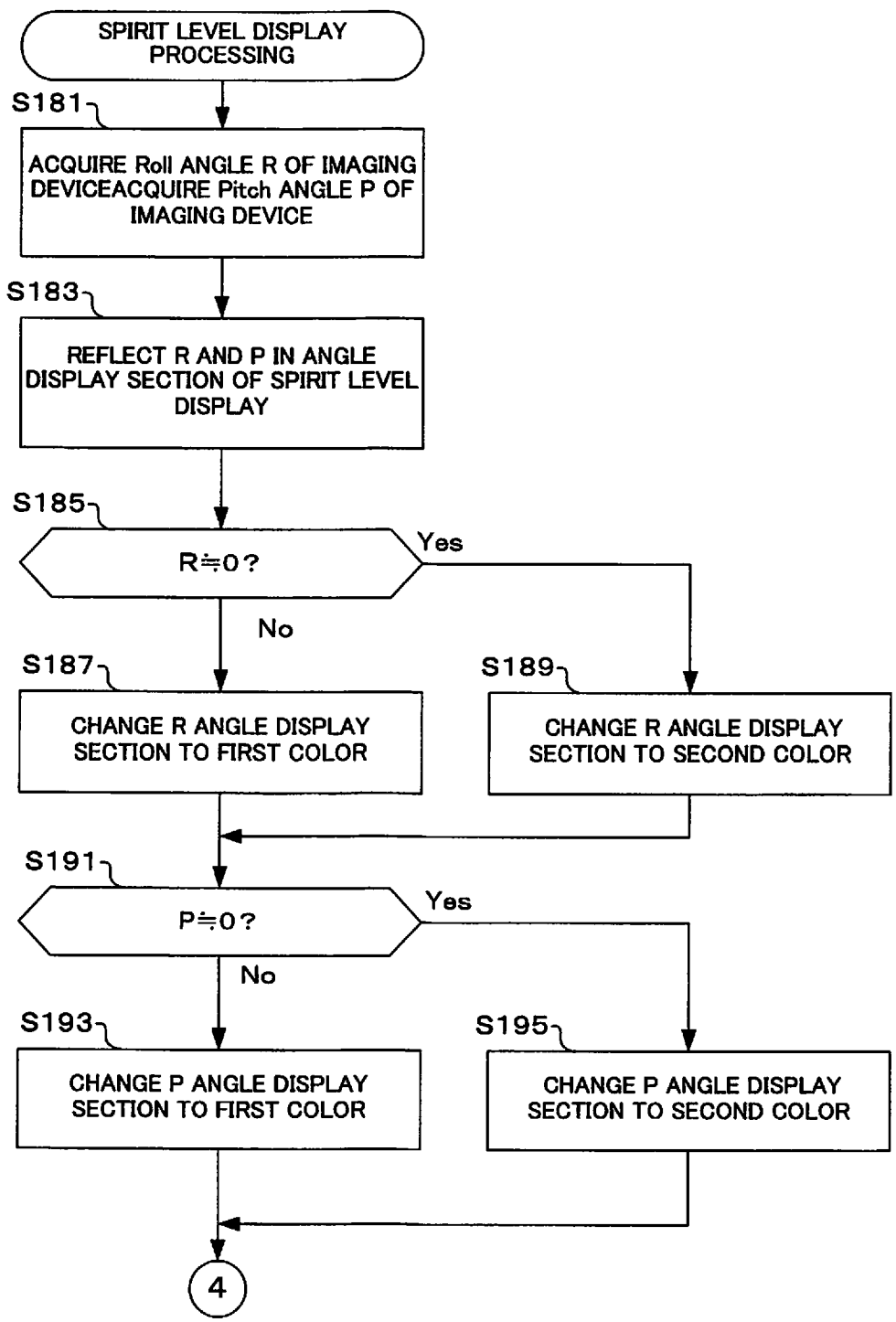
FIG. 15A and FIG. 15B are flowcharts showing spirit level display processing of the camera of one embodiment of the present invention.
Figure 15B:
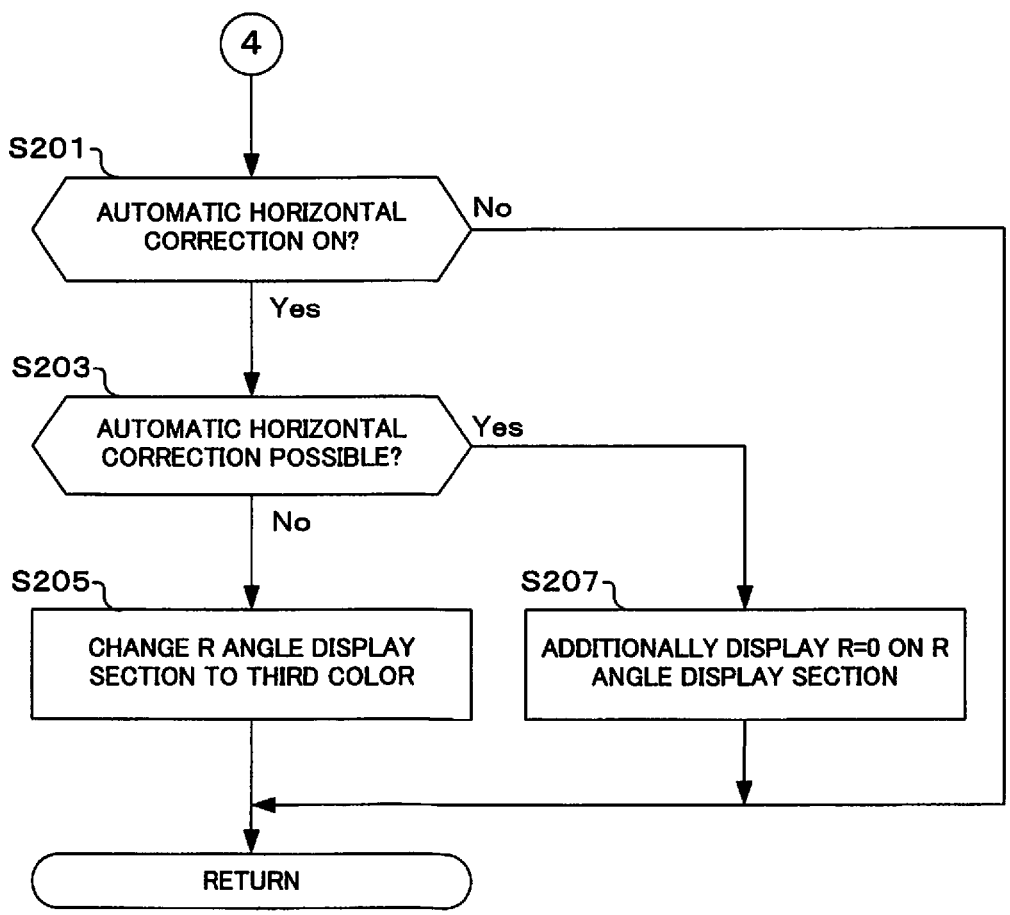

Next, the spirit level display processing of step S175 (refer to FIG. 13 and FIG. 14) will be described using the flowcharts shown in FIG. 15A and FIG. 15B.

If the flow for spirit level display processing is commenced, first of all Roll angle R and Pitch angle P of the imaging device are acquired (S181). Here, the system control section 130 acquires Roll angle R and Pitch angle P of the camera 1 using the camera shake detection section 111. It should be noted that the first angle that was calculated in FIG. 8A and FIG. 8B is a value for counteracting Roll angle.

Next, R and P are reflected on the angle display section of the spirit level display (S183). Here, Roll display 120g is displayed based on the Roll angle R that was acquired in step S181. Specifically, an angle formed by the Roll display 120g and the horizontal line 120a changes in accordance with Roll angle of the camera 1. For example, in a case where the camera 1 is inclined, as shown on the viewfinder screen F1 in FIG. 16A, inclination of the roll display 120g is displayed large. On the other hand, in a case where the camera 1 is not inclined, as shown in the viewfinder screen F2, the roll display 120g is displayed superimposed on the horizontal line 120a.

Also, in step S183 Pitch display 120h is displayed based on the Pitch angle P that was acquired in step S181. Specifically, position of the Pitch display 120h with respect to the vertical line 12a changes in accordance with Pitch angle of the camera 1. For example, as shown on the viewfinder screen F3 in FIG. 16B, if the camera 1 is tilted the Pitch display 120h, a distance by which it is separated from the center of the vertical line 120b is large, while if the camera 1 is not tilted the Pitch display 120h is displayed at a substantially central position of the vertical line 120b.

Next it is determined whether or not Roll angle R is substantially 0 (S185). Here, the system control section 130 determines whether or not the Roll angle R that was acquired in step S181 is smaller than a specified value close to 0.

If the result of determination in step S185 is that the Roll angle R is not substantially zero, specifically that the Roll angle of the camera 1 is larger than 0° by a specified amount, the R angle display section is changed to a first color (S187). Here, the system control section 130 changes the color of the Roll display 120g, as the R angle display section, to a first color, as shown on the viewfinder screen F1 in FIG. 16A. Since the value of the Roll angle R is not substantially zero the camera 1 is laterally tilted viewed from the front, and the bottom edge of a frame of a taken image is not parallel with an external horizontal line. Generally, an image that is not horizontal has the possibility of being an image that is uncomfortable to look at, and so the first color is preferably a color that lets the user know this. Specifically, if the Roll angle R is not substantially 0, then since there is a state where the live view display has not been subjected to automatic horizontal correction, the fact that there was a state where it has not been leveled with the camera in an inclined state is displayed by changing the color of the Roll display 120g to the first color.

On the other hand, if the result of determination in step S185 is that the Roll angle R is substantially 0, the R angle display section is changed to a second color (S187). Here, the system control section 130 changes the color of the Roll display 120g, as the R angle display section, to a second color, as shown on the viewfinder screen F2 in FIG. 16A. Since the value of the Roll angle R is substantially zero the camera 1 is not laterally tilted viewed from the front, and the bottom edge of a frame of a taken image is parallel with an external horizontal line. The second color is preferably a color that lets the user know this fact (for example, green or blue). Specifically, if the Roll angle R is substantially 0, then since there is a state where the live view display has been subjected to automatic horizontal correction, the fact that there is a state where leveling has been performed is displayed by changing the color of the Roll display 120g to the second color.

It should be noted that with this embodiment the color of the Roll display 120g is set to either a first or a second color in accordance with value of angle R, but difference in value of the angle R may be displayed using three or more colors. It is also possible not only to change the "color" of the Roll display 120g in accordance with difference in value of angle R, but also to change line type, such as bold line or fine line, solid line or dashed line etc. It is also possible to perform (warning) display using text or pictographs, in accordance with size of the Roll angle R.

If change in color of the R angle display section has been performed in step S187 or S189, it is next determined whether or not Pitch angle P is substantially 0 (S191). Here, the system control section 130 determines whether or not the Pitch angle P that was acquired in step S181 is smaller than a specified value close to 0.

If the result of determination in step S191 is that the Pitch angle P is not substantially zero, specifically that the Pitch angle of the camera 1 is larger than 0° by a specified amount, the P angle display section is changed to a first color (S193). Here, the system control section 130 changes the color of the Pitch display 120h, as the P angle display section, to a first color, as shown on the viewfinder screen F3 in FIG. 16B. Since the value of the Pitch angle P is not substantially 0, the camera 1 is inclined when viewed from the side, and a taken image will be directed above or below a horizontal line. Generally, an image that is looking upward or looking downward from a horizontal line has the possibility of being an image that is uncomfortable to look at, and so the first color is preferably a color that lets the user know this.

On the other hand, if the result of determination in step S191 is that the Pitch angle P is substantially 0, the P angle display section is changed to a second color (S195). Here, the system control section 130 changes the color of the Pitch display 120h, as the P angle display section, to a second color, as shown on the viewfinder screen F4 in FIG. 16B. Since the value of the Pitch angle P is substantially zero, the camera 1 is an image looking in a direction of the horizontal line. The second color is preferably a color that lets the user know this fact (for example, green or blue).

It should be noted that with this embodiment, although the color of the Pitch display 120h is set to either a first or a second color in accordance with value of Pitch angle P, difference in value of the angle P may be displayed using three or more colors. It is also possible not only to change the "color" of the Pitch display 120h in accordance with difference in value of angle P, but also to change line type, such as, bold line or fine line, solid line or dashed line etc. It is also possible to perform display using text or pictographs, in accordance with size of the Pitch angle P.

If color of the P angle display section has been changed in step S193 or S195, it is next determined whether or not automatic horizontal correction is on (S201). The user operates the automatic horizontal correction button 35 in the case of performing automatic horizontal correction. Here, the system control section 130 determines whether or not automatic horizontal correction mode has been set by operation of the automatic horizontal correction button 35. If the result of this determination is that automatic horizontal correction is not on, the flow for spirit level display processing is terminated and the originating flow is returned to.

If the result of determination in step S201 is that automatic horizontal correction is on, it is determined whether or not automatic horizontal correction is possible (S203). It is possible to automatically make an image frame of a taken image horizontal by having the imaging drive control section 109 rotate the image sensor 105 so that the Roll angle R that was detected in step S181 becomes substantially 0. However in a case where the Roll angle R is large the range in which the image sensor 105 can be rotated is exceeded, and it is not possible to make the image frame of the taken image horizontal. In this step, the system control section 130 determines whether or not automatic horizontal correction is possible based on Roll angle R and current rotation amount of the image sensor 105 from the imaging drive control section 109.

If the result of determination in step S203 is that automatic horizontal correction is not possible, the R angle display section is changed to a third color (S205). Here, the system control section 130 changes the display color for the Roll display 120g to a third color (for example red) to notify the user that automatic horizontal correction is not possible, as shown in the viewfinder screen F5 in FIG. 16C. The user rotates the camera 1 in the Roll direction until the third color (for example, red) becomes the original first color (for example, black).

On the other hand, if the result of determination in step S203 is that automatic horizontal correction is possible, a display of R=0 is additionally displayed on the R angle display section (S207). Here, as shown in the viewfinder screen F6 in FIG. 16C, since the Roll angle of the camera 1 is within the range in which automatic horizontal correction is possible, the system control section 130 changes display color of the horizontal line display 120a to a second color (for example green or blue), to notify the user of the fact that automatic horizontal correction is possible. Also, Roll display 120g representing Roll angle of the camera 1 is displayed in a first color (for example, black), and it is possible for the user to know that automatic horizontal correction is performed by the camera from the difference in operating mode of the spirit level display.

Next, a modified example of spirit level display processing will be described using FIG. 16D. With the example shown in FIG. 16A to FIG. 16C, Roll inclination amount measurement ranges 120c, 120d that can be detected by the camera shake detection section 111 were displayed. However, as was described previously, it is not possible to perform automatic horizontal correction in the entire range in which inclination amount can be detected. With this modified example a range in which automatic horizontal correction is possible is displayed in addition to the range in which inclination amount can be detected.

Figure 16C:
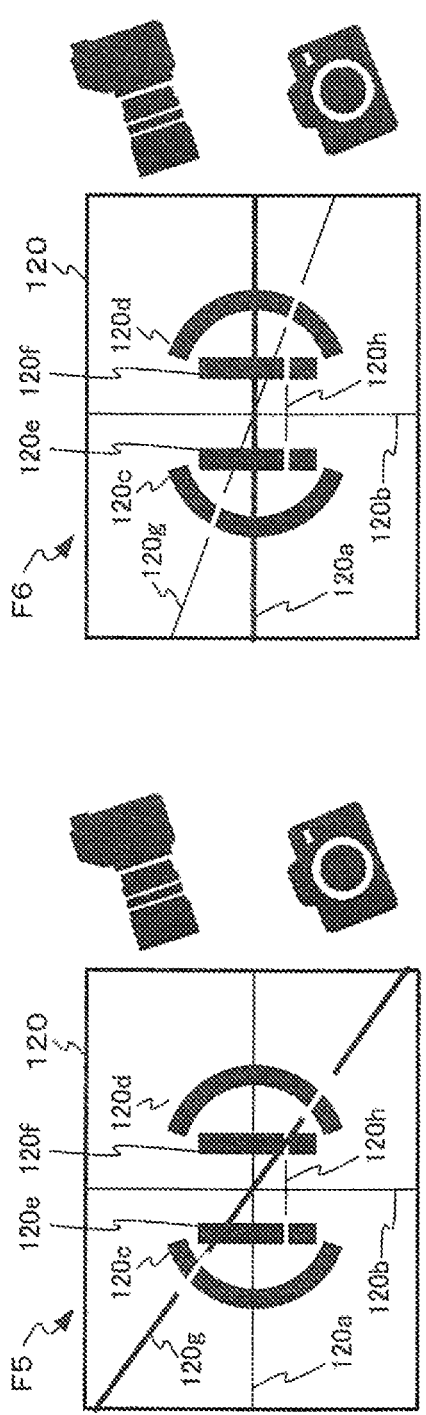
FIG. 16C is a drawing showing display examples for spirit level display in a state where automatic horizontal correction shooting is not possible (F5) and a state where automatic horizontal correction is possible (F6), in the camera of one embodiment of the present invention
Figure 16D:
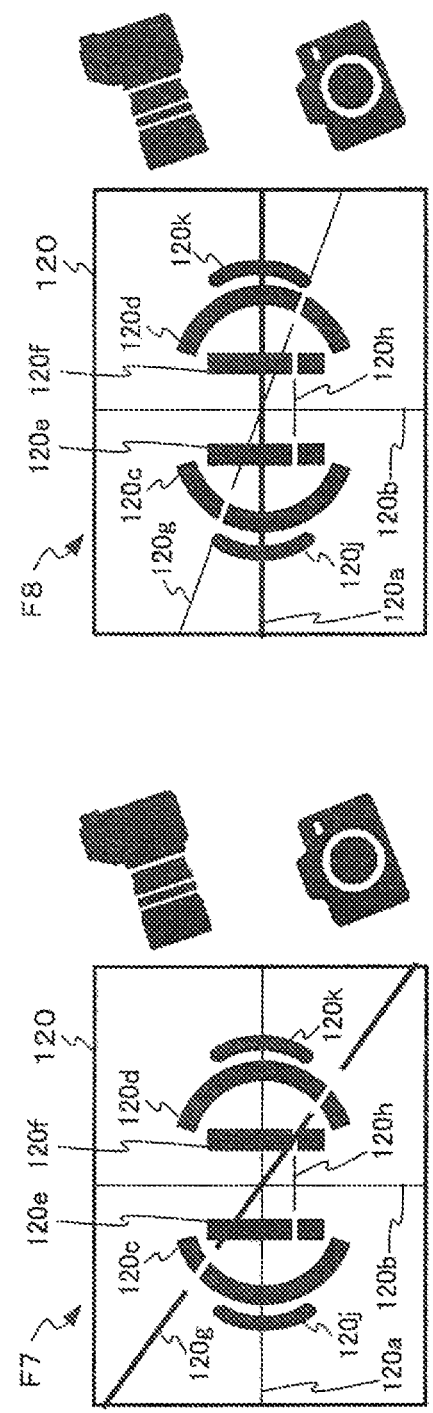
FIG. 16D is a drawing showing a modified example of display of spirit level display in a state where automatic horizontal correction shooting is not possible (F7) and a state where automatic horizontal correction is possible (F8), in the camera of one embodiment of the present invention

As shown in FIG. 16D, with this modified example automatic horizontal correction ranges 120j and 120k are displayed in addition to the Roll inclination amount measurement ranges 12c and 120d. The viewfinder screen F7 displays a case where automatic horizontal correction is not possible. In this case, the Roll display 120g is outside the range of the automatic horizontal correction ranges 120j and 120k. At this time, in order to alert the user to being outside the automatic horizontal correction range, the Roll display 120g is changed to a third color (for example, red).

Also, the viewfinder screen of FIG. 16D displays a case where automatic horizontal correction is possible. In this case, the Roll display 120g is within the range of the automatic horizontal correction ranges 120j and 120k. At this time, in order to alert the user that automatic horizontal correction is possible, the horizontal line display 120a is changed to a second color (for example, green or blue etc.).

In this way, with this modified example, the imaging device has an imaging device inclination amount display section (Roll inclination amount measurement ranges 120c, 120d) showing amount of inclination, and an automatic horizontal correction possible range display section (automatic horizontal correction ranges 120j and 120k) showing an inclination range in which automatic horizontal correction is possible. This means that it is possible for the user to execute prompt automatic horizontal correction by referencing these displays.

Figure 17:
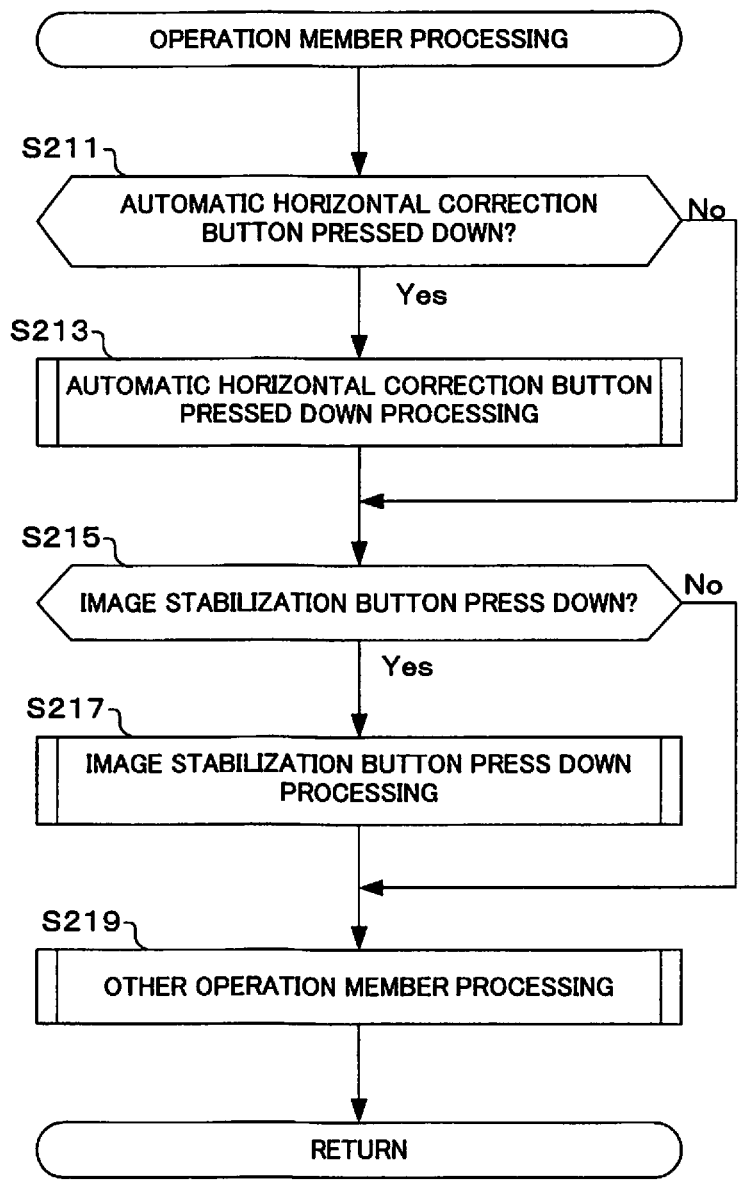
FIG. 17 is a flowchart showing operation member processing of the camera of one embodiment of the present invention.

Next, the operation member processing of step S7 (refer to FIG. 3) will be described using the flowchart shown in FIG. 17. As was described previously, the operation section 119 comprises various operation members such as the shooting mode dial 25, shutter button 27, F dial 29f, R dial 29r, automatic horizontal correction button 35 and image stabilization button 37 etc. In step S7, processing is executed when these operation members have been operated, but the flow shown in FIG. 17 will be described centering on processing when, among these operation members, the automatic horizontal correction button 35 and image stabilization button 39 have been operated.

If the flow for operation member processing is commenced, first of all determination is performed as to whether or not the automatic horizontal correction button has been pressed down (S211). Here, the system control section 130 determines whether or not the automatic horizontal correction button 35 has been operated using the operation section 119.

If the result of determination in step S211 is that the automatic horizontal correction button 35 has been pressed down, automatic horizontal correction button pressing processing is performed (S213). If the automatic horizontal correction button 35 is operated, automatic horizontal correction on off processing is performed. Also, there are three modes for automatic horizontal correction, as was described previously, namely mode 1-1, mode 1-2, and mode 2, and one of these modes is set. Detailed operation of this automatic horizontal correction button pressing processing will be described later using FIG. 18.

If the automatic horizontal correction button pressing processing is executed in S213, or if the result of determination in step S211 is that the automatic horizontal correction button 35 has not been pressed down, it is next determined whether or not the image stabilization button has been pressed down (S215). Here, the system control section 130 determines whether or not the image stabilization button 37 has been operated using the operation section 119.

If the result of determination in step S215 is that the image stabilization button 37 has been pressed down, image stabilization button pressing processing is performed (S217). If the image stabilization button 37 has been operated, image stabilization on off processing is performed. Specifically, if the image stabilization button 37 is pressed down with image stabilization in an on state image stabilization is turned off, while if the image stabilization button 37 is pressed down with image stabilization in an off state image stabilization is turned on.

If the image stabilization button pressing processing has been executed in step S217, or if the result of determination in step S215 is that the image stabilization button has not been pressed down, other operation member processing is performed (S219). Here, it is determined whether or not an operation member other than the automatic horizontal correction button 35 and the image stabilization button 37 has been operated, and if the result is that another operation member has been operated, processing depending on the operation member that has been operated is executed. If other operation member processing has been executed, the originating flows returned to.

Figure 18:
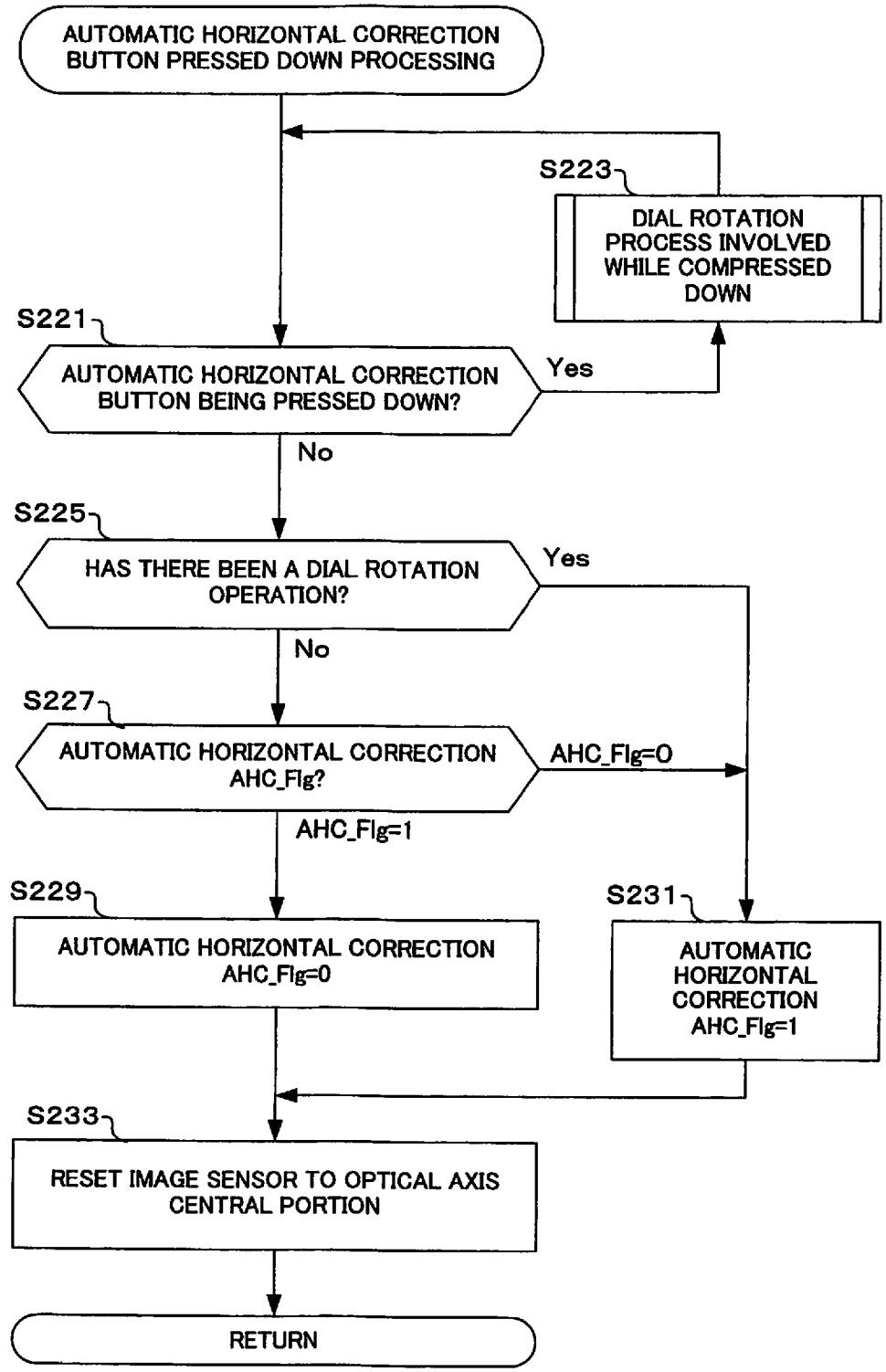
FIG. 18 is a flowchart showing automatic leveling button pressing processing of the camera of one embodiment of the present invention.

Next, the automatic horizontal correction button pressing processing of step S213 (refer to FIG. 17) will be described using the flowchart shown in FIG. 18.

If the flow for automatic horizontal correction button pressing processing is commenced, it is first determined whether or not the automatic horizontal correction button is being pressed (S221). The previously described three modes are changed by the user performing a rotation operation on the F dial 29f or R dial 29r while pressing down the automatic horizontal correction button 35. In this step, the system control section 130 determines whether or not the F dial 29f or R dial 29r is being subjected to a rotation operation at the same time as the automatic horizontal correction button 37 is being pressed down.

If the result of determination in step S221 is that the automatic horizontal correction button is being pressed down, dial rotation while button is pressed processing is executed (S223). Here, the system control section 130 performs change of automatic horizontal correction mode in accordance with the rotation operation of the F dial 29f or R dial 29r. If this dial rotation with button pressed processing is performed, step S221 is returned to. Detailed operation of the dial rotation while button is pressed processing will be described later using FIG. 19.

If the result of determination in step S221 is that the automatic horizontal correction button is not being pressed down, it is determined whether or not there is a dial rotation operation (S225). Here, the system control section 130 determines whether or not there was a rotation operation of the F dial 29f or the R dial 29r in step S223.

If the result of determination in step S225 is that there is not a dial rotation operation, determination is performed regarding the automatic horizontal correction flag AHC_Flg (S227). If the user has only pressed down the automatic horizontal correction button 35 and there is no rotation operation of the F dial 29f or R dial 29r, the only operation that is performed is changing whether automatic horizontal correction is on or off. Here, it is determined whether the automatic horizontal correction flag AHC_Flg that is stored in the memory within the system control section 130 or the nonvolatile memory 122 is "1" or "0".

If the result of determination in step S227 is that AHC_Flg=1, automatic horizontal correction flag AHC_Flg=0 is set (S229). In this case the automatic horizontal correction was turned on, and since the automatic horizontal correction button 35 has been operated automatic horizontal correction flag AHC_Flg=0 is set, to turn the automatic horizontal correction off.

On the other hand, if the result of determination in step S227 is that AHC_Flg=0, or if the result of determination in step S225 is that there has been a dial rotation operation, automatic horizontal correction flag AHC_Flg=1 is set (S231). In this case the automatic horizontal correction was turned on, and since the automatic horizontal correction button 35 has been operated automatic horizontal correction flag AHC_Flg=0 is set to turn the automatic horizontal correction off. Also, there may be cases where there are further dial rotation operations in a state where automatic horizontal correction is on. In this case also, automatic horizontal correction flag AHC_Flg=1 is set in order to maintain the automatic horizontal correction on state.

If "0" or "1" has been set in the automatic horizontal correction flag AHC_Flg in steps S229 or S231, next, the image sensor is reset to an optical axis central portion (S233). Here, the system control section 130 moves the center of the image sensor 105 so as to be lined up with the optical axis of the photographing lens 201, using the imaging drive control section 109. If the automatic horizontal correction button 35 has been operated, a sufficient inclination range for automatic horizontal correction is ensured by resetting the image sensor 105 to an optical axis central portion. If the image sensor has been reset to the optical axis central portion, automatic leveling button pressing processing is completed, and the originating flow is returned to.

Figure 19:
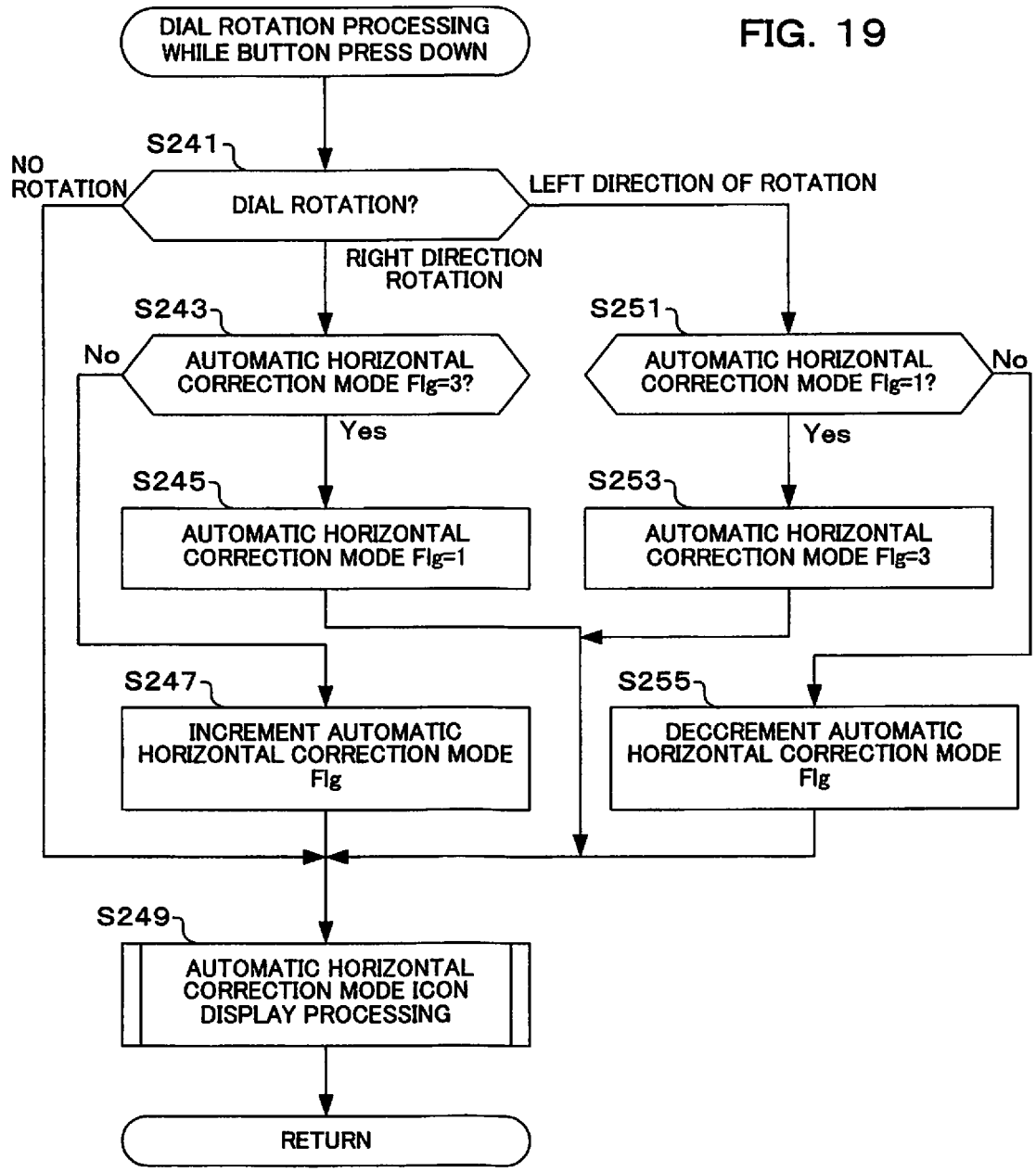
FIG. 19 is a flowchart showing dial rotation while button is pressed processing of the camera of one embodiment of the present invention.

In this way, with this embodiment, pressing operation processing for the automatic horizontal correction button 35 is made up of the following two operation processes.

button press down+dial . . . setting of automatic leveling correction mode, mode 1-1, mode 1-2, mode 2
    only button press down . . . toggle between automatic leveling correction on and off Next, the dial rotation while button is pressed processing of step S223 (refer to FIG. 18) will be described using the flowchart shown in FIG. 19. It should be noted that automatic horizontal correction mode Flg=1 within this flow corresponds to mode 1-1, automatic horizontal correction mode Flg=2 corresponds to mode 1-2, and automatic horizontal correction mode Flg=3 corresponds to mode 2. The automatic horizontal correction mode Flg has its newest value stored in memory within the system control section 130 or in the nonvolatile memory 122.

If the flow for dial rotation while button is pressed processing is commenced, whether or not there is a dial operation, and rotation direction, are determined (S241). Here, the system control section 130 detects whether the user has rotated the F dial 29f or the R dial 29r, and if there is rotation detects the direction of that rotation.

If the result of determination in step S241 is that the dial rotation direction is right direction rotation, it is determined whether or not the automatic horizontal correction mode Flg=3 (S243). If dial rotation is the right direction, mode number changes in an increasing direction. Here, the system control section 130 performs determination based on the automatic horizontal correction mode Flg that is stored in memory within the system control section 130 or in the nonvolatile memory 122.

If the result of determination in step S243 is that the automatic horizontal correction mode Flg=3, automatic horizontal correction mode Flg=1 is set (S245). Since the result of determination in step S243 is that the automatic horizontal correction mode is mode 2, then mode 1-1 should be returned to, and so automatic horizontal correction mode Flg=1 is set.

If the result of determination in step S243 is not that the automatic horizontal correction mode Flg=3, the automatic horizontal correction mode Flg is incremented (S247). In this case, if mode 1-1 was set the mode advances to mode 1-2, and if mode 1-2 was set the mode advances to mode 2.

Returning to step S241, if the result of determination in this step is that the dial rotation direction is left direction rotation, it is determined whether or not the automatic horizontal correction mode Flg=0 (S251). If dial rotation is the left direction, mode number changes in a decreasing direction. Here, the system control section 130 performs determination based on the automatic horizontal correction mode Flg that is stored in memory within the system control section 130 or in the nonvolatile memory 122.

If the result of determination in step S251 is that the automatic horizontal correction mode Flg=1, automatic horizontal correction mode Flg=3 is set (S253). Since the result of determination in step S251 is that the automatic horizontal correction mode is mode 1-1, then mode 3 should be returned to, and so automatic horizontal correction mode Flg=3 is set.

On the other hand, if the result of determination in step S251 is not that the automatic horizontal correction mode Flg=1, the automatic horizontal correction mode Flg is decremented (S255). In this case, if mode 2 was set the mode advances to mode 1-2, and if mode 1-2 was set the mode advances to mode 1-1.

If the automatic horizontal correction mode Flg is incremented or decremented in step S247 or S255, or if the result of determination in step S241 is that there is no dial rotation, automatic horizontal correction mode icon processing is performed (S249). Here, the system control section 130 performs display of the mode that is currently set on the viewfinder screen. Also, while the automatic horizontal correction button 35 is being pressed down, the system control section 130 may also display rotation direction of the F dial 29f and the R dial 29r, and the mode change direction, on the viewfinder screen.

Figure 20:
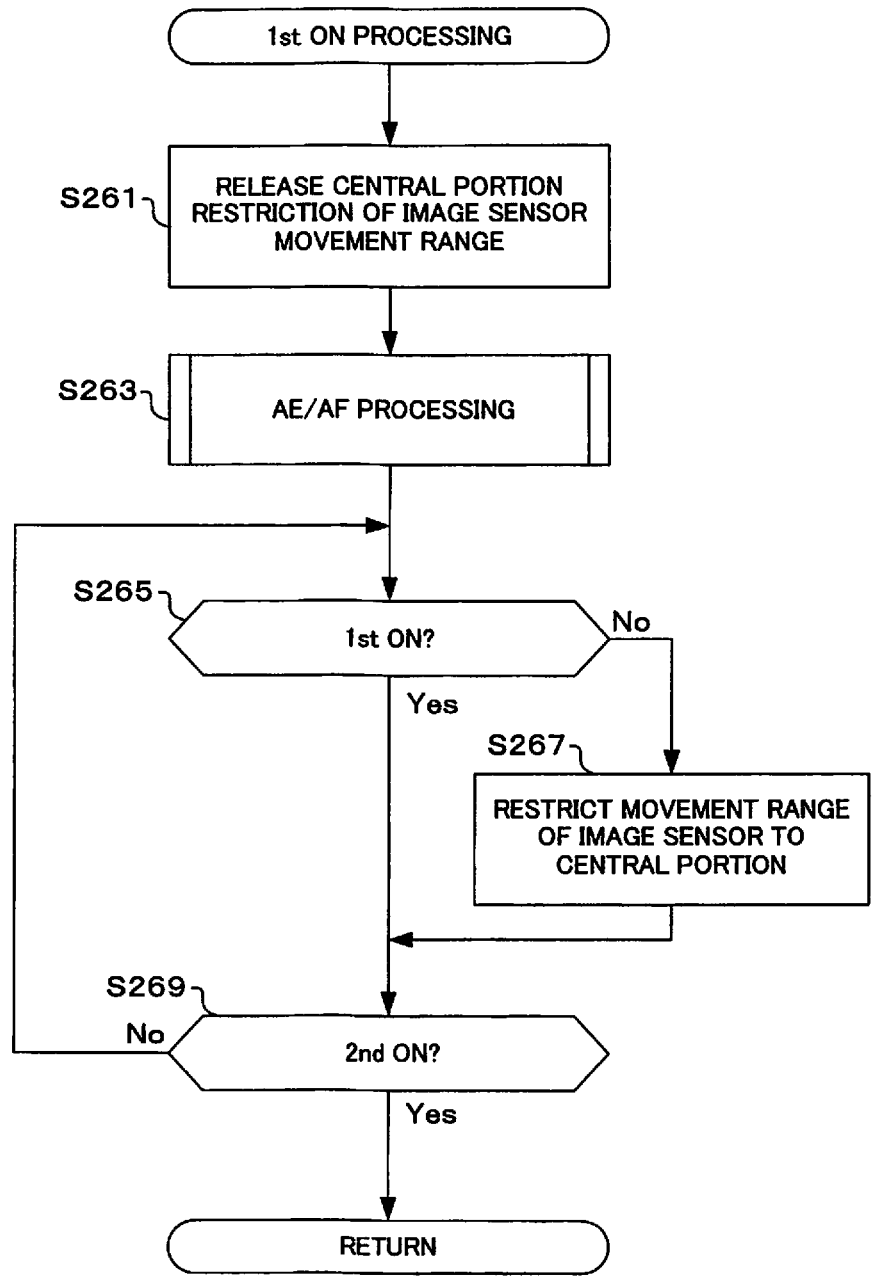
FIG. 20 is a flowchart showing 1st ON processing of the camera of one embodiment of the present invention.

Next, the 1st ON processing of step S9 (refer to FIG. 3) will be described using the flowchart shown in FIG. 20. This flow is executed when the user presses the shutter button 27 down halfway.

If the flow for 1st ON processing is commenced, first, the central portion restriction of the movement range of the image sensor is released (S261). As was described previously during live view display (refer to S3 in FIG. 3), in order to widen drive range for an automatic horizontal correction operation there may be cases where movement range of the image sensor 105 is restricted to a central portion (refer to S71 in FIG. 5A). The system control section 130 definitely performs an image stabilization operation if the 1st release switch is on, and temporarily releases restriction of the movement range of the image sensor in order to perform AE (automatic exposure) and AF (automatic focus adjustment).

If restriction of the movement range of the image sensor is released, next, AE and AF processing are performed based on a measurement frame and AF frame that have been displayed superimposed on live view (S263). Here, the system control section 130 executes AE and AF processing in the exposure control section 112 and the AF processing section 113 etc.

If the AE and AF processing is completed, it is next determined whether or not the 1st release switch is on (S265). Here, the system control section 130 determines whether or not the shutter button 27 of the operation section 119 has being pressed down halfway and the 1st release switch turned on.

If the result of determination in step S265 is that the 1st release switch is off, movement range of the image sensor is restricted to a central portion (S267). If the 1st release switch is on, sufficient image stabilization is performed by releasing the restriction of the movement range of the image sensor, and AE/AF are performed in that state. However, since the 1st release switch is off, the system control section 130 restricts movement range of the image sensor to the central portion, and the originating flow is returned to.

If the result of determination in step S265 is that the 1st release switch is on, it is next determined whether or not the 2nd release switch is on (S269). If the result of this determination is that the 2nd release switch is off, the determination processing of step S265 is returned to, while if the 2nd release switch is on the originating flow is returned to.

Figure 21:
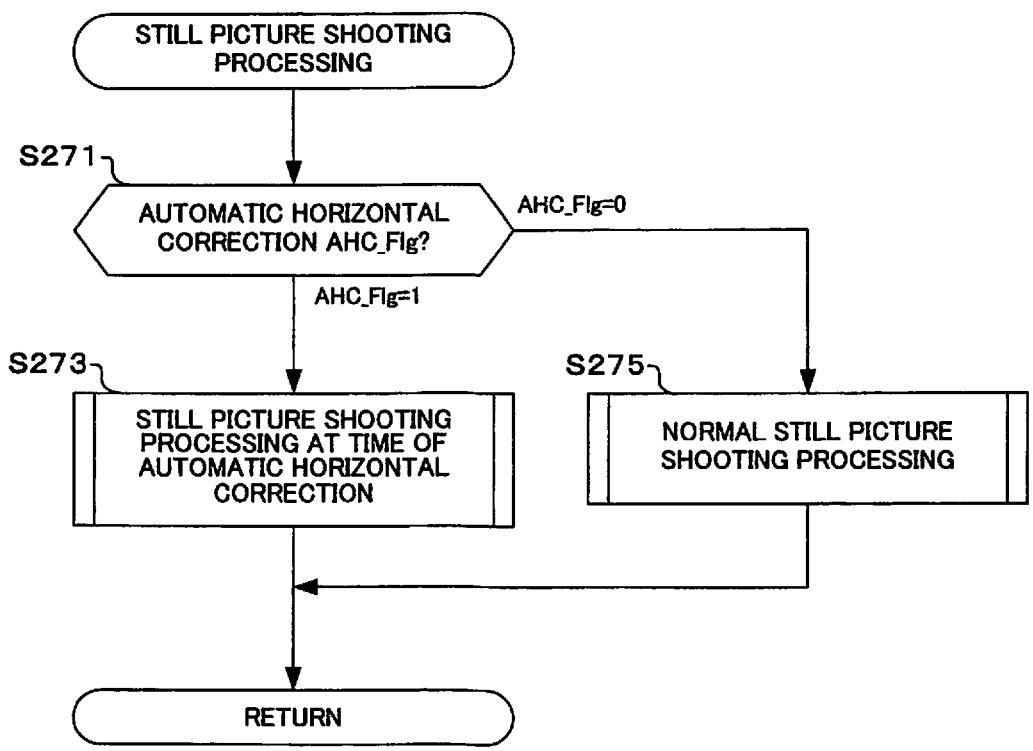
FIG. 21 is a flowchart showing still picture shooting processing of the camera of one embodiment of the present invention.

Next, the still picture shooting processing of step S13 (refer to FIG. 3) will be described using the flowchart shown in FIG. 21. This flow is executed when the user presses the shutter button 27 down fully.

If the flow for still picture shooting processing is commenced, first of all the automatic horizontal correction flag AHC_Flg is judged (S271). As was described previously the system control section 130 sets the automatic horizontal correction flag AHC_Flg to "1" if the automatic horizontal correction button 35 is on, but sets the automatic horizontal correction flag AHC_Flg to "0" if the automatic horizontal correction button 35 is off. In this step, determination is based on the set value of this automatic horizontal correction flag AHC_Flg.

If the result of determination in step S271 is that AHC_Flg=1, namely that automatic horizontal correction is on, still picture shooting processing for at the time of automatic horizontal correction is performed (S273). Here, the system control section 130 performs automatic horizontal correction and performs shooting of a still picture. Specifically, based on detection result from the camera shake detection section 111, the image sensor 105 or taken image data is rotated so that a frame of a photographing screen becomes horizontal in the shooting standby state, and performs shooting of a still picture while performing image stabilization that includes rotational blur correction so as to keep the image frame in a horizontal state. Detailed operation of this still picture shooting processing at the time of automatic horizontal correction will be described later using FIG. 22A to FIG. 22C.

On the other hand, if the result of determination in step S271 is that AHC_Flg=0, namely that automatic horizontal correction is off, normal still picture shooting processing is performed (S275). Here, the system control section 130 performs shooting processing for a still picture without performing processing for automatic horizontal correction.

If still picture shooting processing is being performed in step S273 or S275, the flow for still picture shooting processing is terminated and the originating flow is returned to. In this way, in the flow for still picture shooting processing, in a case where the automatic horizontal correction button 35 is operated and automatic horizontal correction is turned on, the image sensor 105 is adjusted based on detection result from the camera shake detection section 111 which means that it is possible to make an image frame of a taken image horizontal, and to perform shooting that does not look bad.

Next, the still picture shooting processing at the time of automatic horizontal correction of step S273 (refer to FIG. 21) will be described using the flowcharts shown in FIG. 22A to FIG. 22C.

If the flow for still picture shooting processing at the time of automatic horizontal correction is commenced, first, the central portion restriction of the movement range of the image sensor is released (S281). When the release button is pressed down fully and still picture shooting commences, there may be cases where movement range of the image sensor 105 is restricted to a central portion (when the release button is pressed down fully immediately after S265 Yes in FIG. 20, and still picture shooting processing has been commenced). At the time of still picture shooting, since it is desired to remove camera shake, in a case where movement range of the image sensor 105 has been restricted to a central portion, this restriction is released. In this way, in step S281 at least during actual exposure shooting movement restriction of the image sensor 105 is released.

Next, exposure is commenced (S282), and body side rotational blur correction is performed (S283). Here, similarly to step S75, the system control section 130 performs control so as to correct rotational blur amount, among camera shake amount that has been detected by the camera shake detection section 111, and to automatically make an image horizontal. Specifically, an image frame becomes parallel to a horizontal line as a result of automatic horizontal correction during live view. In this state, an offset component from the horizontal line due to camera shake is rotationally corrected using body side rotational blur correction. Specifically, the imaging drive control section 109 rotationally drives the image sensor 105 so that rotational blur amount that has been detected by the camera shake detection section 111 is counteracted. In this case, regardless of whether image stabilization is on or off, in the case where automatic horizontal correction is on, body side rotational correction of the image sensor 105 is performed.

If body side rotational blur correction is performed, next, the blur stabilization flag BSC_Flg is judged (S285). As was described previously (refer to S91 in FIG. 5B), in a case where image stabilization is performed, blur stabilization flag BSC_Flg=1 is set, while if image stabilization is not performed blur stabilization flag BSC_Flg=0 is set. In this step, determination is based on the blur stabilization flag BSC_Flg data stored in memory within the system control section 130 or in the nonvolatile memory 122. If the result of this determination is that BSC_Flg=0, namely that image stabilization is off, image stabilization other than rotational blur correction is not performed.

If the result of determination in step S285 is that BSC_Flg=1, namely that image stabilization is on, next the image stabilization lens flag SCL_Flg is judged (S287). As was described previously the image stabilization lens flag SCL_Flg relating to image stabilization function of the interchangeable lens that is fitted to the camera body 100 is set (refer to S93 in FIG. 5B). Specifically, in the case of a non-image stabilization lens SCL_Flg=0 is set, in the case of an image stabilization lens (without collaborative operation) SCL_Flg=1 is set, and in the case of an image stabilization lens (with collaborative operation) SCL_Flg=2 is set. In this step, determination is based on the image stabilization flag SCL_Flg that is stored in memory within the system control section 130 or in the nonvolatile memory 122.

If the result of determination in step S287 is SCL_Flg=0, or that SCL_Flg=1, namely that the interchangeable lens 200 is a non-image stabilization lens, or is an image stabilization lens but does not have collaborative operation, next, the image stabilization (Yaw, Pitch) capability is determined (S289). At the time that lens side image stabilization information was acquired in step S35 (refer to FIG. 4), image stabilization (Yaw, Pitch) capability (nominal value for number of correction stages) of the interchangeable lens 200 was acquired. Also, body side image stabilization capability (nominal value for number of correction stages) is stored in memory within the system control section 130 or in the nonvolatile memory 122. However, in the capability determination of step S289 determination uses a current residual margin of correction and not a nominal value for number of corrections stages. This is because in a state where correction members of the interchangeable lens 200 or the camera body 100 are close to a correction center position, a residual margin for correction is maximum, but in a state where the correction members are biased to the ends, the residual margin is small even if nominal value for number of corrections stages is large. The nominal value for number of corrections stages is a value in a case where correction members are close to a correction center. In this step, it is determined which image stabilization (Yaw, Pitch) capability is greater between at the body side or the interchangeable lens side.

If the result of determination in step S289 is that capability is larger at the lens side than at the body side, then lens side angular blur correction (Yaw, Pitch) is performed (S291). Here, angular blur correction is performed at the interchangeable lens 200 side. Specifically, the camera shake detection section 209 detects camera shake amount, and the image stabilization control section 205 drives the blur correction optical system 204 based on the camera shake amount that has been detected.

On the other hand, if the result of determination in step S289 is that capability is larger at the body side than at the lens side, then body side angular blur correction (Yaw, Pitch) is performed (S293). Here, angular blur correction is performed at the camera body 100 side 100. Specifically, the camera shake detection section 111 detects camera shake amount, and the imaging drive control section 109 drives the image sensor 105 based on the camera shake amount that has been detected.

If angular blur correction has been performed in step S291 or S293, shift blur correction (X, Y) capability determination is next performed (S295). At the time that lens side image stabilization information was acquired in step S35 (refer to FIG. 4), shift blur correction (X, Y) capability (nominal value for number of correction stages) of the interchangeable lens 200 was acquired. In step S295 also, similarly to step S289, determination uses a current residual margin of correction, and not the nominal value for number of correction stages of shift blur correction.

If the result of determination in step S295 is that capability is larger at the lens side than at the body side, then lens side shift blur correction (X, Y) is performed (S297). Here, shift blur correction is performed at the interchangeable lens 200 side. Specifically, the camera shake detection section 209 detects shift blur amount, and the image stabilization control section 205 drives the blur correction optical system 204 based on the shift blur amount that has been detected.

On the other hand, if the result of determination in step S295 is that capability is larger at the body side than at the lens side, then body side shift blur correction (X, Y) is performed (S299). Here, shift blur correction is performed at the camera body 100 side. Specifically, the camera shake detection section 111 detects shift blur amount, and the imaging drive control section 109 drives the image sensor 105 based on the shift blur amount that has been detected.

Returning to step S287, if the result of determination in this step is that SCL_Flg=2 has been set, specifically that the interchangeable lens 200 that is attached is an image stabilization lens (with collaborative operation), then lens side angular blur correction (Yaw, Pitch) is performed (S301). In the case where the interchangeable lens 200 is an image stabilization lens capable of collaborative operation, camera shake is corrected in the interchangeable lens 200 and the camera body 100 by dividing camera shake amount in accordance with a specified ratio. In this step, the image stabilization control section 205 performs blur correction so that angular blur amount (Yaw, Pitch) within camera shake amount that has been detected in the camera shake detection section 209 or 111 is removed.

Next, body side angular blur correction (Yaw, Pitch) is performed (S303). Here, the imaging drive control section 109 performs blur correction so that angular blur amount (Yaw, Pitch) within camera shake amount that has been detected in the camera shake detection section 209 or 111 is removed.

Next, lens side shift blur correction (X, Y) is performed (S305). Here, the image stabilization control section 205 performs blur correction so that shift blur amount (X, Y) within camera shake amount that has been detected in the camera shake detection section 209 or 111 is removed.

Next, body side shift blur correction (X, Y) is performed (S307). Here, the imaging drive control section 109 performs blur correction so that shift blur amount (X, Y) within camera shake amount that has been detected in the camera shake detection section 209 or 111 is removed.

If shift blur correction has been performed in step S307, if lens side shift blur correction has been performed in step S297, if body side shift blur correction has been performed in step S299, or if the result of determination in step S285 is that blur stabilization flag BSC_Flg=0, it is next determined whether or not exposure has been completed (S3000). If the result of this determination is not completion, processing returns to step S283. On the other hand, if exposure has been completed, image data is read out and stored in the buffer memory (S3001). After reading out of image data, it is determined whether or not the buffer memory has become full (S3002), and if the result of this determination is buffer full the flow for still picture shooting processing at the time of automatic horizontal correction is terminated and the originating flow is returned to. On the other hand, if the result of determination in step S3002 is that the buffer memory is not full, it is determined whether or not it is rapid shooting mode (S3003). If the result of this determination is rapid shooting mode, step S282 is returned to, and the next exposure is commenced. On the other hand, if the result of determination is not rapid shooting mode, the flow for still picture shooting processing at the time of automatic horizontal correction is terminated and the originating flow is returned to.

Figure 23:
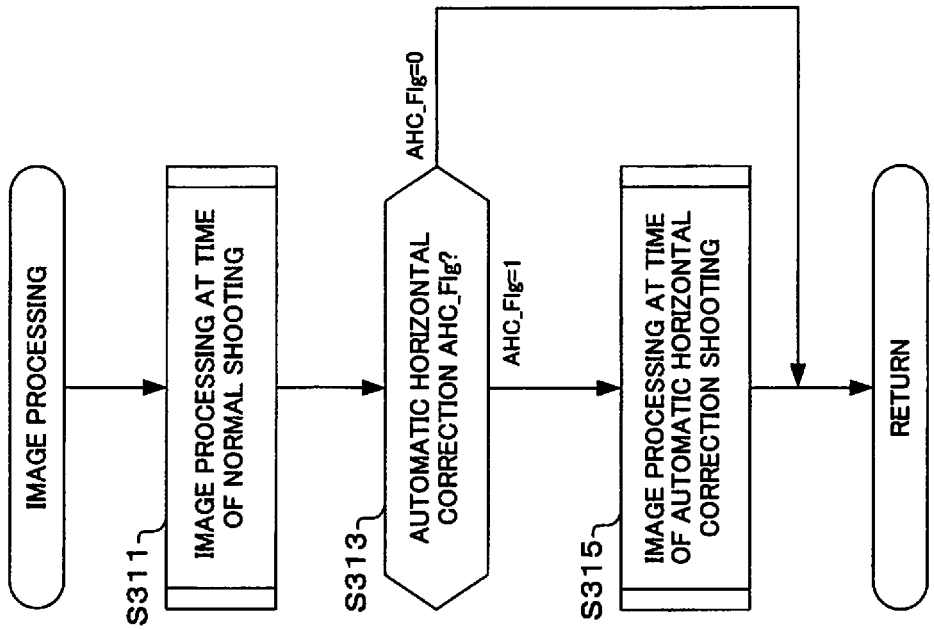
FIG. 23 is a flowchart showing image processing of the camera of one embodiment of the present invention.

Next, the image processing of step S15 (refer to FIG. 3) will be described using the flowchart shown in FIG. 23. This flow is executed for image data in the buffer memory after the user has pressed the shutter button 27 down fully and still picture shooting has been performed.

If the flow for image processing is commenced, first image processing at the time of normal shooting is performed (S311). Here, the image processing section 107 applies various image processing that is performed at the time of normal shooting, such as Beyer conversion, WB (white balance) correction, government conversion, picture mode processing, exposure correction, noise processing, edge enhancement, false color correction, etc. to image data that was acquired by the image sensor 105.

Then, the automatic horizontal correction AHC_Flg is judged (S313). As was described previously the system control section 130 sets the automatic horizontal correction flag AHC_Flg to "1" if the automatic horizontal correction button 35 is on, but sets the automatic horizontal correction flag AHC_Flg to "0" if the automatic horizontal correction button 35 is off. In this step, determination is based on the set value of this automatic horizontal correction flag AHC_Flg. If the result of this determination is AHC_Flg=0, namely that automatic horizontal correction is off, the flow for image processing is terminated and the originating flow is returned to.

On the other hand, if the result of determination in step S271 is that AHC_Flg=1, namely that automatic horizontal correction is on, image processing for at the time of automatic horizontal correction shooting is performed (S315). As was described previously, there are three automatic horizontal correction modes, namely mode 1-1, mode 1-2, and mode 2. Here, image processing is applied in accordance with the automatic horizontal correction mode. Detailed operation of this image processing at the time of automatic horizontal correction will be described later using FIG. 24.

Figure 24:
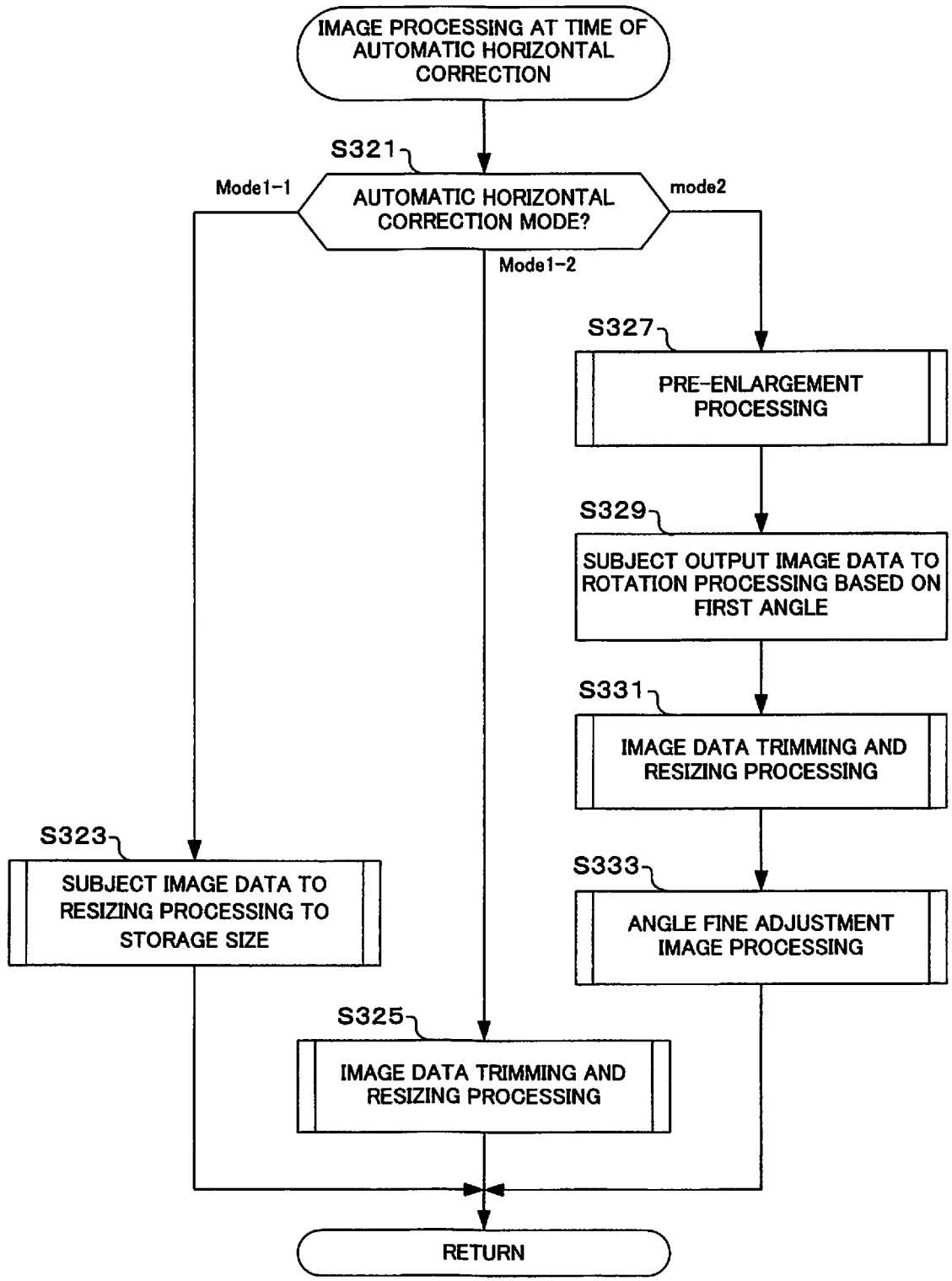
FIG. 24 is a flowchart showing image processing at the time of automatic horizontal correction, for the camera of one embodiment of the present invention.

Next, the image processing at the time of automatic horizontal correction of step S315 (refer to FIG. 23) will be described using the flowchart shown in FIG. 24.

If the flow for image processing of the time of automatic horizontal correction is commenced, first, the automatic horizontal correction mode is determined (S321). Here, similarly to step S63 (refer to FIG. 5A), the system control section 130 determines whether or not either of mode 1-1, mode 1-2, or mode 2 has been set as the automatic horizontal correction mode. Specifically, the system control section 130 checks the automatic horizontal correction mode, and checks if it is a mode for performing electronic rotation using image processing, and checks if it is a mode for performing rotation of the image sensor. It should be noted that mode 1-1 is a mode in which image data is not subjected to rotation processing, and only optical image stabilization is applied. Mode 1-2 is a mode in which image data is not subjected to rotation processing and electronic image stabilization is performed, restricted to while live view is in progress. Mode 2 is a mode in which image data is subjected to rotation processing during live view, and optical image stabilization is performed. Further, in mode 2 image data rotation processing is performed after shooting.

If the result of determination in step S321 is mode 1-1, specifically that rotation processing for image data will not be performed, and optical blur correction will be performed, the image data is subjected to resizing processing to a storage size (S323). In this case image stabilization and automatic horizontal correction are performed completely with optical correction, and since rotation processing of image data is not performed angle of view does not become small, and so the computational processing section 107 performs only resizing processing in accordance with a storage size that has been designated by image quality mode, without trimming of image data. It should be noted that image quality mode is set on a menu screen or the like.

If the result of determination in step S321 is mode 1-2, specifically that rotation processing for image data will not be performed, and electronic image stabilization will be performed, the image data is subjected to resizing processing to a storage size after having been trimmed (S323). In this case, the image processing section 107 performs electronic image stabilization without performing rotation processing on the image data, that is, performs trimming processing so as to remove camera shake from image data. Cutting out (trimming processing) is performed except for a margin region for this electronic image stabilization. The image processing section 107 resizes the image data that has been subjected to this trimming processing to a storage size that has been designated by image quality mode.

If the result of determination in step S321 is mode 2, namely that rotation processing of image data is performed after shooting, first, pre-enlargement processing is performed (S327). Here, the image processing section 107 applies enlargement processing to image data that has been acquired from the image sensor 105, and applies rotation processing to this image data that has been enlarged. By performing enlargement processing it is possible to prevent degradation in image quality, such as jaggies. It should be noted that in a case where RAW has been set as image quality mode, enlargement processing is not performed.

Next, rotation processing of image data is performed based on the first angle (S329). Here, the image processing section 107 performs rotation processing on image data that was enlarged in step S327, based on a first angle that was detected immediately before actual exposure, or during actual exposure.

Next, trimming and resizing processing of the image data is performed (S331). Here, the image processing section 107 cuts out (trimming processing) image data from the image data that has been subjected to rotation processing, so that the image data becomes level.

Next, angle fine adjustment image processing is performed (S333). Image processing is performed, using automatic horizontal correction, so that an image frame of an image becomes horizontal. However in a case where the image sensor 105 is rotated by the imaging drive control section 109, there may be cases where performing angle adjustment precisely is difficult. With this embodiment, therefore, images that are inclined by a specified plurality of minute angles are generated by image processing, and the user selects from among these images after they have been generated. If the user sets specified angle interval, and number of rotations (number of right rotations, number of left rotations), using a menu screen or the like, the image processing section 107 generates a plurality of images that are shifted by a minute angle based on the setting values.

Once the image processing has been applied in steps S323, S325 and S333, the flow for image processing at the time of automatic horizontal correction is terminated, and the originating flow is returned to.

As has been described above, the imaging device of one embodiment and modified examples of the present invention forms a subject image on an image sensor using an imaging optical system, and acquires images. This imaging device comprises an angular speed detection section (for example, camera shake detection section 111) that detects angular speed that has been applied to the imaging device, a horizontal correction instruction section (for example, automatic horizontal correction button 35) that instructs horizontal correction of the image sensor or an output image of the image sensor with respect to an image frame, a horizontal angle calculation section (refer, for example, to S159 in FIG. 8B) that detects vertical direction or horizontal direction of the imaging device or the image sensor, and calculates and outputs a first angle around the optical axis of the image sensor in order to horizontally correct the image sensor or an output image of the image sensor with respect to an image frame, and an image sensor drive section (for example, the imaging drive control section 109 in FIG. 2B) that rotates the image sensor around the optical axis based on detection result from the angular speed detection section or calculation result from the horizontal angle calculation section.

The imaging device of the one embodiment and modified example of the present invention also comprises a movement range restriction section (refer, for example, to S71 in FIG. 5A, and to FIG. 7A to FIG. 7C), that, at the time of shooting standby, when rotating the image sensor, based on detection result from the angular speed detection section or calculation result from the horizontal angle calculation section, restricts a region in which the image sensor is capable of moving to a first region that includes a central region of the optical axis, so as to maximize an angular range in which the image sensor can rotate, and a shooting instruction section that instructs preparation or commencement of shooting (refer, for example, to the shutter button 27 of FIG. 1, the operation section 119 of FIG. 2B, and steps S5, S9, and S11 in FIG. 3). The movement range restriction section sets a region in which the image sensor is capable of moving to a second region that is wider than at the time of shooting standby, and includes the first region, based on instruction of the shooting instruction section (refer, for example, to S5 and S9 in FIG. 3, and to S261 in FIG. 20).

In this way, with the one embodiment and modified example of the present invention, before instructing preparation for shooting or commencement of shooting, movement range of the image sensor is restricted to a first region, but once preparation for shooting or commencement of shooting has been instructed, movement range of the image sensor is made a second region which is wider than the first region, to relax restriction of movement range. Before instructing preparation for shooting or commencement of shooting, movement range of the image sensor is made close to a central region of the optical axis in order to make it possible to sufficiently demonstrate a function of automatic horizontal correction using image stabilization. On the other hand once preparation for shooting or commencement of shooting has been instructed, movement range of the image sensor is widened from the central region of the optical axis in order to make it possible to sufficiently demonstrate a function of image stabilization. Specifically, at the time of shooting standby, since movement of the image sensor with shooting standby in progress is restricted to movement in a central portion region, it is possible to maximize a possible rotation angle range of an angular rotation section for horizontal correction, and it is possible to maximize horizontal correction angle regardless of the extent of camera shake. Further, since movement restriction is released before preparation or commencement of shooting, image stabilization amount for a taken image can also be maximized. As a result, in a shooting standby state and at the time of actual shooting it is possible to restrict so that image stabilization and automatic horizontal correction become optimum.

Also, with the one embodiment and modified example of the present invention, there is a reference angle storage section for storing a second angle representing a reference angle about the optical axis of the image sensor (refer, for example, to FIG. 9 regarding the second angle), and the horizontal angle calculation section respectively switches between, and outputs, the first angle and the second angle based on instruction from the horizontal correction instruction section (refer, for example, to S67, S73, and S81 in FIG. 5A). In this way the first angle is switched to in the case of the forming automatic horizontal correction, while the second angle (reference angle) is switch to in the case of not performing automatic horizontal correction, and making an image frame horizontal is performed based on the first or second angle.

Also, with the one embodiment and modified example of the present invention, the image sensor drive section comprises a image sensor angular rotation section that rotationally drives the image sensor in a direction about the optical axis so that a difference between calculation results of the horizontal angle calculation section and angle of the image sensor at the current point in time is eliminated (refer, for example to S73 in FIG. 5A), and a rotational blur correction section that corrects rotational blur by rotating the image sensor in a direction about the optical axis based on output of the angular speed detection section (refer, for example, to S75 in FIG. 5A, and S99, S119 etc. in FIG. 5B). The image sensor angular rotation section rotationally drives the image sensor at a slower rotation speed than the rotational blur correction section (refer, for example, to FIG. 10A to FIG. 10O). In this way, there is a configuration such that it is possible to separate response speed of image angular rotation for automatic horizontal correction and response speed for rotational blur correction. Response speed for image angular rotation for automatic horizontal correction is slow compared to response speed for rotational blur correction, which means that there is no impairment to precision of leveling due to the effects of noise caused by camera shake. Further, a live view display image no longer suffers from fine rotary rocking that is unfavorable, and stable, favorable and convenient live view can be obtained.

Also, with the one embodiment and modified example of the present invention, the image sensor angular rotation section rotates the image sensor faster as camera shake amount becomes smaller (refer, for example, to FIG. 10A to FIG. 10O). This means that the more rapidly automatic horizontal correction is performed, the less the effect of noise due to camera shake, resulting in a state such as where the camera is attached to a tripod, which means live view having good usability can be obtained.

Also, with the one embodiment and modified example of the present invention, the movement range restriction section relaxes the restriction of movement range of the image sensor with shooting standby in progress as camera shake amount become smaller and as shutter speed becomes faster, or as focal length become shorter. Specifically since there is a configuration so as to relax central restriction at the time of shooting standby depending on shooting conditions in which it is unlikely that camera shake will have an effect (such as when camera shake is small, or with fast shutter speed or short focus) live view that has maximum horizontal correction angle and is only slightly affected by camera shake can be obtained.

Also, with the one embodiment and modified example of the present invention, the imaging device has a display section for displaying live view display (refer, for example, to the EVF 21 and rear surface monitor 23 in FIG. 1, and to the display section 120 in FIG. 2B). This display section is capable of displaying automatic horizontal correction valid display, indicating that there is a state where automatic horizontal correction has been performed (refer, for example, to Roll display 120g in FIG. 16A), and automatic horizontal correction invalid display indicating that there is not a state where live view display has been subjected to automatic horizontal correction (refer, for example, to Roll display 120g in FIG. 16A). In order to prevent unsightly live view, automatic horizontal correction is preferably performed comparatively slowly. In this case, it becomes difficult to determine whether or not automatic horizontal correction is completed, even if a live view image is viewed. In particular, the more difficult it becomes to determine whether or not correction is complete, the closer it gets to horizontal. It is therefore made possible for the display section to display automatic horizontal correction valid display indicating that there is a state where live view display has been subjected to automatic horizontal correction, and automatic horizontal correction invalid display indicating that there is not a state where live view display has been subjected to automatic horizontal correction. Because of this structure it is possible to prevent mistakes where shooting is erroneously performed before having sufficiently completed horizontal correction, and it is possible to provide a horizontal correction function having good usability.

Also, with the one embodiment and modified example of the present invention, the display section is made capable of displaying inclination display indicating inclination amount of the imaging device (refer, for example, to Roll display 120g in FIG. 16D), and range display indicating intonation range in which automatic horizontal correction is possible (refer, for example, to automatic horizontal correction ranges 120j and 120k in FIG. 16D. The imaging device has a limit of range for inclination at which automatic horizontal correction is possible, and correction cannot be performed if the photographer does not hold the camera within a specified angle. Therefore, a spirit level is displayed on the display section in association with an automatic horizontal correction instruction, and together with display of current inclination a specified angle range in which automatic horizontal correction is valid is displayed. With this structure, it is possible for the photographer to simply implement horizontal correction, and it is possible to provide a horizontal correction function having good usability.

Also, with the one embodiment and modified example of the present invention, the image sensor angular rotation section rotates the image sensor faster as camera shake amount becomes smaller (refer, for example, to FIG. 10A to FIG. 10C). The device is configured so that rotation speed for angular correction of the image sensor at the time of performing automatic horizontal correction is changed in accordance with camera shake amount. Therefore, in cases such as at the time of tripod setting, when photographer camera shake is small etc. it is possible to rapidly complete automatic horizontal correction, and it is possible to provide an automatic horizontal correction function having good usability.

Also, with the one embodiment and modified example of the present invention, the imaging device has a horizontal angle calculation section for calculating and outputting a first angle about the optical axis of the image sensor, in order to correct an output image of the image sensor to be leveled with respect to an image frame (refer, for example, to S159 in FIG. 8B), an image sensor drive section for rotating the image sensor about the optical axis (for example, the imaging drive control section 109), and an image processing section that performs electronic image stabilization processing for removing camera shake amount on an image that has been acquired using the image sensor (for example, the image processing section 107), wherein with shooting standby in progress, the image sensor drive section rotates the image sensor about the optical axis based on a first angle (for example, S73 in FIG. 5A), and the image processing section performs electronic image stabilization processing for removing camera shake amount on the image (for example, S103 in FIG. 5B). If automatic horizontal correction is performed by rotating the image sensor, range of movement for image stabilization becomes narrow. Therefore, by restricting during live view in combination with electronic camera shake correction, both automatic horizontal correction and image stabilization are sufficiently performed.

Also, with the one embodiment and modified example of the present invention, when the imaging device has performed automatic horizontal correction by rotating the image sensor the image sensor drive section performs rotational blur correction based on Roll output that has been detected by the angular speed detection section (refer to S75 in FIG. 5A). As a result it is possible to remove the effects of user camera shake that is generated at the time automatic horizontal correction was performed.

Figure 22A:
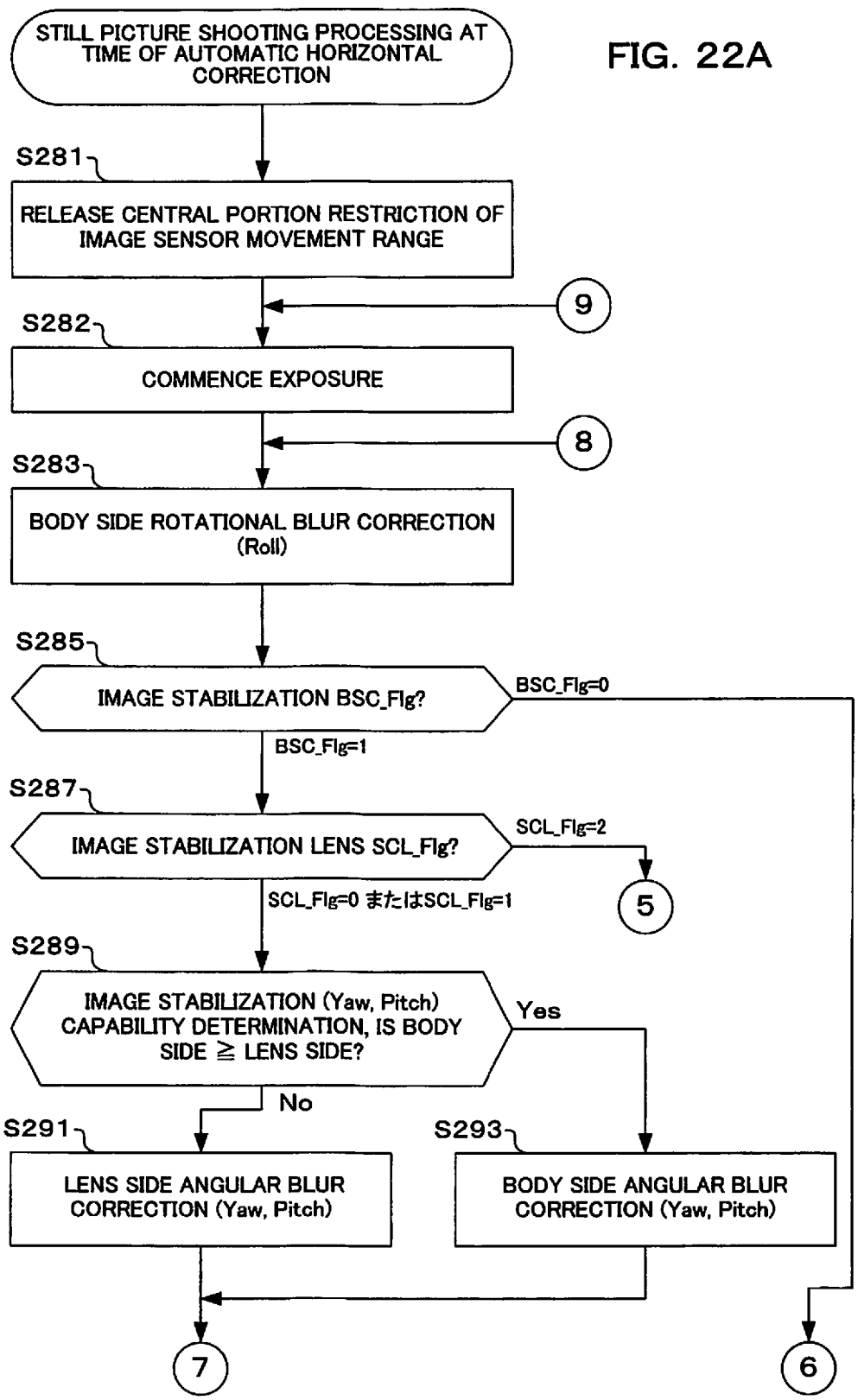
FIG. 22A to FIG. 22C are flowcharts showing still picture shooting processing at the time of automatic horizontal correction, for the camera of one embodiment of the present invention.
Figure 22B:
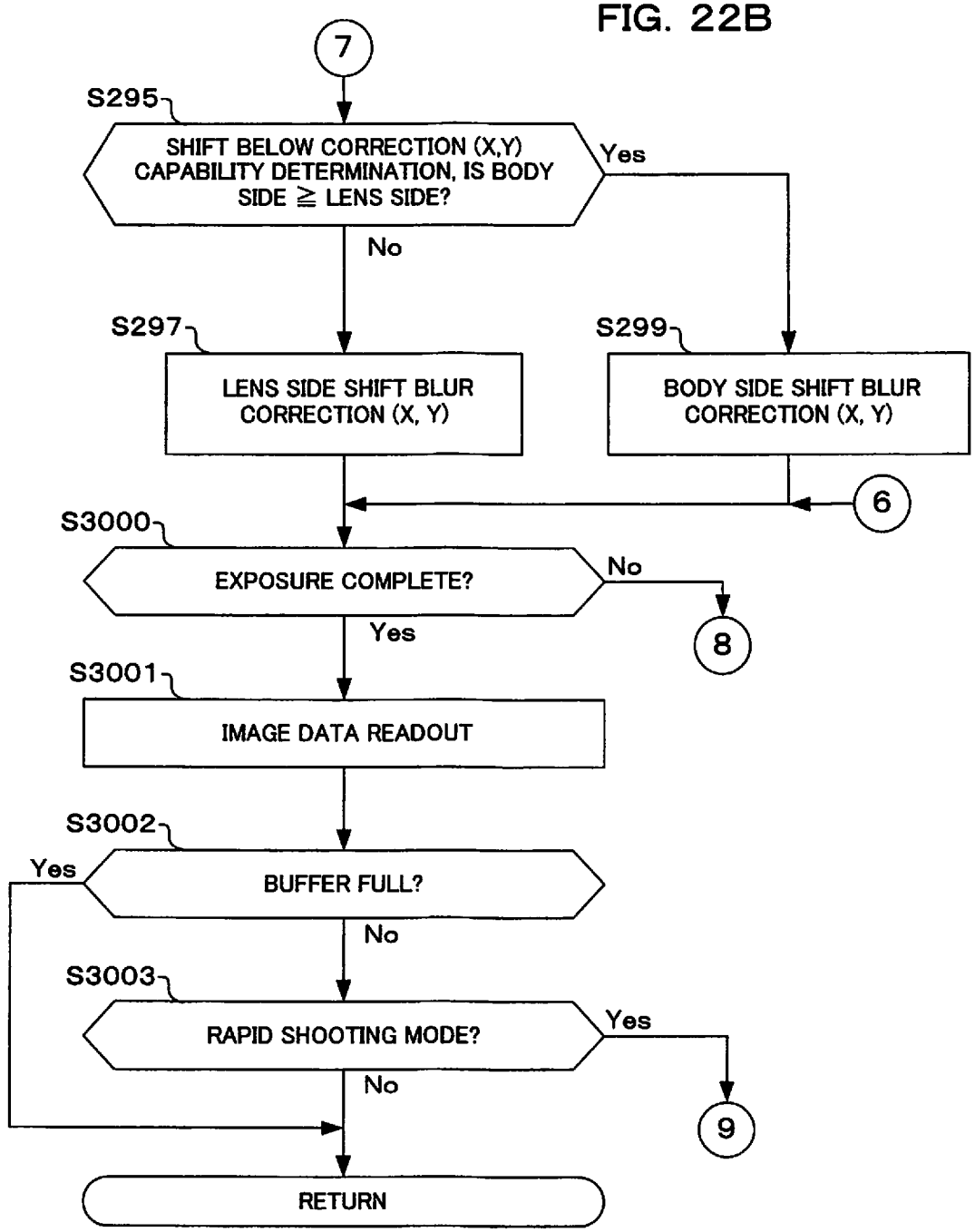
Figure 22C:
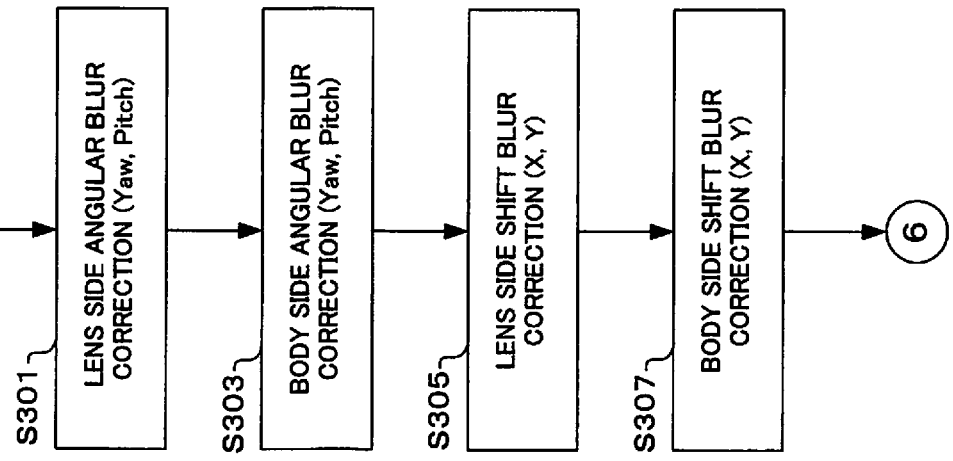

Also, with the one embodiment and modified example of the present invention, the imaging device performs electronic image stabilization processing using the image processing section in a case where a horizontal correction instruction has been issued, (refer, for example, to S103 in FIG. 5B), and in the case where a shooting preparation instruction or shooting commencement instruction has been issued performs optical image stabilization instead of the electronic image stabilization (refer, for example, to S283 in FIG. 22A). Since electronic image stabilization is performed during live view, live view having a maximum horizontal correction angle and reduced camera shake effect can be obtained. With this type of structure it is possible to make image stabilization compatible with horizontal correction throughout shooting standby in progress and shooting in progress.

Also, with the one embodiment and modified example of the present invention, the imaging device comprises an angular speed detection section that detects angular speed that has been applied to the imaging device (for example, the camera shake detection section 111), a horizontal correction instruction section (for example, automatic horizontal correction button 35) that instructs horizontal correction of the image sensor or an output image of the image sensor with respect to an image frame, a horizontal angle calculation section (refer, for example, to S159 in FIG. 8B) that calculates and outputs a first angle around the optical axis of the image sensor in order to horizontally correct the image sensor or an output image of the image sensor with respect to an image frame, and an image data rotation processing section (for example the image processing section 107 in FIG. 2B) that, when horizontal correction has been instructed, subjects a first output image or a second output image of the image sensor to rotation image processing based on the first angle. Here, the first output image is an image that has been acquired during shooting standby (for example, during live view display), and the second output image is an image that has been acquired during actual exposure (exposure after shooting commencement). With the above described imaging device, since image rotation processing is performed on a first image for live view that has a small image size based on the first angle (horizontal correction angle) without relying on rotation of the image sensor for angle rotation for automatic horizontal correction, it is possible to rapidly display a live view image that has been subjected to automatic horizontal correction. It should be noted that by combining rotation processing and image stabilization that includes rotational blur correction using the image sensor it is possible to perform stabilized automatic horizontal correction display, even if some time is required for image rotation processing.

Also, with the one embodiment and modified example of the present invention, the image processing section of the imaging device generates first image data made up of a number of pixels that is smaller than a number of pixels of the image sensor and larger than a number of display pixels for live view, by performing enlargement processing on image data for live view that has been output from the image sensor (refer, for example, to S327 in FIG. 24), performs rotation processing on the first image data based on the first angle (refer, for example, to S329 in FIG. 24), and generates an automatic horizontal correction image by performing trimming processing on the image data that has been subjected to this rotation processing. Also, the image processing section of the imaging device generates a second image made up of a number of pixels that is larger than a number of pixels of the image sensor and larger than a number of display pixels of a storage size for storage in external storage, by performing enlargement processing on image data for storage that has been output from the image sensor (refer, for example, to S327 in FIG. 24), performs rotation processing on the second image data based on the first angle (refer, for example, to S329 in FIG. 24), and generates an automatic horizontal correction image by performing trimming processing on the image data that has been subjected to this rotation processing. In this way, since there is a structure where image rotation processing is performed based on a horizontal correction angle after having resized image data to a large size, in shooting of a large image size such as a still picture it is possible to prevent image degradation such as the occurrence of jaggies etc. due to image rotation processing, even without relying on rotation using the image sensor.

Also, with the one embodiment and modified example of the present invention, the imaging device comprises an angular speed detection section that detects angular speed that has been applied to the imaging device (for example, the camera shake detection section 111 in FIG. 2B), an image sensor image stabilization section that performs image stabilization while rotating the image sensor about the optical axis, based on the angular speed that has been detected by the angular speed detection section (for example, the imaging drive control section 109 in FIG. 2B), a lens image stabilization section (for example, the image stabilization control section 205 in FIG. 2A) that performs image stabilization by moving a lens optical element (for example, the image stabilization optical system 204 in FIG. 2A), and an image stabilization collaborative operation determination section that determines whether or not lens image stabilization and image sensor image stabilization are capable of collaborative operation (refer, for example, to S37 and S43 in FIG. 4). Therefore, in a case where collaborative operation not possible has been determined using the image stabilization collaborative operation determination section, either lens image stabilization continues to be performed, or some or all of the lens image stabilization is stopped and image sensor image stabilization is performed by relaxing restriction on image sensor movement range (refer, for example, to S71 in FIG. 5A, and S107 and S109 in FIG. 5B), while if collaborative operation is possible restriction of image sensor movement range is reduced and image sensor image stabilization is performed by collaborative operation (refer to S79, and S111 to S119). It is possible to respectively perform optimum image stabilization in a case where collaborative operation of lens image stabilization and image sensor image stabilization is possible, and in a case where it is not. Also, with a configuration such that at the time of shooting standby movement of the image sensor is movement restricted to a central portion region so as to maximize possible rotation angle range of the horizontal correction angular rotation section, and where lens image stabilization is performed, and image sensor image stabilization amount is maximized for a taken image by releasing the movement restriction immediately before commencement of actual exposure, and making it possible to change correction distribution between lens image stabilization of the photographing lens and image stabilization of the image sensor with shooting standby in progress and during shooting, it is possible to make horizontal correction and image stabilization compatible with each other for the entire period from live view shooting standby in progress to shooting in progress.

It should be noted that with the one embodiment and modified example of the present invention, image stabilization (refer, for example, to FIG. 5B) is performed after having performed automatic horizontal correction (refer, for example, to FIG. 5A). However, this is not limiting and automatic horizontal correction and image stabilization may be performed in parallel, or the order in which they are performed may be switched.

Also, regarding each of the functions of the system control section 130 and within the communication control section 211, besides being implemented in the form of software using a CPU and programs, some or all of these sections may be constructed with hardware circuits, or may have a hardware structure such as gate circuitry generated based on a programming language described using Verilog, or may use a hardware structure that uses software, such as a DSP (digital signal processor). Suitable combinations of these approaches may also be used. Also, the present invention is not limited to CPU, and elements that fulfill the function as a controller may be used, and each of the above described functions may also be performed by one or more processors that are configured as hardware. For example, each function may be a processor constructed as respective electronic circuits, and may be respective circuits sections of a processor that is constructed with an integrated circuit such as an FPGA (Field Programmable Gate Array). Alternatively, a processor that is constructed with one or more CPUs may execute functions of each section, by reading out and executing computer programs that have been stored in a storage medium.

Also, with the one embodiment and modified example of the present invention, some or all of the peripheral circuits of the system control section 130 and communication control section 211 may be implemented using a CPU (Central Processing Unit) and program code, may be implemented by circuits that are executed by program code such as a DSP (Digital Signal Processor), may use a hardware structure such as gate circuits that are generated based on a programming language described using Verilog, or may be executed using hardware circuits. Also, some functions of the CPU 31 may be implemented by circuits that are executed by program code such as a DSP, may use a hardware structure such as gate circuits that are generated based on a programming language described using Verilog, or may be executed using hardware circuits.

Also, with the one embodiment and modified example of the present invention, an instrument for taking pictures has been described using a digital camera, but as a camera it is also possible to use a digital single lens reflex camera or a compact digital camera, or a camera for movie use such as a video camera or movie camera, and further to have a camera that is incorporated into a mobile phone, a smartphone a mobile information terminal, personal computer (PC), tablet type computer, game console etc., or a camera for medical use (for example, a medical endoscope), a camera for a scientific instrument such as a microscope, an industrial endoscope, a camera for mounting on a vehicle, a surveillance camera etc. In any event, it is possible to adopt the present invention as long as a device is for taking pictures having an automatic horizontal correction function.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, with the one embodiment of the present invention, operation of this embodiment was described using flowcharts, but procedures and order may be changed, some steps may be omitted, steps may be added, and further the specific processing content within each step may be altered. It is also possible to suitably combine structural elements from different embodiments.

Also, regarding the operation flow in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, 'section,' 'unit,' 'component,' 'element,' 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. An imaging device, that forms a subject image on an image sensor using an imaging optical system, and acquires an image, comprising:
    an angular speed detection sensor that detects angular speed of the imaging device;
    a horizontal correction instruction interface for instructing horizontal correction of the image sensor or an output image of the image sensor with respect to an image frame;
    a processor having a horizontal angle calculation section that detects vertical direction or horizontal direction of the imaging device or the image sensor, and calculates and outputs a first angle around the optical axis of the image sensor in order to horizontally correct the image sensor or an output image of the image sensor with respect to an image frame;
    an image sensor drive actuator that rotates the image sensor around the optical axis based on detection result from the angular speed detection sensor or calculation result from the horizontal angle calculation section; and
    a shooting instruction interface for instructing preparation or commencement of shooting,
    wherein, the processor further comprises a movement range restriction section, the movement range restriction section, at the time of shooting standby, when rotating the image sensor based on detection result from the angular speed detection sensor or calculation result from the horizontal angle calculation section, restricting a region in which the image sensor is capable of moving to a first region that includes a central region of the optical axis, so as to maximize an angular range in which the image sensor can rotate;
    and wherein
    based on an instruction of the shooting instruction interface, the movement range restriction section sets a range in which the image sensor is capable of moving to a second region that includes the first region, and is wider than at the time of shooting standby.

2. The imaging device of claim 1, further comprising:
    a reference angle memory that stores a second angle representing a reference angle around the optical axis of the image sensor, and wherein
    the horizontal angle calculation section switches between and outputs the first angle and the second angle based on instruction of the horizontal correction instruction interface.

3. The imaging device of claim 2, wherein:
    the image sensor drive actuator comprises
    an actuator for image sensor angular rotation that subjects the image sensor to rotational drive in a direction around the optical axis so that there is no difference between calculation result of the horizontal angle calculation section and the angle of the image sensor at a current time, and
    an actuator for rotational blur correction that corrects rotation variation by rotating the image sensor in an optical axis direction based on output of the angular speed detection sensor, wherein the actuator for image sensor angular rotation subjects the image sensor to rotational drive at a rotation speed that is slower than the actuator for rotational blur correction.

4. The imaging device of claim 3, wherein:

the actuator section for image sensor angular rotation rotates the image sensor faster for smaller camera shake amount.

5. The imaging device of claim 1, wherein:

the movement range restriction section relaxes the restriction with shooting standby in progress as image stabilization becomes smaller.

6. The imaging device of claim 1, wherein:

the movement range restriction section relaxers the restriction with shooting standby in progress as shutter speed becomes faster.

7. The imaging device of claim 1, wherein:

the movement range restriction section relaxes the restriction with shooting standby in progress as focal length becomes shorter.

8. The imaging device of claim 1, further comprising:

a display for displaying live view display, wherein it is made possible for the display to display automatic horizontal correction valid display indicating that there is a state where automatic horizontal correction has been performed, and automatic horizontal correction invalid display indicating that there is not a state where live view display has been subjected to automatic horizontal correction.

9. The imaging device of claim 1, further comprising:

a display for displaying live view display, wherein the display is capable of displaying inclination amount representing inclination amount of the imaging device, and range display indicating inclination range in which automatic horizontal correction is possible.

10. The imaging device of claim 1, wherein:

the movement range restriction section relaxes restriction with shooting standby in progress after there is no longer a difference between a calculation result from the horizontal angle calculation section and angle of the image sensor at the current point in time.

11. A control method, for an imaging device that forms a subject image on an image sensor using an imaging optical system, and acquires an image, comprising:

determining whether or not horizontal correction of the image sensor or an output image of the image sensor with respect to an image frame has been instructed;

detecting angular speed of the imaging device;

detecting vertical direction or horizontal direction of the imaging device or the image sensor, and calculating a first angle about the optical axis of the image sensor in order to horizontally correct the image sensor or an output image of the image sensor with respect to an image frame;

rotating the image sensor about the optical axis based on detection result of the angular speed, or the first angle;

at the time of shooting standby, when rotating the image sensor based on detection result of the angular speed or the first angle, restricting a region in which the image sensor is capable of moving to a first region that includes a central region of the optical axis, so as to maximize an angular range in which the image sensor can rotate; and in a case where preparation or commencement of shooting has been instructed, setting a region in which it is possible to move the image sensor to a second region that includes the first region, and that is wider than at the time of shooting standby.

12. The control method for an imaging device of claim 11, further comprising:

storing a second angle representing a reference angle around the optical axis of the image sensor in a reference angle memory; and when calculating the first angle, switching to and outputting either of the first angle and the second angle in accordance with instructions to perform the horizontal correction.

13. The control method for an imaging device of claim 12, further comprising:

when rotating the image sensor about the optical axis, subjecting the image sensor to rotational drive in a direction about the optical axis so that there is no longer a difference between a result of having calculated the first angle about the optical axis of the image sensor, and angle of the image sensor at the current point in time, and correcting rotational blur by rotating the image sensor in a direction about the optical axis, based on the angular speed detection result, wherein, when performing rotational drive about the optical axis of the image sensor, subjecting the image sensor to rotational drive at a slower rotation speed than for the rotational blur correction.

14. The control method for an imaging device of claim 13, further comprising:

at the time of rotating the image sensor about the optical axis, rotating the image sensor faster for smaller camera shake amount.

15. The control method for an imaging device of claim 11, further comprising:

when restricting movement possible range of the image sensor, relaxing the restriction with shooting standby in progress for smaller image stabilization amount.

16. The control method for an imaging device of claim 11, further comprising:

when restricting movement possible range of the image sensor, relaxing the restriction with shooting standby in progress for faster shutter speed.

17. The control method for an imaging device of claim 11, further comprising:

when restricting movement possible range of the image sensor, relaxing the restriction with shooting standby in progress for shorter focal length.

18. The control method for an imaging device of claim 11, further comprising:

displaying a live view image; and when displaying the live view image, making it possible to display automatic horizontal correction valid display indicating that there is a state where automatic horizontal correction has been performed, and automatic horizontal correction invalid display indicating that there is not a state where live view display has been subjected to automatic horizontal correction.

19. The control method for an imaging device of claim 11, further comprising:

displaying a live view image; and at the time of display of the live view image, making it possible to display inclination amount representing inclination amount of the imaging device, and range display indicating inclination range in which automatic horizontal correction is possible.

20. The control method for an imaging device of claim 11, further comprising:
- when restricting movement possible range of the image sensor, relaxing the restriction with shooting standby in progress after a difference between a result of having calculated the first angle about the optical axis of the image sensor, and angle of the image sensor at the current point in time, has been removed.

\* \* \* \* \*